(12) United States Patent
Mihara

(10) Patent No.: US 7,086,034 B2
(45) Date of Patent: Aug. 1, 2006

(54) METHOD, PROGRAM, AND STORAGE MEDIUM FOR ACQUIRING LOGS

(75) Inventor: Makoto Mihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 569 days.

(21) Appl. No.: 10/600,843

(22) Filed: Jun. 23, 2003

(65) Prior Publication Data

US 2004/0015736 A1    Jan. 22, 2004

(30) Foreign Application Priority Data

Jun. 28, 2002  (JP)  .............................. 2002-191129
Jun. 28, 1920  (JP)  .............................. 2002-191128

(51) Int. Cl.
*G06F 9/44* (2006.01)
*G06F 9/45* (2006.01)
*G06F 12/00* (2006.01)
*G06F 11/00* (2006.01)

(52) U.S. Cl. ...................... 717/124; 717/126; 717/127; 717/151; 717/103; 717/108; 714/5; 714/20

(58) Field of Classification Search ................ 717/124, 717/126, 127, 128, 141, 151; 714/5, 20, 714/45; 711/103; 712/210

See application file for complete search history.

(56) References Cited

U.S. PATENT DOCUMENTS

| | | | |
|---|---|---|---|
| 5,313,616 A * | 5/1994 | Cline et al. ................... | 717/127 |
| 5,909,580 A * | 6/1999 | Crelier et al. ................ | 717/141 |
| 6,226,789 B1 * | 5/2001 | Tye et al. .................... | 717/138 |
| 6,298,434 B1 * | 10/2001 | Lindwer ...................... | 712/209 |
| 6,349,379 B1 * | 2/2002 | Gibson et al. ............... | 712/210 |
| 6,427,234 B1 * | 7/2002 | Chambers et al. ........... | 717/140 |
| 6,470,413 B1 * | 10/2002 | Ogawa ........................ | 711/103 |
| 6,519,766 B1 * | 2/2003 | Barritz et al. ................ | 717/130 |
| 6,642,943 B1 * | 11/2003 | Machida ...................... | 715/763 |
| 6,772,421 B1 * | 8/2004 | Ogawa ........................ | 719/331 |
| 6,823,507 B1 * | 11/2004 | Srinivasan et al. .......... | 717/152 |
| 6,915,470 B1 * | 7/2005 | Aoshima ..................... | 714/738 |
| 6,934,877 B1 * | 8/2005 | Tamatsu ........................ | 714/5 |

OTHER PUBLICATIONS

TITLE: Performance Assertion Checking, author: Pearl et al, ACM, 1993.*
TITLE: Performance Debugging Shared Memory Parallel Programs Using Run-Time Dependence Analysis, author; Rajamony et al, ACM, 1997.*

* cited by examiner

*Primary Examiner*—Chameli C. Das
(74) *Attorney, Agent, or Firm*—Fitzpatrick, Cella, Harper & Scinto

(57) ABSTRACT

A log acquisition method is provided that allows a processing log of software to readily be acquired and reduces the man-hours needed for analyzing a bug. The log acquisition method is a method for acquiring a runtime log of a program including a function, comprising the step of changing the address of the function loaded to the address of a function for log acquisition and selecting the function, wherein the function for log acquisition comprises the steps of: calling the function the log of which is to be acquired to cause a predetermined process to be executed, receiving the result of the execution, and passing said result to said program, recording given information when calling the address of the selected function, and recording given information when receiving the result of the execution of the selected function.

38 Claims, 51 Drawing Sheets

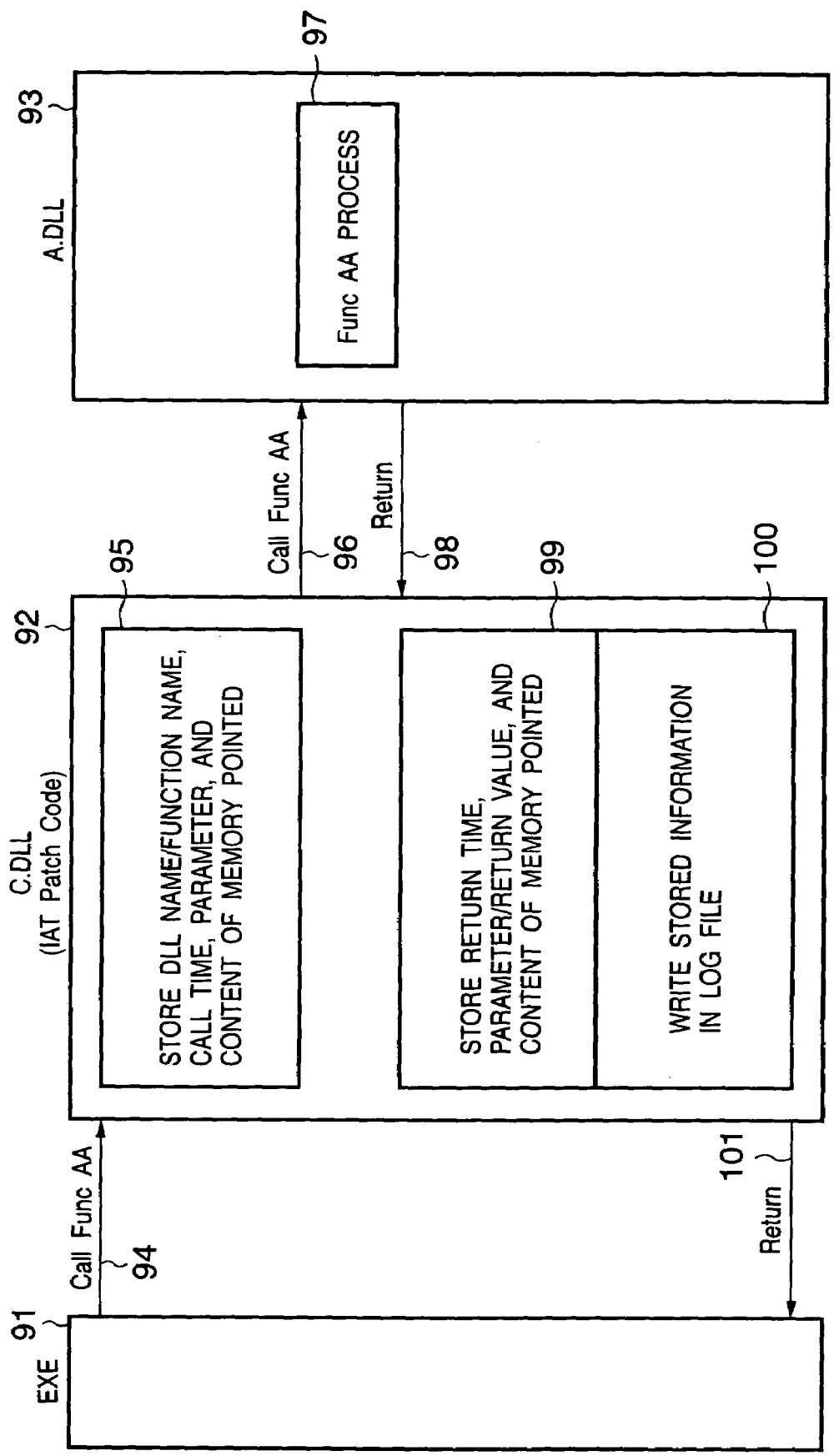

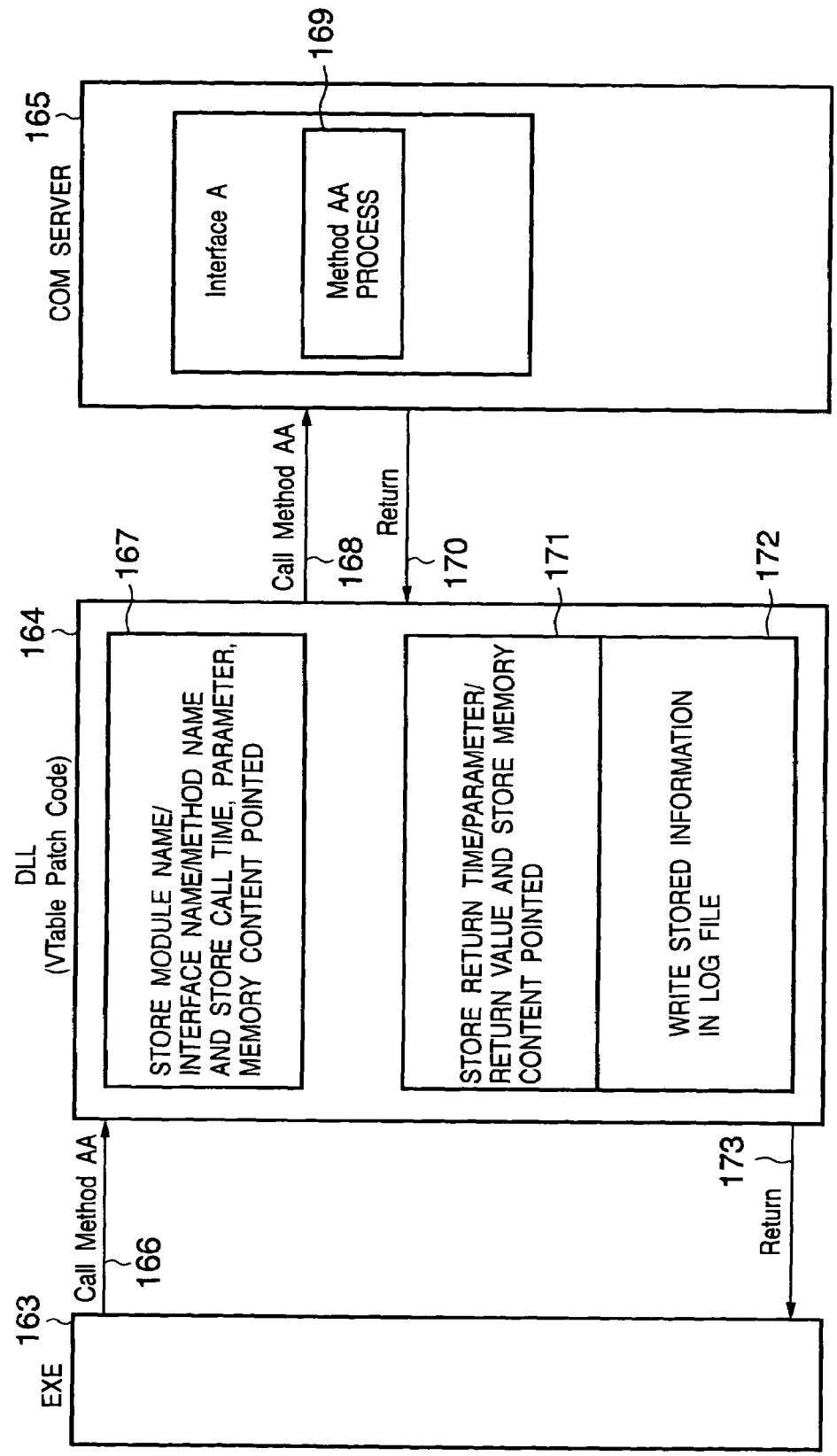

FIG. 10

```
[
    uuid(58DB5633-0694-4340-97CE-4E1AC6BFFBA7),     //TestDllStd
    helpstring("TestDllStd Type Library For PAT"),
    version(1,0)
]
library TestDllStd typedef [public] struct
        {
                char chParam;
                unsigned char uchParam;
                short sParam;
                unsigned short usParam;
                int nParam;
                unsigned int unParam;
                long lParam;
                unsigned long ulParam;
                double dbParam;
                float fParam;
        }TESTSTRUCT;
        typedef [public] TESTSTRUCT *LPTESTSTRUCT;
//DEFINE_GUID(GUID_PROGID, 0x8e037d65, 0xefa0, 0x40e7, 0x91, 0x43, 0xef, 0x70, 0x56,
0x94, 0x5b, 0x79);
   [
    uuid(8E037D65-EFA0-40e7-9143-EF7056945B79),
]   helpstring("TestDllStd.dll for PAT object"), interface
        test
        {
                char_stdcall FuncCharStd([in] char chPram);
                char*_stdcall FuncPCharStd([in, out] char* lpchParam);

TESTSTRUCT_stdcall FuncStructStd[in]TESTSTRUCT TestStruct);
        };      LPTESTSTRUCT_stdcall FuncPStructStd([in, out]LPTESTSTRUCTlp TestStruct):
}
```

FIG. 11

```
                                                          200
                                                         /
define PAT_PARAM_ATTR_ID 00000000-0000-0000-0000-000000000000 interface
test
{
        void_stdcall FuncBinidIs                     201
        (                                           /
                [out, custom(PAT_PARAM_ATTR_ID, "binid_is()")] long* lplParam
        );
        void_stdcall FuncSizeIs
        (                                             202
                [in] DWORD dwCount,                  /
                [out, custom(PAT_PARAM_ATTR_ID, "sizeis_is(dwCount)")] int* lpnParam
        );
        void_stdcall FuncLengthIs
        (                                             203
                [in] DWORD dwLength,                 /
                [in, custom(PAT_PARAM_ATTR_ID, "lentgth_is(dwLength)")] char* lpszParam
        );
        void_stdcall FuncBytesIs
        (                                             204
                [in] DWORD dwSize,                   /
                [in, custom(PAT_PARAM_ATTR_ID, "bytes_is(dwSize)")] void* lpParam
        );
        void_stdcall FuncBytesIs2              205
        (                                     /
                [out, custom(PAT_PARAM_ATTR_ID, "bytes_is(12)")] void* lpParam
        );
};
```

```
MODULE NAME:      TestDllStd.DLL
FUNCTION NAME:    FuncBinIds
ARGUMENT(in):     long* lpParam : 0x5034206D/0x10, DataID=0x0001
ARGUMENT(out):    void :
RETURN VALUE:
IN TIME:          2002/03/25  22:24:12.025
OUT TIME:         2002/03/25  22:24:12.035

MODULE NAME:      TestDllStd.DLL
FUNCTION NAME:    FuncSizeIs
ARGUMENT(in):     DWORD dwCount : 10
ARGUMENT(out):    int* lpnParam : 0x5034207D/0x5, DataID=0x0002
RETURN VALUE:     void :
IN TIME:          2002/03/25  22:24:12.046
OUT TIME:         2002/03/25  22:24:12.057

MODULE NAME:      TestDllStd.DLL
FUNCTION NAME:    FuncLengthIs
ARGUMENT(in):     DWORD dwLength : 5
ARGUMENT(out):    char* lpszParam : 0x503860C/0x66, DataID=0x0003
RETURN VALUE:     void :
IN TIME:          2002/03/25  22:24:12.068
OUT TIME:         2002/03/25  22:24:12.079

MODULE NAME:      TestDllStd.DLL
FUNCTION NAME:    FuncByteIs
ARGUMENT(in):     DWORD dwSize : 7
ARGUMENT(out):    void* lpParam : 0x503870C/, DataID=0x0004
RETURN VALUE:     void :
IN TIME:          2002/03/25  22:24:12.100
OUT TIME:         2002/03/25  22:24:12.179
...
```

211

```
DataID : 0x0001
Size : 4
00000000 : 10 00 00 00

DataID : 0x0002
Size : 40
00000000 : 05 00 00 00 4A 03 A5 20
00000008 : 06 00 00 00 4B 03 A5 20
00000010 : 07 00 00 00 4C 03 A5 20
00000018 : 08 00 00 00 4D 03 A5 20
00000020 : 09 00 00 00 4E 03 A5 20

DataID : 0x0003
Size : 5
00000000 : 66 4A 70 50 00

DataID : 0x0004
00000000 : 01 5D 66 B2 20 49 20
...
```

FIG. 14

```
define PAT_PARAM_ATTR_ID 00000000-0000-0000-000000000000 typedef [public] struct                    ~ 220
{
    [in, custom(PAT_PARAM_ATTR_ID, "funcname_is(FuncInternal1)")] DWORD pfnFuncInternal1;
    [in, custom(PAT_PARAM_ATTR_ID, "funcname_is(FuncInternal2)")] DWORD pfnFuncInternal2;
    [in, custom(PAT_PARAM_ATTR_ID, "funcname_is(FuncInternal3)")] DWORD pfnFuncInternal3;
    [in, custom(PAT_PARAM_ATTR_ID, "funcname_is(FuncInternal4)")] DWORD pfnFuncInternal4;
}FUNCPOINTERARRAY;

interface
test
{
    void_stdcall SetCallBack                                          221
    (
        [in, custom(PAT_PARAM_ATTR_ID, "funcname_is(FuncCallBack)")] DWORD
pfnFuncCallBack
    );
    void FuncCallBack([in] int nParam); ~ 222 void_stdcall GetFuncPointer                                       223
    (
        [out, custom(PAT_PARAM_ATTR_ID, "funcname_is(FuncInternal)")] DWORD
pfnFuncInternal
    );
    void FuncInternal([in, out] char* lpszParam); ~ 224 void_stdcall GetFuncPointerArray
    (
        [out]FUNCPOINTERARRAY* pFuncPointerArray; ~ 225
    );
    void FuncInternal1([in] int nParam);
    void FuncInternal2([in, out] char* lpzaParam);
    void FuncInternal3([out] DWORD* dwParam); ~ 226
    void FuncInternal4([]);
};
```

FIG. 15

| EXE | | CODE | |
|---|---|---|---|
| | | DATA | |
| | Import Address Table | A.DLL | Func CAA Address |
| | | | Func CAB Address |
| | | | Func CAC Address |
| | | B.DLL | Func CBA Address |
| | | | Func CBB Address |
| | | | Func CBC Address |
| DLL | A.DLL | Func AA Code | |
| | | Func AB Code | |
| | | Func AC Code | |
| | | Func AD Code | |
| | B.DLL | Func BA Code | |
| | | Func BB Code | |
| | | Func BC Code | |
| | C.DLL | Func CAA Code(Call Func AA) | |
| | | Func CAB Code(Call Func AB) | |
| | | Func CAC Code(Call Func AC) | |
| | | Func CBA Code(Call Func BA) | |
| | | Func CBB Code(Call Func BB) | |
| | | Func CBC Code(Call Func BC) | |
| | | Func CAD Code(Call Func AD) | |

230 (EXE), 231 (A.DLL, B.DLL), 232 (C.DLL)

FIG. 17

| | |
|---|---|
| MODULE NAME : | TestDllStd. DLL |
| FUNCTION NAME : | SetCallBack |
| ARGUMENT(in) : | DWORD pfnFuncCallBack : 0x0299103F |
| ARGUMENT(out) : | |
| RETURN VALUE : | void : |
| IN TIME : | 2002/03/25  22 : 24 : 12.025 |
| OUT TIME : | 2002/03/25  22 : 24 : 12.035 |
| | |
| MODULE NAME : | TestDllStd. DLL |
| FUNCTION NAME : | GetFuncPointer |
| ARGUMENT(in) : | |
| ARGUMENT(out) : | DWORD pfnFuncInternal : 0x29913dF |
| RETURN VALUE : | void : |
| IN TIME : | 2002/03/25  22 : 24 : 12.046 |
| OUT TIME : | 2002/03/25  22 : 24 : 12.057 |
| | |
| MODULE NAME : | TestDllStd. DLL |
| FUNCTION NAME : | GetFuncPointerArray |
| ARGUMENT(in) : | |
| ARGUMENT(out) : | FUNCPOINTERARRAY* pFuncPointerArray : 0x503860C |
| | DWORD FUNCPOINTERARRAY. pfnFuncInternal1 : 0x02997670 |
| | DWORD FUNCPOINTERARRAY. pfnFuncInternal2 : 0x02997708 |
| | DWORD FUNCPOINTERARRAY. pfnFuncInternal3 : 0x029977BE |
| | DWORD FUNCPOINTERARRAY. pfnFuncInternal4 : 0x0299784F |
| RETURN VALUE : | void : |
| IN TIME : | 2002/03/25  22 : 24 : 12.068 |
| OUT TIME : | 2002/03/25  22 : 24 : 12.079 |

FIG. 18

```
MODULE NAME :      TestDllStd. DLL
FUNCTION NAME :    SetCallBack
ARGUMENT(in) :     DWORD pfnFuncCallBack : 0x0299103F
ARGUMENT(out) :
RETURN VALUE :     void :
IN TIME :          2002/03/25 22 : 24 : 12.025
OUT TIME :         2002/03/25 22 : 24 : 12.035

MODULE NAME :      TestDllStd. DLL
FUNCTION NAME :    FuncCallBack
ARGUMENT(in) :     int nParam : 100
ARGUMENT(out) :
RETURN VALUE :     void :
IN TIME :          2002/03/25 22 : 24 : 12.036
OUT TIME :         2002/03/25 22 : 24 : 12.040

MODULE NAME :      TestDllStd. DLL
FUNCTION NAME :    GetFuncPointer
ARGUMENT(in) :
ARGUMENT(out) :    DWORD pfnFuncInternal : 0x029913dF
RETURN VALUE :     void :
IN TIME :          2002/03/25 22 : 24 : 12.046
OUT TIME :         2002/03/25 22 : 24 : 12.057

MODULE NAME :      TestDllStd. DLL
FUNCTION NAME :    FuncInternal1
ARGUMENT(in) :     char* lpszParam : 0x5038600/0
ARGUMENT(out) :    char* lpszParam : 0x5038600/-12
RETURN VALUE :     void :
IN TIME :          2002/03/25 22 : 24 : 12.060
OUT TIME :         2002/03/25 22 : 24 : 12.065

MODULE NAME :      TestDllStd. DLL
FUNCTION NAME :    GetFuncPointArray
ARGUMENT(in) :
ARGUMENT(out) :    FUNCPOINTERARRAY* pFuncPointerArray : 0x503860C
                   DWORD FUNCPOINTERARRAY. pfnFuncInternal1 : 0x02997670
                   DWORD FUNCPOINTERARRAY. pfnFuncInternal2 : 0x02997708
                   DWORD FUNCPOINTERARRAY. pfnFuncInternal3 : 0x029977BE
                   DWORD FUNCPOINTERARRAY. pfnFuncInternal4 : 0x0299784F
RETURN VALUE :     void :
IN TIME :          2002/03/25 22 : 24 : 12.068
OUT TIME :         2002/03/25 22 : 24 : 12.079

MODULE NAME :      TestDllStd. DLL
FUNCTION NAME :    FuncInternal4
ARGUMENT(in) :
ARGUMENT(out) :
RETURN VALUE :     void :
IN TIME :          2002/03/25 22 : 24 : 12.080
OUT TIME :         2002/03/25 22 : 24 : 12.099
```

FIG. 19

```
define PAT_PARAM_ATTR_ID 00000000-0000-0000-000000000000 interface
test
{
    void_stdcall FuncArrayIs
    (                                                              240
        [in] DWORD dwCount,
        [in, out, custom(PAT_PARAM_ATTR_ID, "array_is(dwCount)")] int* lpnParam
    );
};
```

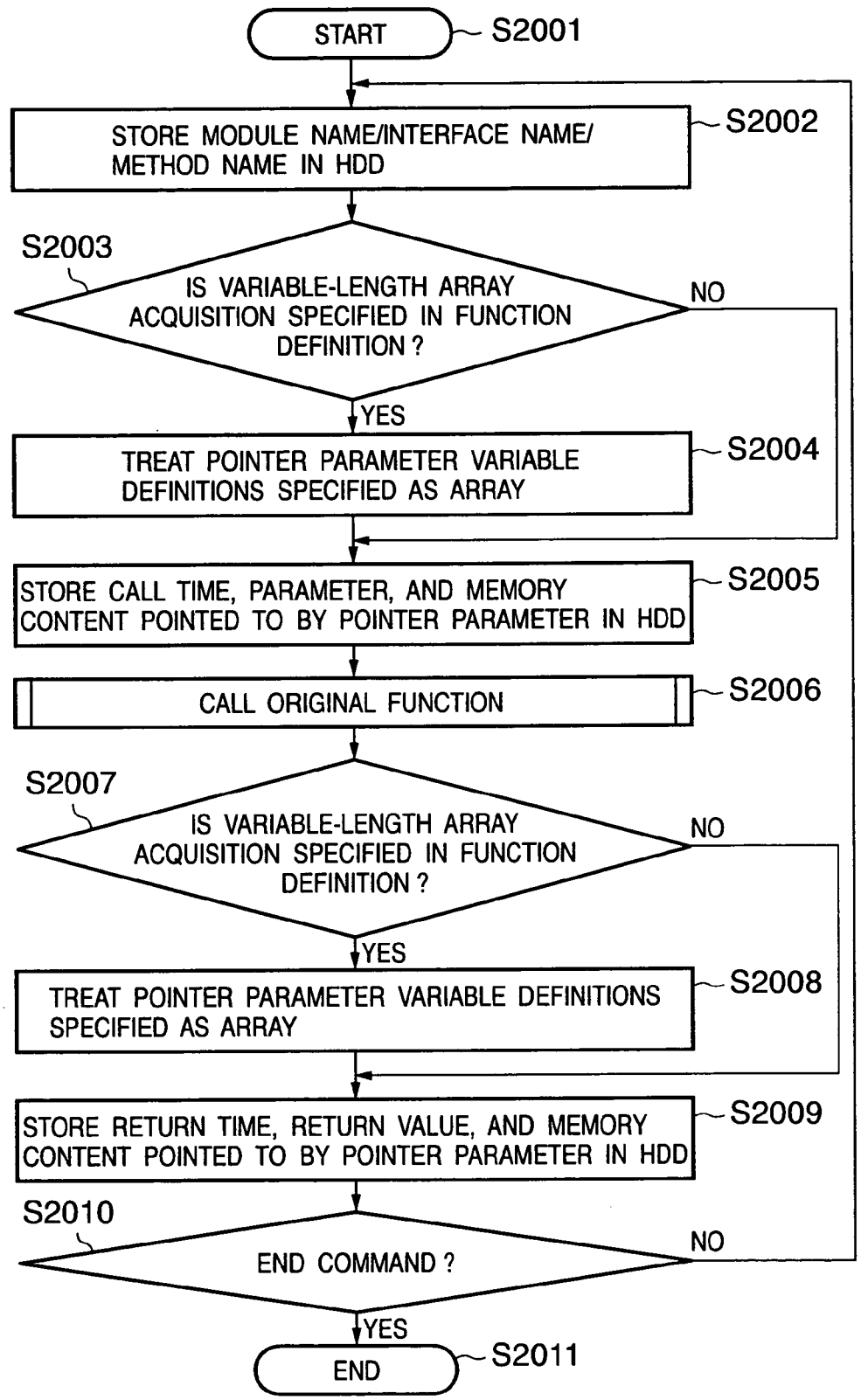

FIG. 21

```
MODULE NAME:     TestDllStd. DLL
FUNCTION NAME:   FuncArrayIs
ARGUMENT(in):    DWORD dwCount : 4
                 int* lpnParam : 0x5034206D/0x00
ARGUMENT(out):   int* lpnParam : 0x5034206D/0x01
RETURN VALUE:    void :
IN TIME:         2002/03/25 22 : 24 : 12.025
OUT TIME:        2002/03/25 22 : 24 : 12.035

MODULE NAME:     TestDllStd. DLL
FUNCTION NAME:   FuncArrayIs
ARGUMENT(in):    DWORD dwCount : 3
                 int* lpnParam : 0x5034207D/0x00
ARGUMENT(out):   int* lpnParam : 0x5034207D/0x05
RETURN VALUE:    void :
IN TIME:         2002/03/25 22 : 24 : 12.046
OUT TIME:        2002/03/25 22 : 24 : 12.057

...
```
— 250

```
MODULE NAME:     TestDllStd. DLL
FUNCTION NAME:   FuncArrayIs
ARGUMENT(in):    DWORD dwCount : 4
                 int* lpnParam : 0x5034206D/Array (int : 0 : 0x00, int : 1 : 0x00, int : 2 : 0x00, int : 3 : 0x00)
ARGUMENT(out):   int* lpnParam : 0x5034206D/Array (int : 0 : 0x01, int : 1 : 0x02, int : 2 : 0x03, int : 3 : 0x04)
RETURN VALUE:    void :
IN TIME:         2002/03/25 22 : 24 : 12.025
OUT TIME:        2002/03/25 22 : 24 : 12.035

MODULE NAME:     TestDllStd. DLL
FUNCTION NAME:   FuncArrayIs
ARGUMENT(in):    DWORD dwCount : 3
                 int* lpnParam : 0x5034207D/Array (int : 0 : 0x00, int : 1 : 0x00, int : 2 : 0x00)
ARGUMENT(out):   int* lpnParam : 0x5034207D/Array (int : 0 : 0x05, int : 1 : 0x10, int : 2 : 0x15)
RETURN VALUE:    void :
IN TIME:         2002/03/25 22 : 24 : 12.046
OUT TIME:        2002/03/25 22 : 24 : 12.057

```
typedef struct
{
        DWORD dwSize ;
        DWORD dwParam1 ;
        DWORD dwParam2 ;
        DWORD dwParam3 ;
}STRUCTSIZE1 ;

typedef struct
{
        DWORD dwSize ;
        DWORD dwParam1 ;
        DWORD dwParam2 ;
        DWORD dwParam3 ;
        DWORD dwParam4 ;
}STRUCTSIZE2 ;

typedef struct
{
        DWORD dwSize ;
        DWORD dwParam1 ;
        DWORD dwParam2 ;
        DWORD dwParam3 ;
        DWORD dwParam4 ;
        DWORD dwParam5 ;
}STRUCTSIZE3 ;

void FuncGetData (DWORD dwKind, void* lpBuf)
{
        switch(dwKind)
        }
        case 1 :
                //lpBuf IS TREATED AS THE POINTER TO STRUCTSIZE1
                break;
        case 2 :
                //lpBuf IS TREATED AS THE POINTER TO STRUCTSIZE2
                break;
        case 3 :
                //lpBuf IS TREATED AS THE POINTER TO STRUCTSIZE3
                break;
        }
}
```

FIG. 24

```
define PAT PARAM_ATTR_ID 00000000-0000-0000-0000-000000000000 typedef [public] struct                         290
{
        [custom (PAT_PARAM_ATTR_ID, "structsize_is()")]DWORD dwSize;
        DWORD dwParam1 ;
        DWORD dwParam2 ;
        DWORD dwParam3 ;
        DWORD dwParam4 ;
        DWORD dwParam5 ;

}STRUCTSIZE;   ~ 291 interface
test
{
        void FuncGetData
        (                                       292
                [in] DWORD dwKind,
                [in, out] STRUCTSIZE*  lpBuf
        );

};
```

FIG. 26
OPERATION IN PROGRAM
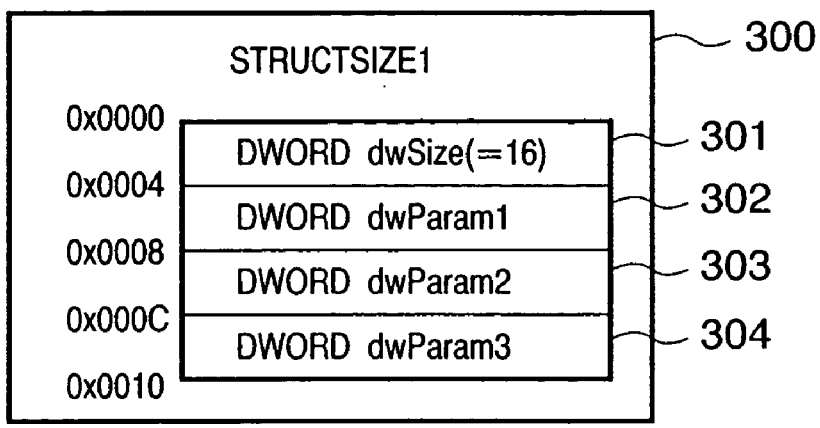
OPERATION IN API TRACER
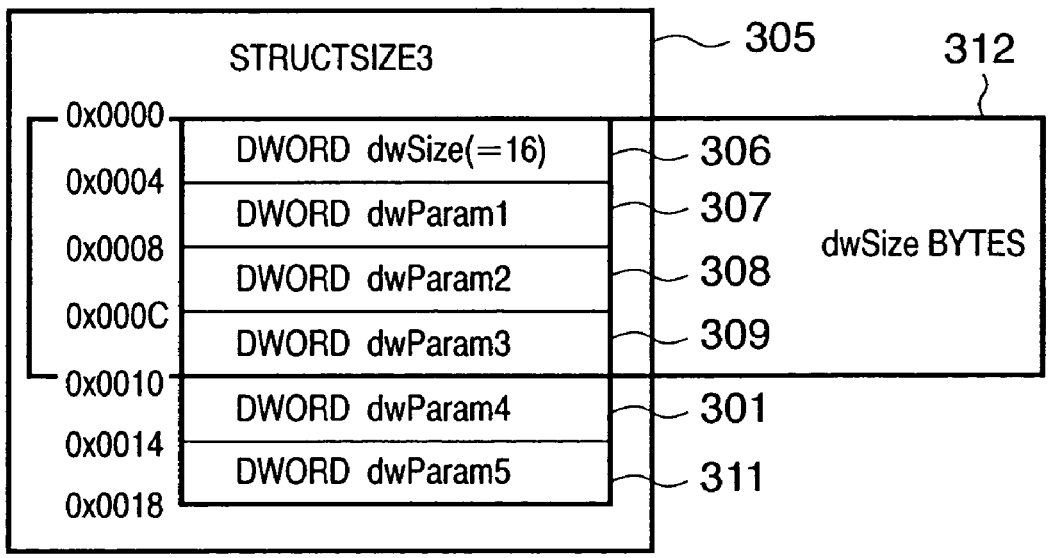

FIG. 27

```
MODULE NAME:     TestDllStd. DLL
FUNCTION NAME:   FuncGetData
ARGUMENT(in):    DWORD dwKind : 1
                 STRUCTSIZE* pBuf : 0x503860C
                 DWORD STRUCTSIZE. dwSize : 16
                 DWORD STRUCTSIZE. dwParam1 : 0
                 DWORD STRUCTSIZE. dwParam2 : 0
                 DWORD STRUCTSIZE. dwParam3 : 0
ARGUMENT(out):   STRUCTSIZE* pBuf : 0x503860C
                 DWORD STRUCTSIZE. dwSize : 16
                 DWORD STRUCTSIZE. dwParam1 : 1
                 DWORD STRUCTSIZE. dwParam2 : 2
                 DWORD STRUCTSIZE. dwParam3 : 3
RETURN VALUE:    void :
IN TIME:         2002/03/25 22 : 24 : 12.025
OUT TIME:        2002/03/25 22 : 24 : 12.035

MODULE NAME:     TestDllStd. DLL
FUNCTION NAME:   FuncGetData
ARGUMENT(in):    DWORD dwKind : 3
                 STRUCTSIZE* pBuf : 0x503990C
                 DWORD STRUCTSIZE. dwSize : 24
                 DWORD STRUCTSIZE. dwParam1 : 0
                 DWORD STRUCTSIZE. dwParam2 : 0
                 DWORD STRUCTSIZE. dwParam3 : 0
                 DWORD STRUCTSIZE. dwParam4 : 0
                 DWORD STRUCTSIZE. dwParam5 : 0
ARGUMENT(out):   STRUCTSIZE* pBuf : 0x503990C
                 DWORD STRUCTSIZE. dwSize : 24
                 DWORD STRUCTSIZE. dwParam1 : 10
                 DWORD STRUCTSIZE. dwParam2 : 20
                 DWORD STRUCTSIZE. dwParam3 : 30
                 DWORD STRUCTSIZE. dwParam4 : 40
                 DWORD STRUCTSIZE. dwParam5 : 50
RETURN VALUE:    void :
IN TIME:         2002/03/25 22 : 24 : 12.046
OUT TIME:        2002/03/25 22 : 24 : 12.057

```
typedef struct
{
        char chParam;
        DWORD dwParam ;
        short shParam ;
}STRUCTKIND1 ;

typedef struct
{
        short shParam ;
        DWORD dwParam ;
        char chParam;
}STRUCTKIND2 ;

typedef struct
{
        char chParam;
        DWORD dwParam ;
        short shParam ;
        long lParam ;
        int nParam ;
}STRUCTKIND3 ;

void FuncGetData (DWORD dwKind, void* lpBuf)
{
        switch(dwKind)
        }
        case 1 :
                //lpBuf IS TREATED AS THE POINTER TO STRUCTKIND1
                break;
        case 2 :
                //lpBuf iS TREATED AS THE POINTER TO STRUCTKIND2
                break;
        case 3 :
                //lpBuf IS TREATED AS THE POINTER TO STRUCTKIND3
                break;
        }
}
```

FIG. 30

```
define PAT_PARAM_ATTR_ID 00000000-0000-0000-000000000000 typedef [public] struct
{
        char chParam;
        DWORD dwParam;
        short shParam;
}STRUCTKIND1;

typedef [public] struct
{
        short shParam;
        DWORD dwParam;
        char chParam;
}STRUCTKIND2;

typedef [public] struct
{
        char chParam;
        short shParam;
        DWORD dwParam;
        long lParam;
        int nParam;
}STRUCTKIND3;

interface
test
{
        void FuncGetData
        (
                [in] DWORD dwKind,
                [in, out, custom(PAT_PARAM_ATTR_ID,
                "structKind_is(dwKind : 1 : STRUCTKIND1*, 2 : STRUCTKIND2*, 3 : STRUCTKIND3* )")]
                void* lpBuf
        );
};
```

FIG. 32

```
MODULE NAME :      TestDllStd. DLL
FUNCTION NAME :    FuncGetData
ARGUMENT(in) :     DWORD dwKind : 1
                   STRUCTKIND1* pBuf : 0x503860C
                   char STRUCTKIND1. chParam : 0
                   DWORD STRUCTKIND1. dwParam : 0
                   short STRUCTKIND1. shParam : 0
ARGUMENT(out) :    STRUCTKIND1* pBuf : 0x503860C
                   char STRUCTKIND1. chParam : 1
                   DWORD STRUCTKIND1. dwParam : 2
                   short STRUCTKIND1. shParam : 3

RETURN VALUE :     void :
IN TIME :          2002/03/25 22 : 24 : 12.025
OUT TIME :         2002/03/25 22 : 24 : 12.035

MODULE NAME :      TestDllStd. DLL
FUNCTION NAME :    FuncGetData
ARGUMENT(in) :     DWORD dwKind : 3
                   STRUCTKIND3* pBuf : 0x503990C
                   char STRUCTKIND3. chParam : 0
                   short STRUCTKIND3. shParam : 0
                   DWORD STRUCTKIND3. dwParam : 0
                   long STRUCTKIND3. lParam : 0
                   int STRUCTKIND3. nParam : 0
ARGUMENT(out) :    STRUCTKIND3* pBuf : 0x503990C
                   char STRUCTKIND3. chParam : 10
                   short STRUCTKIND3. shParam : 20
                   DWORD STRUCTKIND3. dwParam : 30
                   long STRUCTKIND3. lParam : 40
                   int STRUCTKIND3. nParam : 50
RETURN VALUE :     void :
IN TIME :          2002/03/25 22 : 24 : 12.046
OUT TIME :         2002/03/25 22 : 24 : 12.057

| | |
|---|---|
| MODULE NAME: | A. DLL |
| FUNCTION NAME: | FuncAA |
| ARGUMENT: | DWORD dwID : Err>100 |
| RETURN VALUE: | DWORD dwRet : Err==0 |

| | |
|---|---|
| MODULE NAME: | A. DLL |
| FUNCTION NAME: | FuncAB |
| ARGUMENT: | DWORD dwHandle : Err==0 |
| RETURN VALUE: | int nRet : Err<=−1 |

| | |
|---|---|
| MODULE NAME: | B. DLL |
| INTERFACE NAME: | InterfaceA |
| METHOD NAME: | MethodAA |
| ARGUMENT: | DWORD dwID : Err>100 |
| RETURN VALUE: | DWORD dwHandle: Err==0 |

| | |
|---|---|
| MODULE NAME: | B. DLL |
| INTERFACE NAME: | InterfaceA |
| METHOD NAME: | MethodAB |
| ARGUMENT: | DWORD dwID : Err<=0 |
| RETURN VALUE: | DWORD dwRet: Err!=0 |

| | |
|---|---|
| MODULE NAME: | B. DLL |
| INTERFACE NAME: | InterfaceB |
| METHOD NAME: | MethodBA |
| ARGUMENT: | DWORD dwID : Err>=0 |
| RETURN VALUE: | DWORD dwRet: Err!=0 |

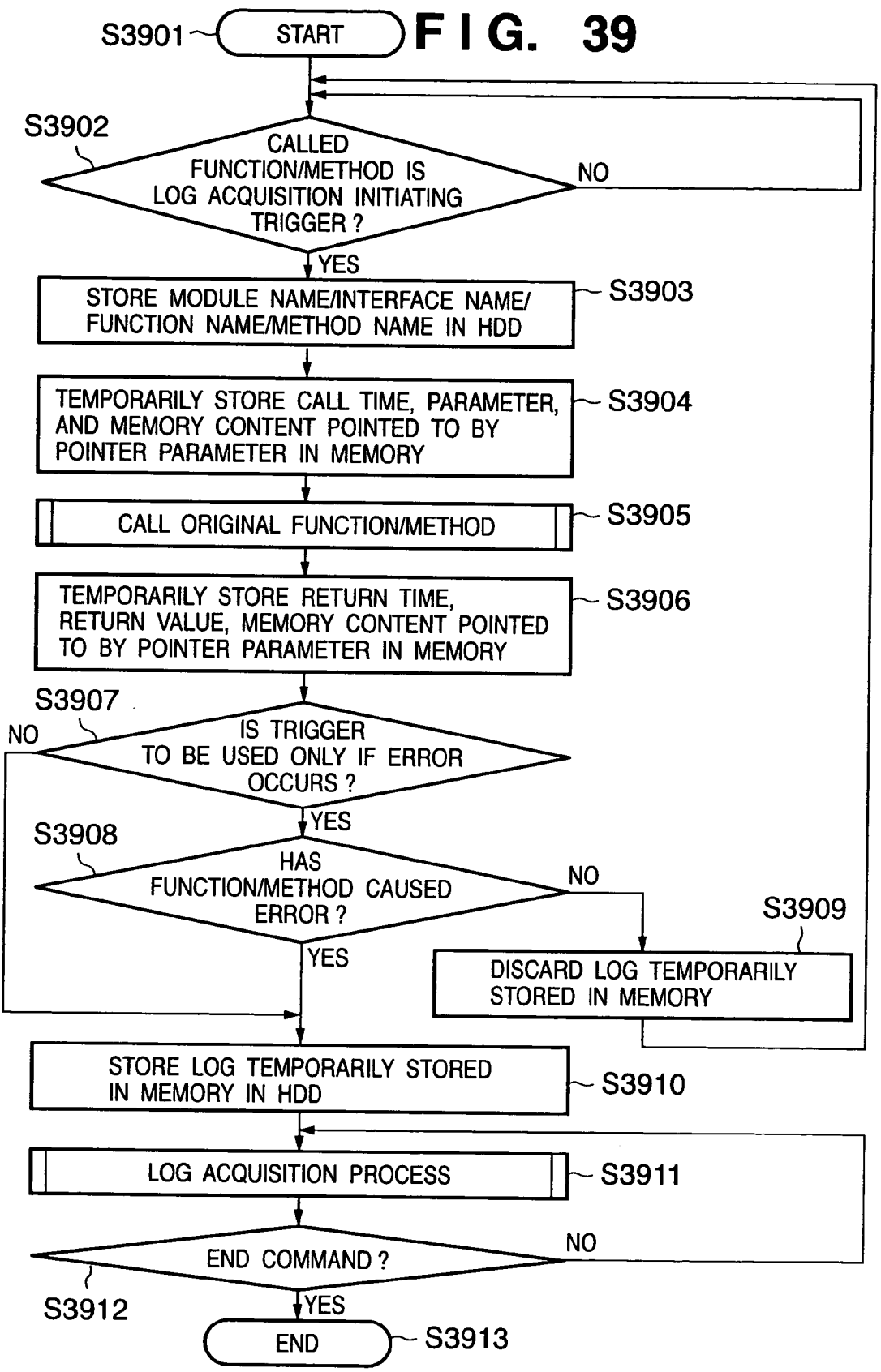

METHOD, PROGRAM, AND STORAGE MEDIUM FOR ACQUIRING LOGS

FIELD OF THE INVENTION

The present invention relates to a technology for acquiring processing logs for software consisting of a plurality of modules.

BACKGROUND OF THE INVENTION

Software failure that does not repeatedly occur has been solved by acquiring and analyzing the processing log of the software to identify the cause of the failures.

Processing log acquisition according to such prior-art methods has the following problems:

(1) Software modules must be modified to add a routine for acquiring a process log. Accordingly, the workload for acquiring the process log is heavy.

(2) Processing log acquisition is performed for each module and therefore logs are generated on a module-by-module basis. It is difficult to obtain a chronological log of entire software processing. Consequently, a large number of man-hours are required for analyzing a log to identify the cause of a failure because it does not provide a broad view of the entire processing.

SUMMARY OF THE INVENTION

The present invention has been made to solve the problems described above. An object of the present invention is to provide a method that allows a log of a software program separated into modules to be readily obtained and reduces the number of man-hours needed to analyze the cause of software failure, a program for causing a computer to perform the method, and a storage medium containing the program.

To achieve the object, the present invention provides a log acquisition method for acquiring a runtime log of a program including a function for performing a predetermined process, comprising the step of: changing the address of the function loaded for performing the predetermined process to the address of a function for log acquisition, wherein the function for log acquisition comprises the steps of: calling the function for performing the predetermined process to cause the predetermined process to be executed, receiving the result of the execution, and passing the result to the program; determining whether or not a pointer parameter is defined in a predetermined manner in a function definition in the program; and if the pointer parameter is defined in the predetermined manner, recording a memory content pointed to by the pointer parameter as a log according to the definition.

To achieve the object described above, the present invention provides a log acquisition method for obtaining a runtime log of a program including a function for performing a predetermined process, comprising the steps of:

changing the address of the function loaded for performing the predetermined process to the address of a function for log acquisition; and selecting the function for log acquisition; wherein the function for log acquisition comprises the steps of: calling the function for performing the predetermined process to cause the process to be executed, receiving the result of the execution, and passing the result to the program; recording given information as a log when calling the function selected in the selecting step; and recording given information as a log when receiving the result of execution of the function selected in the selecting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A shows the process while using the IAT Patch according to the first embodiment;

FIG. 8A shows the process while using the VTable Patch according to the first embodiment;

FIG. 10 shows an example of a function definition according to a second embodiment;

FIG. 11 shows a description written in IDL for acquiring pointer parameter data entities as a log according to the second embodiment;

FIG. 13 shows log data obtained according to the second embodiment;

FIG. 14 shows a description in function definition written in IDL for obtaining a function such as a callback function that are not exported according to a third embodiment;

FIG. 15 shows a memory organization according to the third embodiment;

FIG. 17 shows log data obtained according to the third embodiment without the definition shown in FIG. 14;

FIG. 18 shows log data obtained according to the third embodiment through the use of the definition shown in FIG. 14;

FIG. 19 shows a description written in IDL for obtaining a variable length array parameter as a log in a function definition according to a fourth embodiment;

FIG. 20 shows a flowchart of a process for acquiring a log according to the fourth embodiment with the function defined as shown in FIG. 19;

FIG. 21 shows log data (250) obtained according to the fourth embodiment;

FIG. 22 shows an example of the functions the parameters of which cannot be obtained with an ordinary function definition;

FIG. 24 shows a description in IDL for acquiring a log of function parameters shown in FIG. 22 according to a fifth embodiment;

FIG. 26 shows details of structure parameter analysis which are depicted according to memory location;

FIG. 27 shows log data obtained according to the fifth embodiment;

FIG. 28 shows an example of the functions the parameters of which cannot be obtained with an ordinary function definition according to a sixth embodiment;

FIG. 30 shows a description in IDL for acquiring a log of the function parameters shown in FIG. 28 according to the sixth embodiment;

FIG. 32 shows log data obtained with the definition shown in FIG. 30 according to the sixth embodiment;

FIG. 38 shows error definitions for functions/methods according to the ninth embodiment;

FIG. 39 shows a flowchart of a process for obtaining a log according to the ninth embodiment;

DETAILED DESCRIPTION OF THE PREFERRED EMBODIMENTS

Preferred embodiments of the present invention will now be described in detail in accordance with the accompanying drawings.

First Embodiment

In a first embodiment, an import function or virtual address table contained in memory, which is an arrangement for calling a function in a module from another module, is used to hook and log function calls between modules, thereby enabling a chronological log of an entire software program to be acquired without any modifications to the software modules. The first embodiment will be described below in detail.

System Configuration

Figure 1:
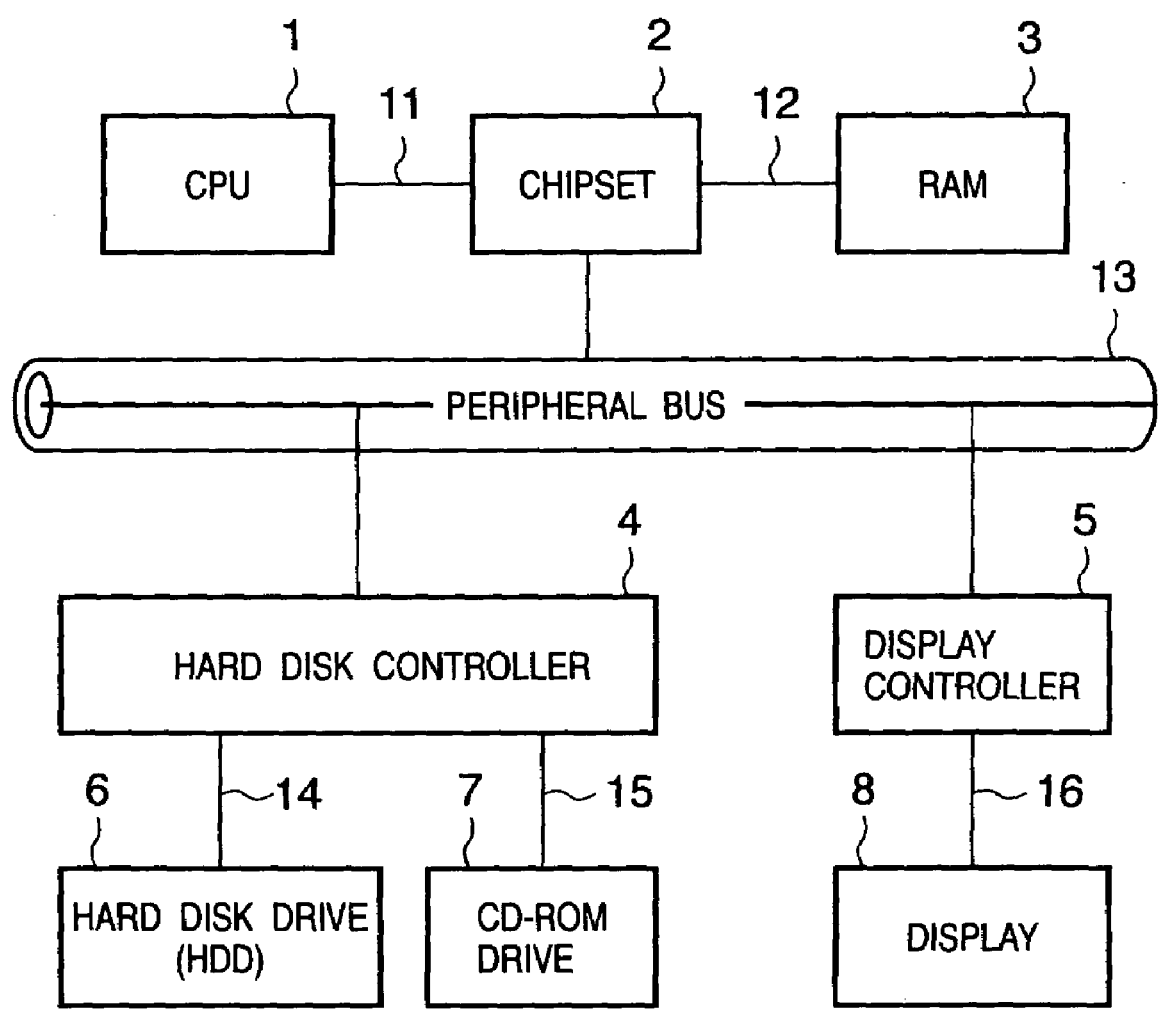
FIG. 1 shows a configuration of a computer (software evaluation system) for implementing a method for acquiring logs according to a first embodiment.

FIG. 1 shows a configuration of a computer (software evaluation system) performing a log acquisition method according to embodiments of the present invention. For simplicity, it is assumed herein that the software evaluation system is built within a single personal computer. However, the features of the log acquisition method of the present invention is effective whether the system is built in a single PC or a plurality of PCs as a network system.

The computer in which the software evaluation system is provided comprises a CPU 1, a chip set 2, a RAM 3, a hard disk controller 4, a display controller 5, a hard disk drive 6, a CD-ROM drive 7, and a display 8. It also comprises a signal line 11 connecting the CPU 1 with the chip set 2, a signal line 12 connecting the chip set 2 with the RAM 3, a peripheral bus 13 connecting the chip set 2 with peripheral devices, a signal line 14 connecting the hard disk controller 4 with the hard disk drive 6, a signal line 15 connecting the hard disk controller 4 with the CD-ROM drive 7, and a signal line 16 connecting the display controller 5 with the display 8.

Acquisition of Log Concerning Function Process

Figure 2:
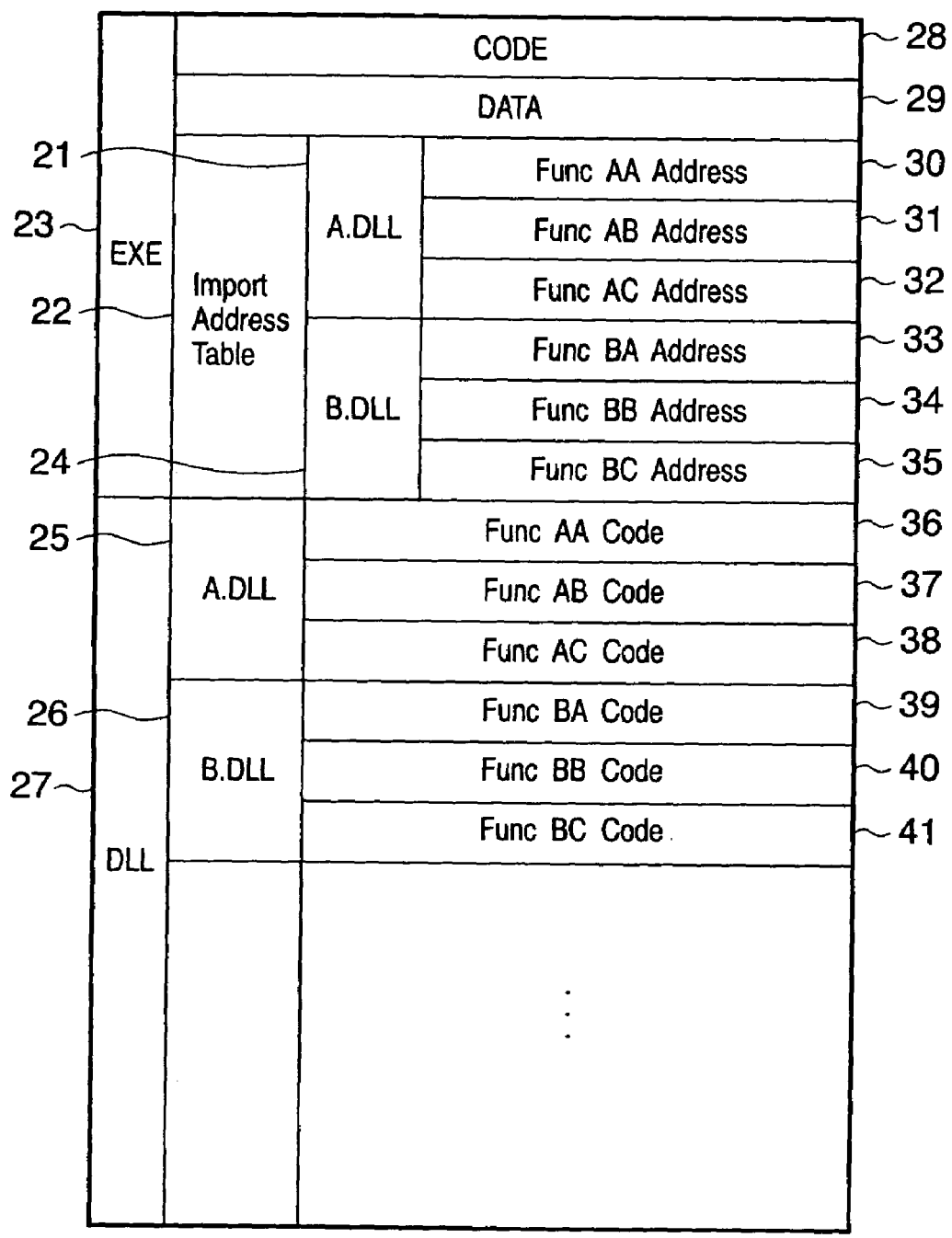
FIG. 2 shows an ordinary organization of memory in which functions are loaded according to the first embodiment.

In order to facilitate the understanding of the software evaluation system that implements the log acquisition method according to the first embodiment of the present invention, how a software program separated into a plurality of modules is ordinarily loaded in a memory will first be described with reference to FIG. 2.

A software program consisting of modules in general is separated into a set of executable files EXE (23) and a set of dynamic link libraries DLL (27) existing as modules and serving as a complement to the EXE. The EXE consists of a code segment (28), a data segment (29), and an import function address table (22). The import function table is further divided into DLLs (21, 24) to which functions belong. Each DLL contains addresses (30 to 35) at which each function is loaded. The contents of the functions of each DLL are separately loaded (25, 26) and each function (36 to 41) is loaded as part of the associated DLL. FIG. 2 shows an example in which one EXE uses the functions in two dynamic link libraries, A.DLL and B.DLL. Six functions, Func AA, Func AB, Func AC, Func BA, Func BB, and Func BC are used.

When a code in a code segment of the EXE calls function Func AA, the address (30) of Func AA written in the import function address table is first read. In effect, the address of AA code (36) read as part of A.DLL is written here. The code of the EXE can call Func AA of A.DLL by calling the address of the AA code (36).

Figure 3:
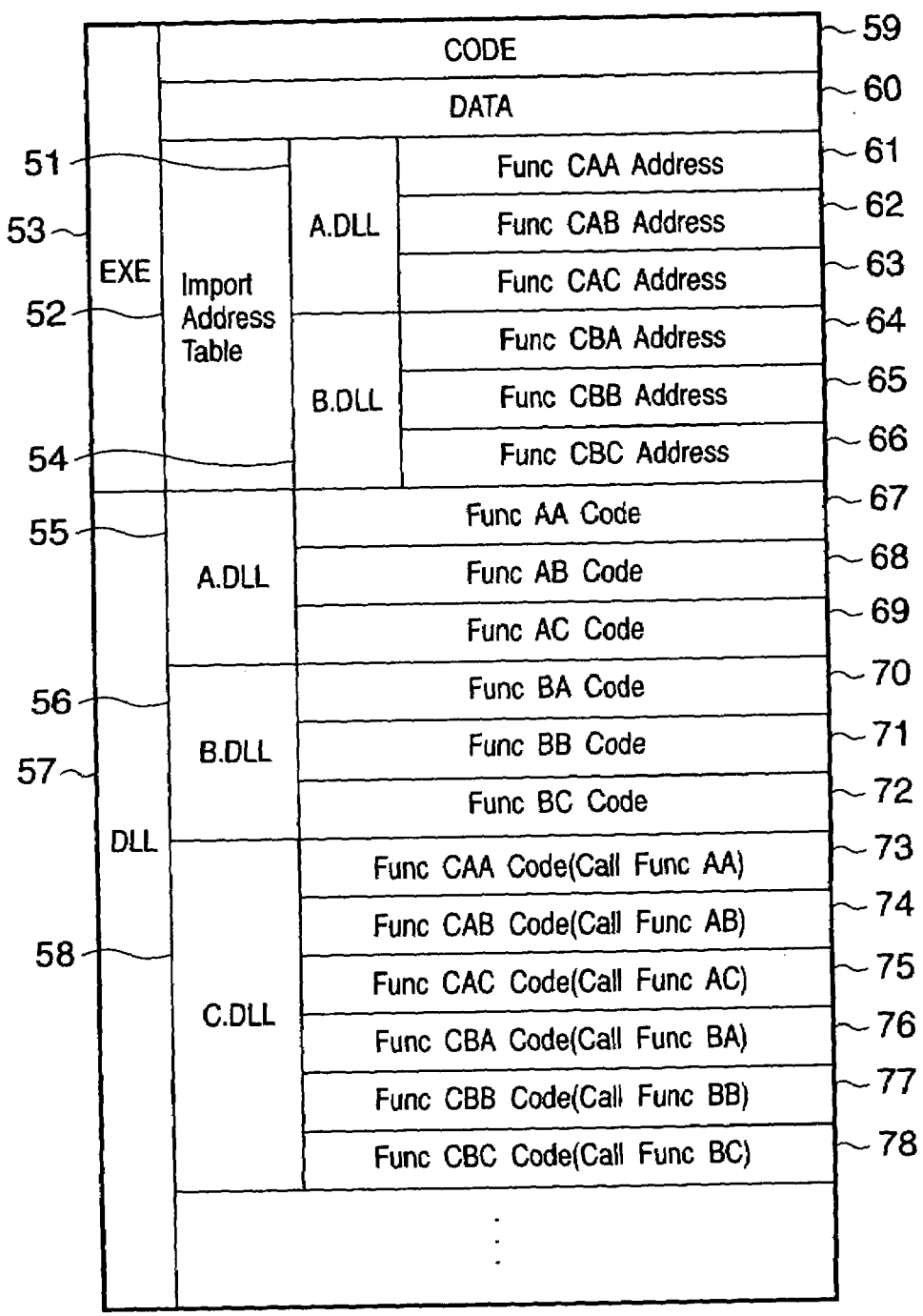
FIG. 3 shows an organization of the memory while using IAT Patch according to the first embodiment.

FIG. 3 shows an organization of the memory according to the first embodiment. This organization differs from the one shown in FIG. 2 in that a technology called IAT Patch (Import Address Table Patch) is used with log acquisition codes to redirect function calls.

When log acquisition is initiated, C.DLL (58), which is a DLL for the IAT Patch is loaded in the memory. C.DLL changes the addresses of functions written in the import function address table (52) to the addresses (61 to 66) of log acquisition codes, Func CAA, Func CAB, Func CAC, Func CBA, Func CBB, and Func CBC, in C.DLL. The codes Func CAA, Func CAB, Func CAC, Func CBA, Func CBB, and Func CBC in C.DLL (73 to 78) perform logging and calls the corresponding functions, Func AA, Func AB, Func AC, Func BA, Func BB, and Func BC (67 to 72) loaded in the memory for responding to the function calls.

Figure 4B:
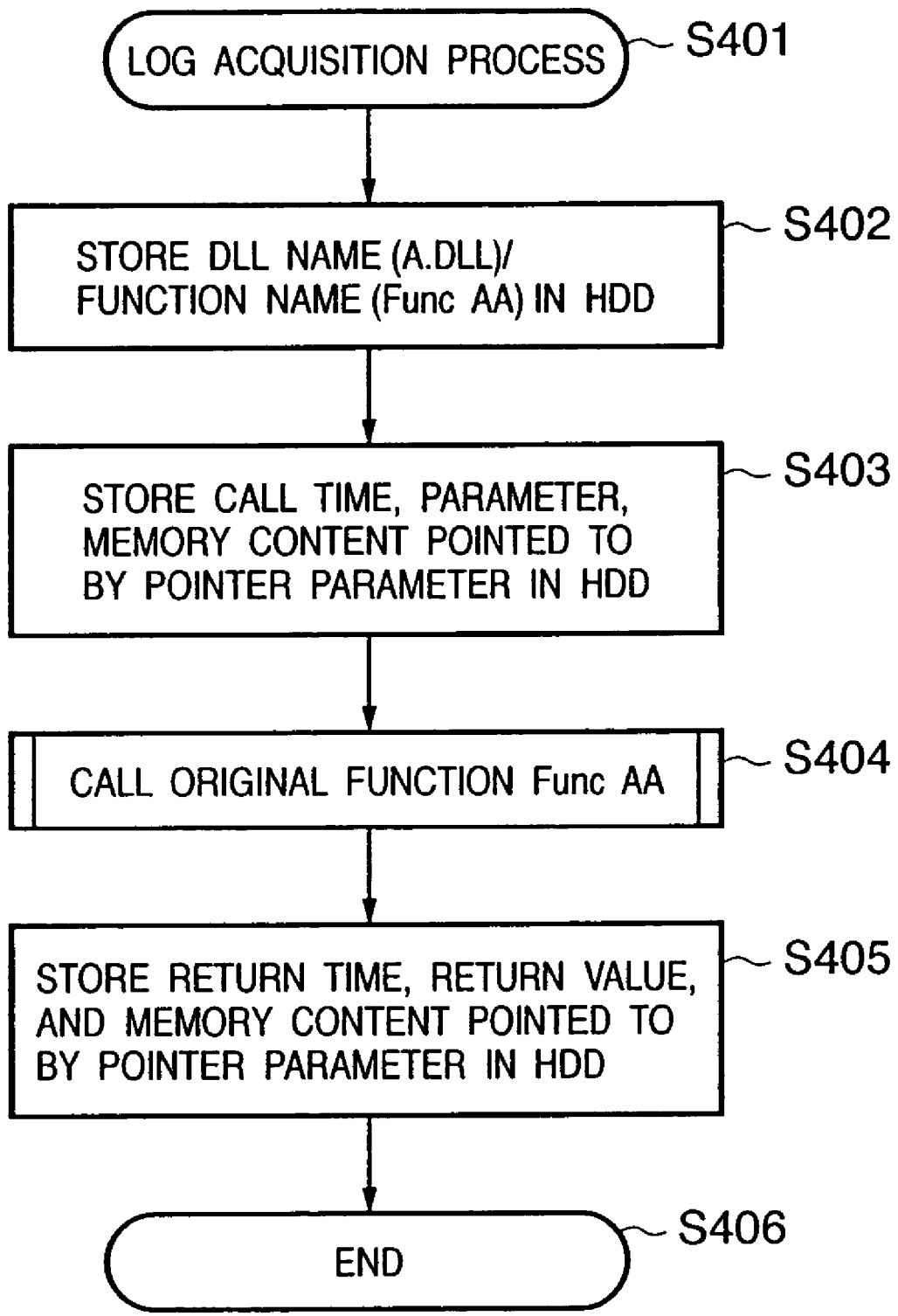
FIG. 4B shows a flowchart of a process for acquiring a log according to the first embodiment.

FIG. 4A shows an IAT Patch process performed in the example shown in FIG. 3. FIG. 4B is a flowchart of a log acquisition process. For simplicity, the figures show how the log acquisition code works with IAT Patch when the EXE calls Func AA in A.DLL.

When the EXE (91) calls Func AA (94), the log acquisition code in C.DLL stores the DLL name/function name (step S402) in C.DLL, the call time, and parameter used in the call in the memory and stores the memory content pointed to by a pointer parameter used in the call in another memory (95 and step S403). C.DLL then calls Func AA in A.DLL (93), which is intended to be called (96 and step S404). When the Func AA process (96) in A.DLL ends and control is returned to C.DLL (98), C.DLL stores the return time and return value in memory and stores the memory content pointed to by the pointer parameter in the return in another memory. Then C.DLL writes the log information it has stored into a file (100 and step S405). The control then returns to the EXE as if Func AA in A.DLL was completed in a conventional way (101).

Figure 5:
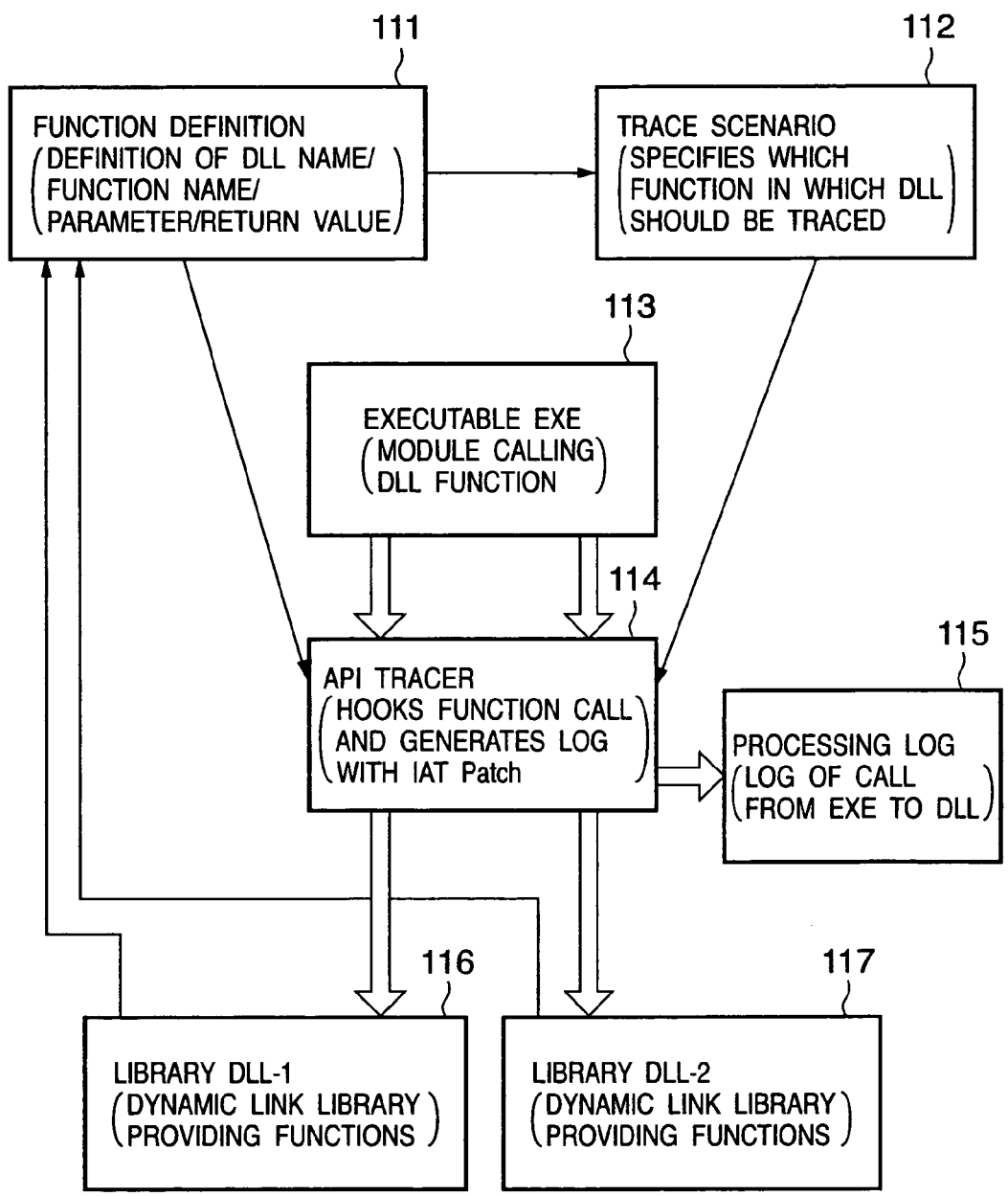
FIG. 5 shows an internal configuration while using the IAT Patch according to the first embodiment.

FIG. 5 shows an internal configuration of the software evaluation system that implements the log acquisition method according to the first embodiment. Conventionally, an executable EXE (113) calls a function in DLL-1 (116) or DLL-2 (117). In this method, in contrast, a log acquisition code called an API tracer (114) is embedded to generate a processing log (115). The API tracer (114) operates according to a file (111) that describes definitions of functions in DLL-1 or DLL-2 and a setting scenario (trace scenario) that specifies which function in which DLL in an import function table should be rewritten to obtain a log.

Acquisition of Log Concerning Method Process

Described below is how an executable file EXE (113) is loaded in a memory in the software evaluation system implementing the log acquisition method according to the first embodiment when an instance of an interface exported in a COM (Component Object Model) server. In order to explain this, how it is ordinarily loaded will first be described in FIG. 6.

Figure 6:
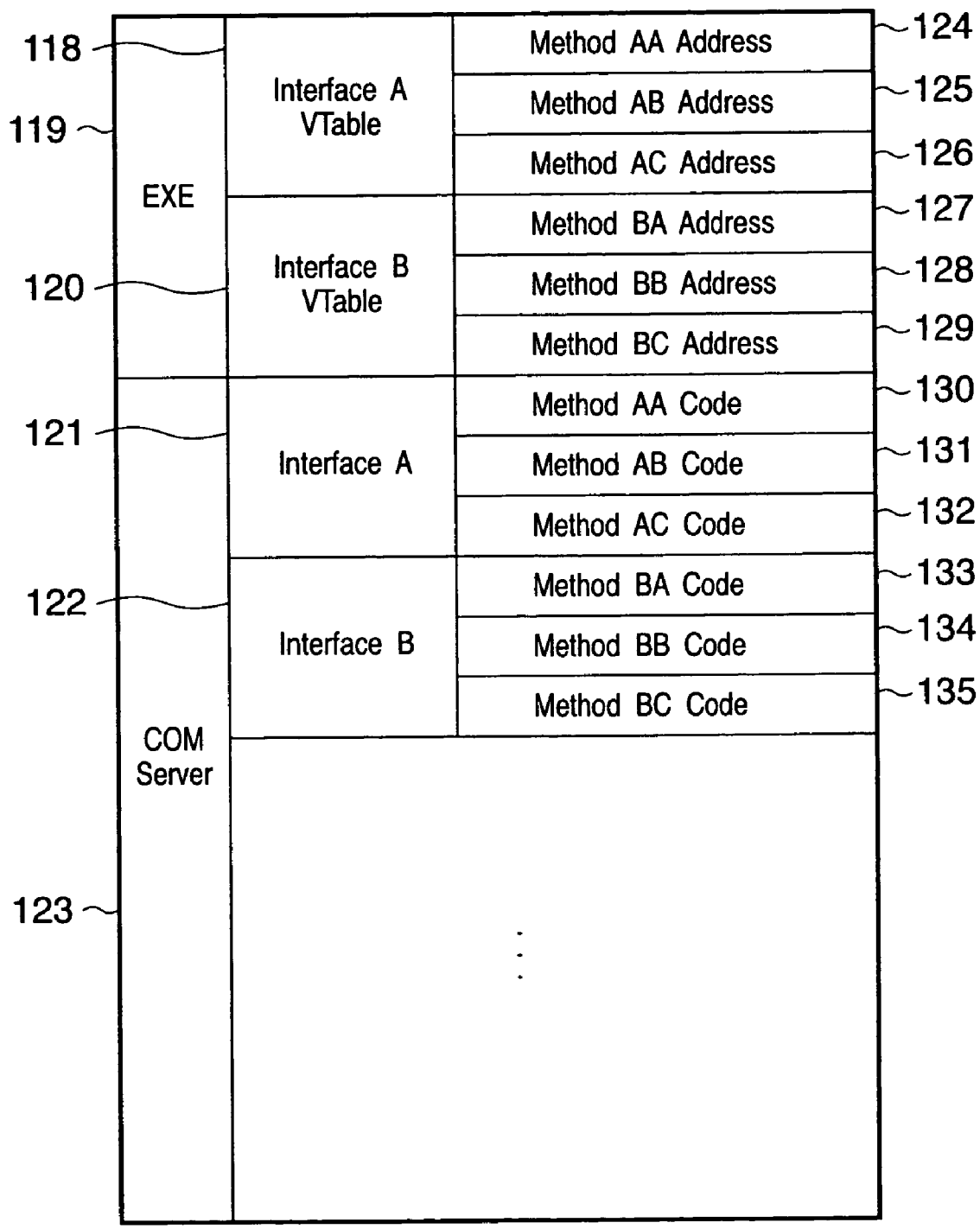
FIG. 6 shows an ordinary memory organization while an instance of COM server interface is generating according to the first embodiment.

When an instance of an interface is generated, the requested interface (121, 122) and its methods (130 to 135, programs describing procedures to be performed by objects in object-oriented programming) are ordinarily generated in the COM server. Both of them are loaded in a memory. A virtual address table (118, 120) is generated for each interface generated and provided to the EXE that has issued the request for generation of the instance. The generated addresses (124 to 129) of methods are contained in the virtual address table. The EXE uses this information to issues a call to each interface. Shown in FIG. 6 is an example in which the EXE (119) generates instances of two interfaces, Interface A (121) and Interface B (122), and uses methods in these interface. Specifically, Method AA, Method AB, Method AC, Method BA, Method BB, and Method BC (130 to 135) are used.

When a code of the EXE calls Method AA, the address (124) of Method AA is first read from the virtual address table. Actually written in the virtual address table is the address of the Method AA code (130) generated as part Interface A in the COM server. The EXE code can call Method AA of Interface A by calling that address.

Figure 7:
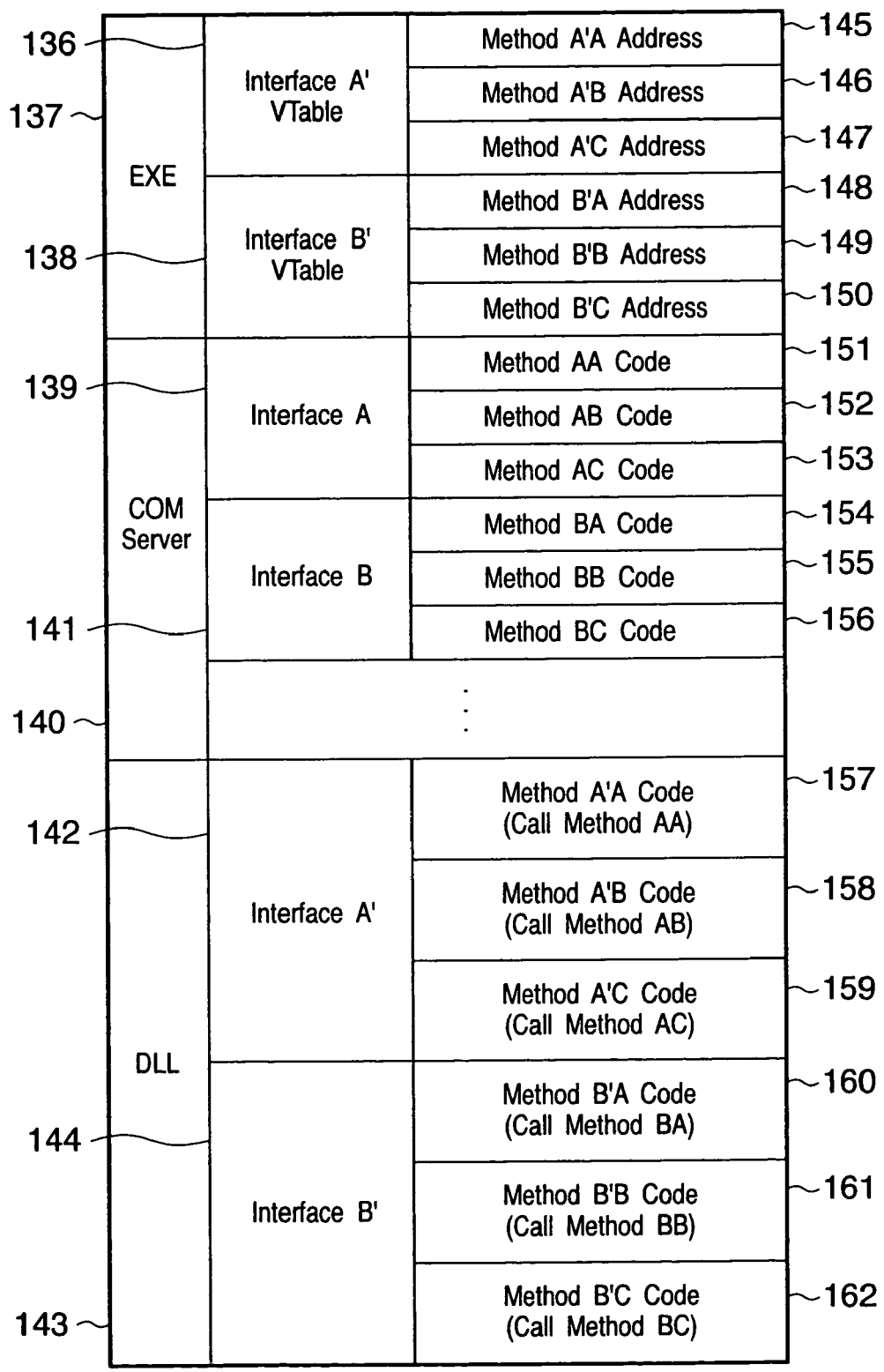
FIG. 7 shows a memory organization according to the first embodiment while using VTable Patch.

FIG. 7 shows an organization of the memory of the software evaluation system according to the first embodiment. This organization differs from the one shown in FIG. 6 in that a technique called VTable Patch (virtual address table patch) is used with a log acquisition code to redirect a method call.

When log acquisition is initiated, a DLL (143) for VTable Patch is loaded in the memory. The DLL changes the addresses of the methods contained in the virtual address table (136, 138) to the addresses (145 to 150) of Method A'A, Method A'B, Method A'C, Method B'A, Method B'B, and Method B'C that are log acquisition codes in DLL. The codes Method A'A, Method A'B, Method A'C, Method B'A, Method B'B, and Method B'C (157 to 162) in the DLL (143) perform logging and call the corresponding methods, Method AA, Method AB, Method AC, Method BA, Method BB, and Method BC (157 to 162).

Figure 8B:
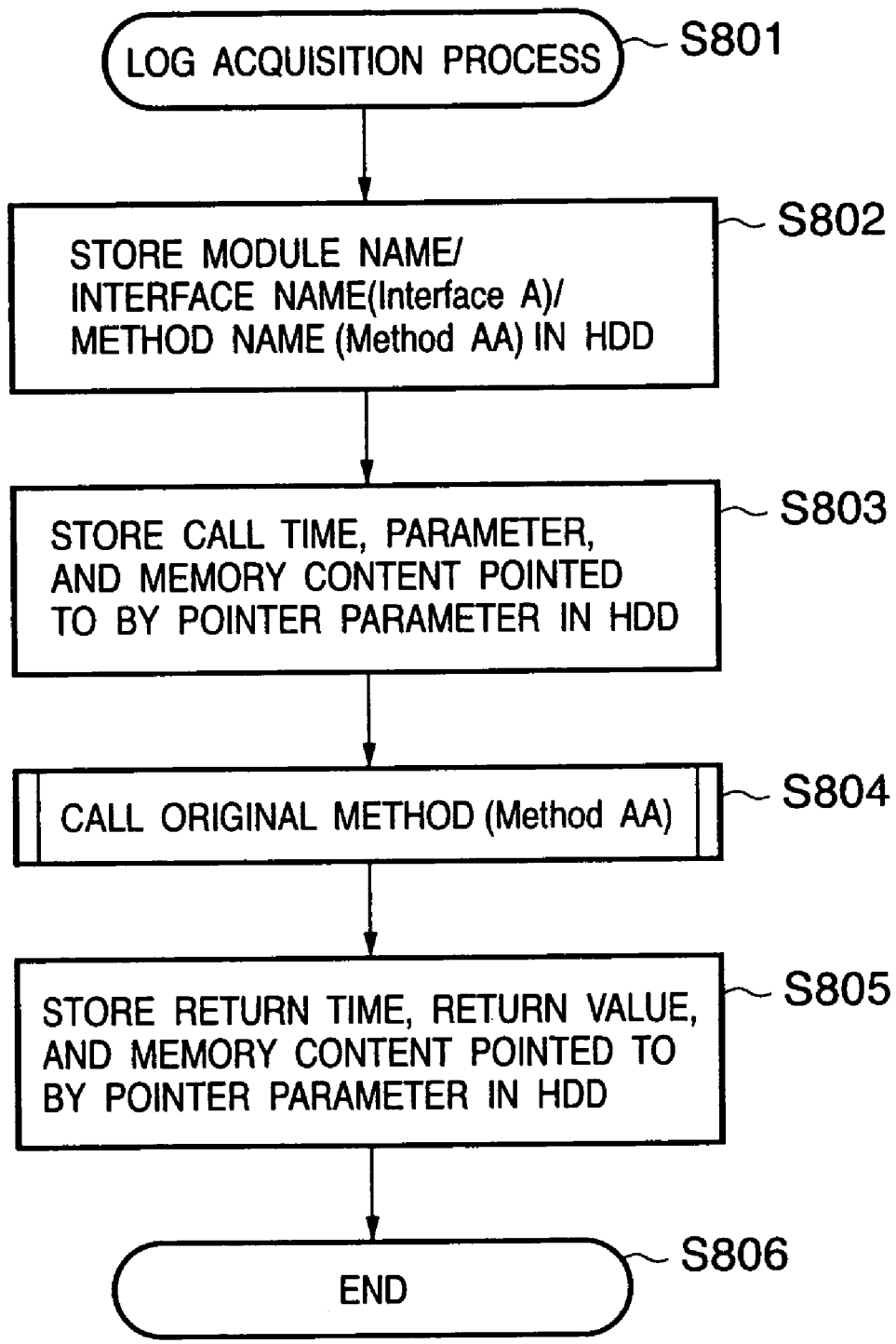
FIG. 8B shows a flowchart of a process for acquiring log according to the first embodiment.

FIG. 8A shows a flowchart of a process of VTable Patch in FIG. 7. FIG. 8B shows a flowchart of a log acquisition process. For simplicity, the figures show how the log acquisition code works with VTable Patch when the EXE calls Method AA in Interface A in the COM server.

When the EXE (163) calls Method AA (166), a log acquisition code in the DLL (164) stores the module name/interface name/method name in the DLL (step S1802), the call time, parameters used in the call in memory and stores the memory content pointed to by a pointer parameter in another memory (167 and step S803). The DLL (164) then calls Method AA in the COM server (165) which is intended to be called (168 and step S804). When Method process AA (169) in COM server (165) comes to an end and control returns to the DLL (170), the DLL (164) stores the return time and return value in the memory and the memory content pointed to by the pointer parameter at the return time in another memory (171). The DLL then write the log information it stored in a file (172 and step S805) and returns the control to the EXE (163) as if Method AA in the COM server (165) ended in a conventional way (171).

Figure 9:
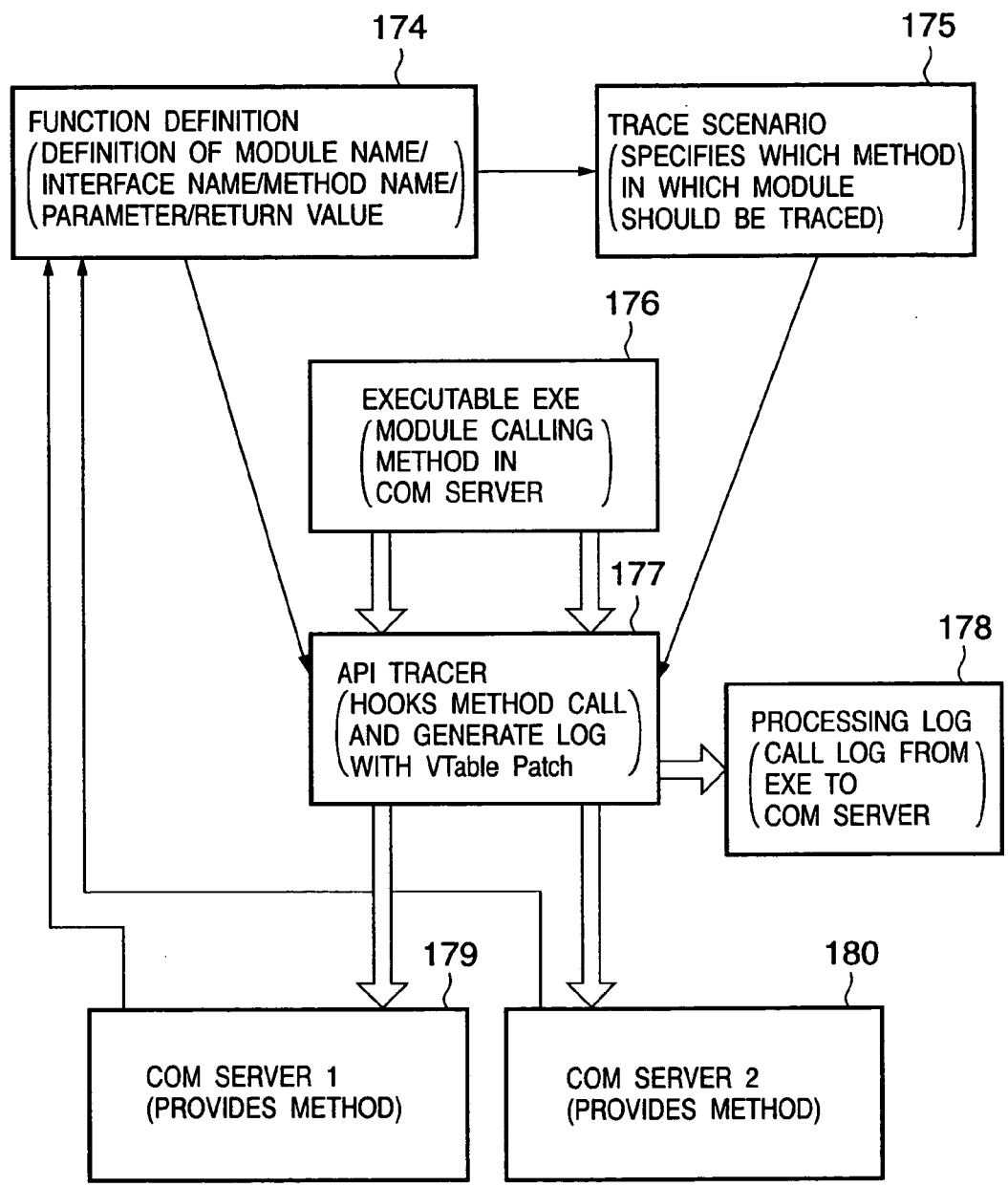
FIG. 9 shows an internal configuration of the software evaluation system according to the first embodiment.

FIG. 9 shows an internal configuration of the software evaluation system according to the first embodiment. Conventionally, an executable EXE (176) calls a method in the COM server 1 (179) or COM server 2 (180). In this method, in contrast, a log acquisition code called an API tracer (177) is embedded to generate a processing log (178). The API tracer (177) operates according to a file (174) that describes definitions of functions in the COM server 1 (179) or COM server 2 (180) and a setting scenario (175) that specifies which method in which interface in which COM server in a virtual address table should be rewritten to obtain a log.

As can be seen from the foregoing description, the log acquisition method according to the present embodiment for acquiring processing logs of software separated into a plurality of modules enables a function/method call provided in a module to be logged without modifying the module itself, thereby reducing workload for obtaining the processing logs. Furthermore, logs generated can be acquired as chronological logs, facilitating analysis of the logs and consequently reducing the number of man-hours needed for identifying the cause of software failure.

Second Embodiment

A second embodiment of the present invention will be described below in which pointer parameter data in binary that cannot be acquired with conventional method.

FIG. 10 shows an example of function definitions in a software evaluation system according to the second embodiment. The definitions are written in widely used IDL. A type library file that is tokenized IDL is used as a function definition file in the software evaluation system implementing the log acquisition method according to the second embodiment.

FIG. 11 shows description written in IDL for acquiring pointer parameter data in a log form by specifying binary acquisition in pointer parameters in function definitions according to the present embodiment.

In the definition of the function FuncBinidIs, custom (PAT_PARAM_ATTR_ID, "binid_is ( )") is declared for long*lplparam (201), where PAT_PARAM_ATTR_ID (200) is an identifier used in IDL by the software evaluation system. The definition of "binid_is ( )" stores data of a size equal to the size of a data type (long type in this example) of this parameter on the basis of a pointer pointed to by this parameter in a log as binary data.

In the definition of the function FuncSizeIs, custom (PAT_PARAM_ATTR_ID, "size_is(dwCount)") is declared for int*lplparam (202). The definition "size_is(dwCount)" specifies that the data size of this parameter is dwCount, which is its first parameter. "dwCount×the size of parameter data type (int type in this example)" of data are stored in the log as binary data from the pointer pointed to by this parameter.

In the definition of the function FuncLengthIs, custom (PAT_PARAM_ATTR_ID, "length_is(dwLength)") is declared for char*lpszparam (203). The definition "length_is (dwLength)" specifies that this parameter should have data of size dwLength, which is its first parameter. "dwLength× the size of parameter data type (char in this example)" of data is stored as binary data in the log from the pointer pointed to by this parameter.

In the definition of the function FuncBytesIs, custom (PAT_PARAM_ATTR_ID, "bytes_is(dwSize)") is declared for void*lpParam (204). The definition "bytes_is(dwSize)" specifies that the data size of this parameter is dwSize, which is the first parameter, in bytes. The dwSize bytes of data are stored as binary data in the log from pointer pointed to by this parameter.

In the definition of the function FuncBytesIs2, custom (PAT_PARAM_ATTR_ID, "bytes_is(12)") is declared for void*lpParam (205). The definition "bytes_is(12)" specifies that this parameter should have data of 12 bytes specified. Twelve bytes of data are stored in the log as binary data from the pointer pointed to by this parameter.

Figure 12:
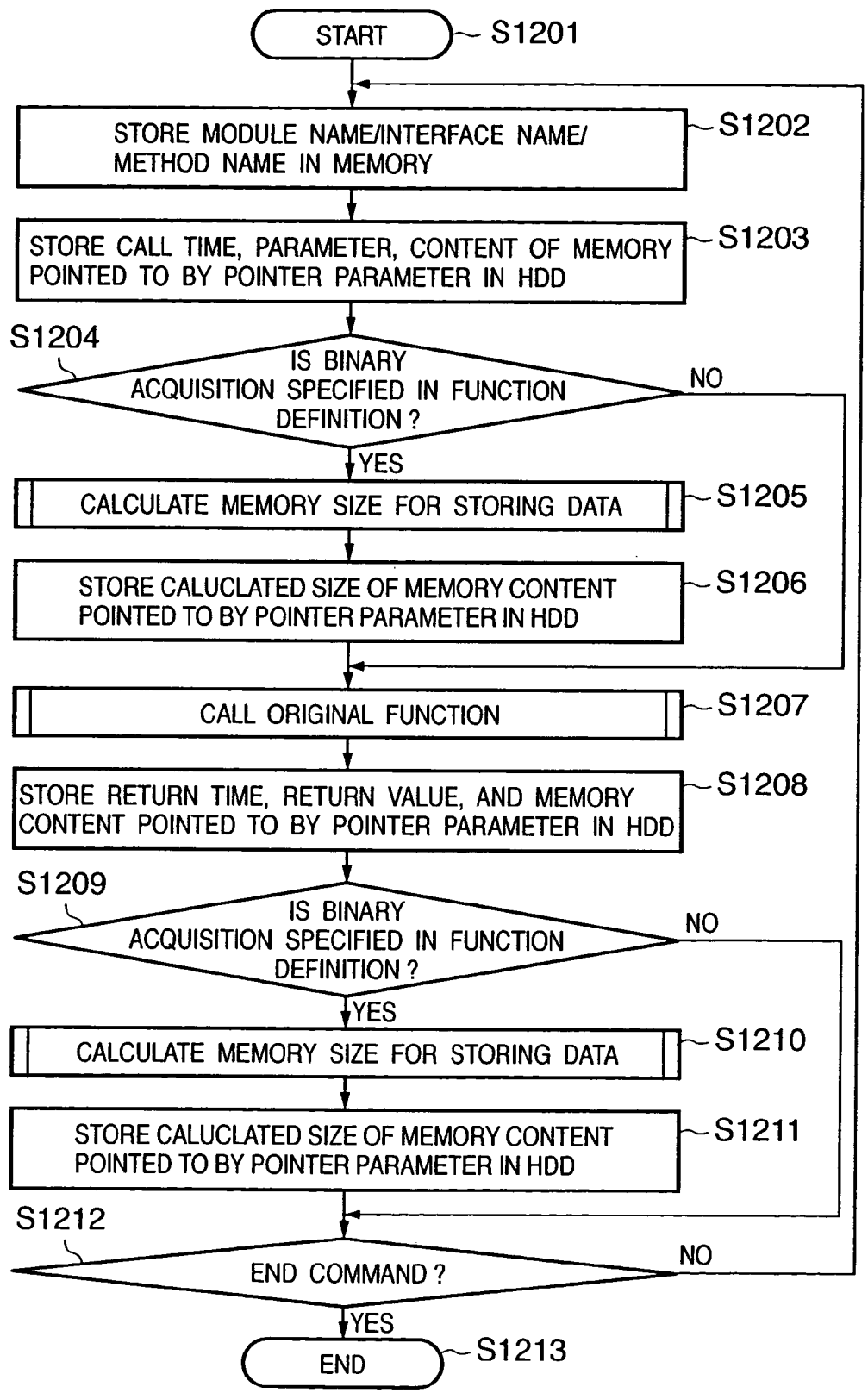
FIG. 12 shows a flowchart of a process for acquiring a log according to the second embodiment.

FIG. 12 shows a flowchart of a process for acquiring a log in the software evaluation system according to the second embodiment when the functions are defined as shown in FIG. 11.

When the process starts (step S1201), log acquisition is initiated and the module name, interface name, function/method name are stored in the HDD (step S1202). Then the call time, a parameter, and, memory content pointed to by a pointer parameter are stored in the HDD (step S1203). It is determined whether or not binary acquisition is specified in the function definitions (step S1204) and, if so, the memory size required for storing the data is calculated for each of the definitions (binid_is, size_is, length_is, and bytes_is) (step S1205) and the calculated size of the data in the memory pointed to by the pointer parameter is stored in the HDD (step S1206). Then the original function is called (step S1207). After returning from the function, the log acquisition code stores the return time, return value, and the content in memory pointed to by the pointer parameter in the HDD (step S1208). Then it determines whether binary acquisition is specified in the function (step S1209) and, if so, calculates the memory size required for storing the data for each of the definitions (binid_is, size_is, length_is, and bytes_is) (step S1210) and stores the calculated size of the data in the memory pointed to by the pointer parameter in the HDD. Then the original function is called (step S1211). This process will end when an end command is provided by the user (step S1212).

FIG. 13 shows log data acquired in accordance with the definitions in FIG. 11 in the software evaluation system according to the second embodiment.

A log (210) excluding Data ID can be acquired when no binary acquisition is specified in function definitions. If binary acquisition is specified, DataId and binary data log (211) can be obtained. Compared with the log of FuncSizeIs acquired with specification of binary acquisition, the log of FuncSizeIs acquired without specification of binary acquisition provides only one piece of int-type data pointed to by the pointer parameter IpParam. However, the data actually points to 10 pieces of int-type data. Thus, 4 bytes (int-type data size)×10=40 bytes in total can be acquired when binary acquisition is set.

As can be seen from the forgoing description, the pointer parameter data that cannot otherwise be acquired can be acquired in binary in a logged manner by associating sizes with the pointer parameters according to the second embodiment.

Third Embodiment

A third embodiment will be described in which an unexported function such as a callback function is obtained as a log.

FIG. 14 shows a description in IDL for acquiring functions such as a callback function that are not exported in function definitions according to the third embodiment.

In the definition of the function SetCallBack, custom (PAT_PARAM_ATTR_ID, "funcname_is(FuncCallBack)") is declared for DWORD pfnFuncCallBack (221). The function SetCallBack sets a callback function for a module. DWORD pfnFuncCallBAck is a parameter for setting the address of that callback function. The definition "funcname_is(FuncCallBack)" causes the log acquisition process to recognize a value provided to this parameter as the address of the FuncCallBack function (222) and replace it with an address for acquiring the log. The original value is stored for the purpose of calling the original callback function during the acquisition of the log. This allows the log of the unexported callback function to be acquired.

In the definition of the function GetFuncPointer, custom (PAT_PARAM_ATTR_ID, "funcname_is(FuncInternal") is declared for DWORD pfnFuncInternal (223). The function GetFuncPointer is a function for acquiring the pointer of a function in a module that has not been exported. DWORD pfnFuncInternal is a parameter for acquiring the pointer of an unexported function. The definition "funcname_is(FuncInternal)" causes the log acquisition process to recognize a value provided to this parameter as the address of the function FuncInternal (224) and replace it with an address for acquiring the log. The original value is stored for the purpose of calling the original callback function during the acquisition of the log. This allows the log of the function in the module that has not been exported to be acquired.

The function GetFuncPointeArray (225) is a function for acquiring the address of an array of functions in the module that have not been exported and placing them in the structure FUNCPOINTERARRAY (220). Here, custom(PAT_PARAM_ATTR_ID, "funcInternal_is(FuncInternal 1–4)") is declared for the definition of each member of the FUNCPOINTERARRAY. The definition "funcname_is (FuncInternal 1–4)" causes the log acquisition process to recognize a value provided to the members of the structure as the address of the functions FuncInternal 1–4 (226) and replace it with an address for acquiring the log. The original value is stored for the purpose of calling the original, unexported function during the acquisition of the log. This allows the log of the unexported function in the module to be acquired.

FIG. 15 shows a memory organization in the software evaluation system according to the third embodiment. This organization differs from the one shown in FIG. 3 in that codes for acquiring the log of hidden functions are added. FuncAD (231) in A.DLL is a function that has not been exported and therefore is not contained in the Import Address Table (230). If funcname_is is defined for FuncAD, FuncCAD (232) is generated in C.DLL for acquiring the log and the address of FuncCAD is used for replacing a parameter value defined in funcname_is, which returns the address of FuncAD.

Figure 16:
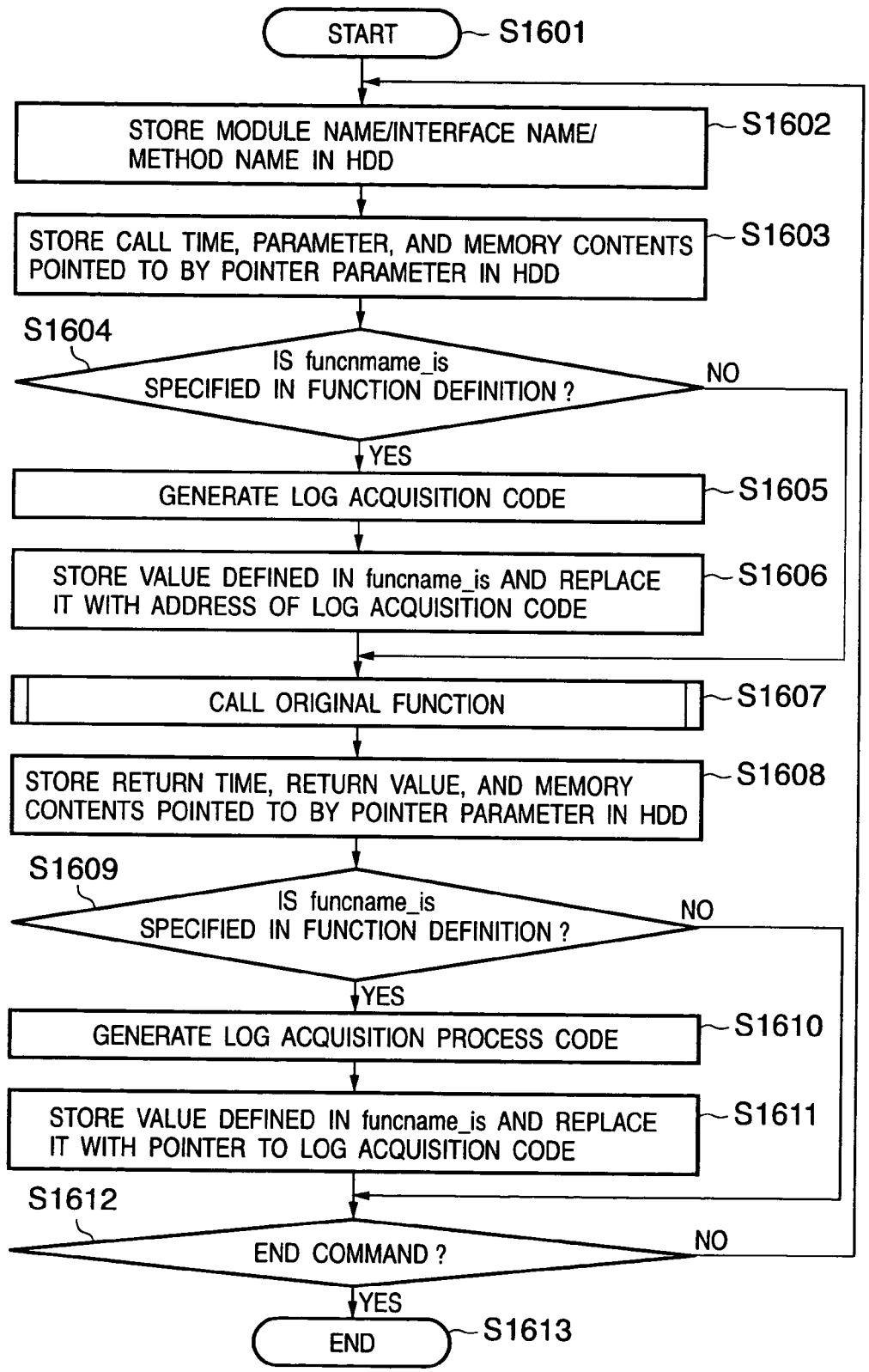
FIG. 16 shows a flowchart of a process for acquiring a log according to the third embodiment.

FIG. 16 shows a flowchart of a process for acquiring a log in the software evaluation system according to the third embodiment when the functions are defined as shown in FIG. 14.

When the process starts (step S1601), the log acquisition is initiated and the module name, interface name, function/method name are stored in the HDD (step S1602). Then the call time, a parameter, and contents pointed to by the pointer parameter are stored in the HDD (step S1603). It is determined whether or not funcname_is is specified in the function definitions (step S1604) and, if so, the function definition defined in funcname_is is obtained form a function definition file and a code for log acquisition is generated according to that definition (step S1605). Then the value defined in funcname_is is stored and replaced with the address of the log acquisition code generated (step S1606).

The original function is then called (step S1607). After returning from the function, the log acquisition code stores the return time, return value, and the content in memory pointed to by the pointer parameter in the HDD (step S1608). Then it determines whether binary acquisition is specified in the function (step S1609) and, if so, obtains the definition of the function defined in funcname_is from a function definition file and generates a code for log acquisition according to the definition (step S1610). Then it stores the value defined in funcname_is and replaces it with the address of the log acquisition code generated (step S1611). This process will end when an end command is issued by the user (step S1612).

Once the parameter set in funcname_is has been replaced with the address of the log acquisition code generated, the original function called by using that address is treated in a similar manner in which an ordinary log is treated (that is, the generated log acquisition code calls an unexported function, causes it to be executed, receives the result of execution, passes the result to the original function, and logs information concerning the call to the unexported function and information concerning the reception of the results of the execution).

FIG. 17 shows log data acquired in the software evaluation system according to the third embodiment when the definitions shown in FIG. 14 are not provided. No log of unexported internal functions can be acquired if log acquisition for them is not set in a function definition file.

FIG. 18 shows log data acquired from the definitions shown in FIG. 14 in the software evaluation system according to the third embodiment. The logs of unexported functions, such as SetCallBack, FuncInternal, and FuncInternal4 can be acquired because settings for acquiring the callback functions and unexported internal functions are provided in a function definition file.

Thus, the third embodiment has the advantage that the logs of unexported functions which cannot otherwise be acquired can be acquired.

Fourth Embodiment

A fourth embodiment will be described in which a log of a variable-length array parameter, which cannot be acquired with conventional methods, is obtained.

FIG. 19 shows a description in IDL for acquiring a log of a variable-length array parameter according to the fourth embodiment.

In the definition of the function FuncArrayIs, custom (PAT_PARAM_ATTR_ID, "array_is(dwCount)") is declared for int*lpParam (240). The definition "array_is (dwCount)" specifies that this pointer parameter is an int-type array and the number of elements of the array is equal to dwCount, which is the first parameter. The pointer pointed to by this pointer parameter is treated as an array of dwCount number of int-type data elements and the data is stored in the log.

FIG. 20 shows a flowchart of a process for acquiring a log in the software evaluation system when a function is defined as shown in FIG. 19.

When the process starts (step S2001), the log acquisition is initiated and the module name, interface name, function/method name are stored in the HDD (step S2002). Then it is determined whether or not variable-length array acquisition (array_is) is set in the function definitions (step S2003). If so, the parameter defined by the pointer parameter is treated as definition of an array (step S2004) and the call time, parameter, and the content pointed to by the pointer parameter are stored in the HDD (step S2005). Then the original function is called (step S2006). After returning from the function, the log acquisition code determines whether or not variable-length array acquisition (array_is) is set in the function definitions (step S2007) and if so, the parameter defined by the pointer parameter is treated as definition of an array (step S2008) and the return time, the return value, and the memory content pointed to by the pointer parameter in the HDD (step S2009). The process will end when an end command is provided by the user (step S2010).

FIG. 21 shows log data (250) acquired without the definition shown in FIG. 19 and log data (251) acquired with the definitions shown in FIG. 19 in the software evaluation system according to the fourth embodiment. When the definitions are not made in the function definition file, only the first data for each parameter is acquired in log data (250) because pointer parameters cannot be treated as an array. In contrast, when the definitions are not made in the function definition file, the pointer parameters are treated as arrays and therefore all data in the arrays are obtained in log data (251).

In this way, the fourth embodiment provides the advantage that a log of variable-length parameters, which is a function log that cannot be obtained with conventional methods.

Fifth Embodiment

A fifth embodiment will be described in which a log of a function that cannot be acquired with conventional methods, is acquired.

FIG. 22 shows an example of a function which is used in the software evaluation system according to the fifth embodiment and for which parameters cannot be obtained with conventional function definitions.

Three structures, STRUCTSIZE1, STRUCTSIZE2, and STRUCTSIZE3, are defined. The DWORD dwSize member of each structure should contain the size of that structure. The first parameter dwKind of the FuncGetData function should indicate the pointer of one of the three structures that is passed to the second parameter lpBuf. The FuncGetData function treats lpBuf as the pointer to STRUCTSIZE1 if the first parameter is 1, or as the pointer to STRUCTSIZE2 if the first parameter is 2, or as the pointer to STRUTCTSIZE3 if the first parameter is 3. If the FuncGetData were defined with a conventional function definition, lpBuf would be a void-type pointer and consequently no data can be obtained.

Figure 23:
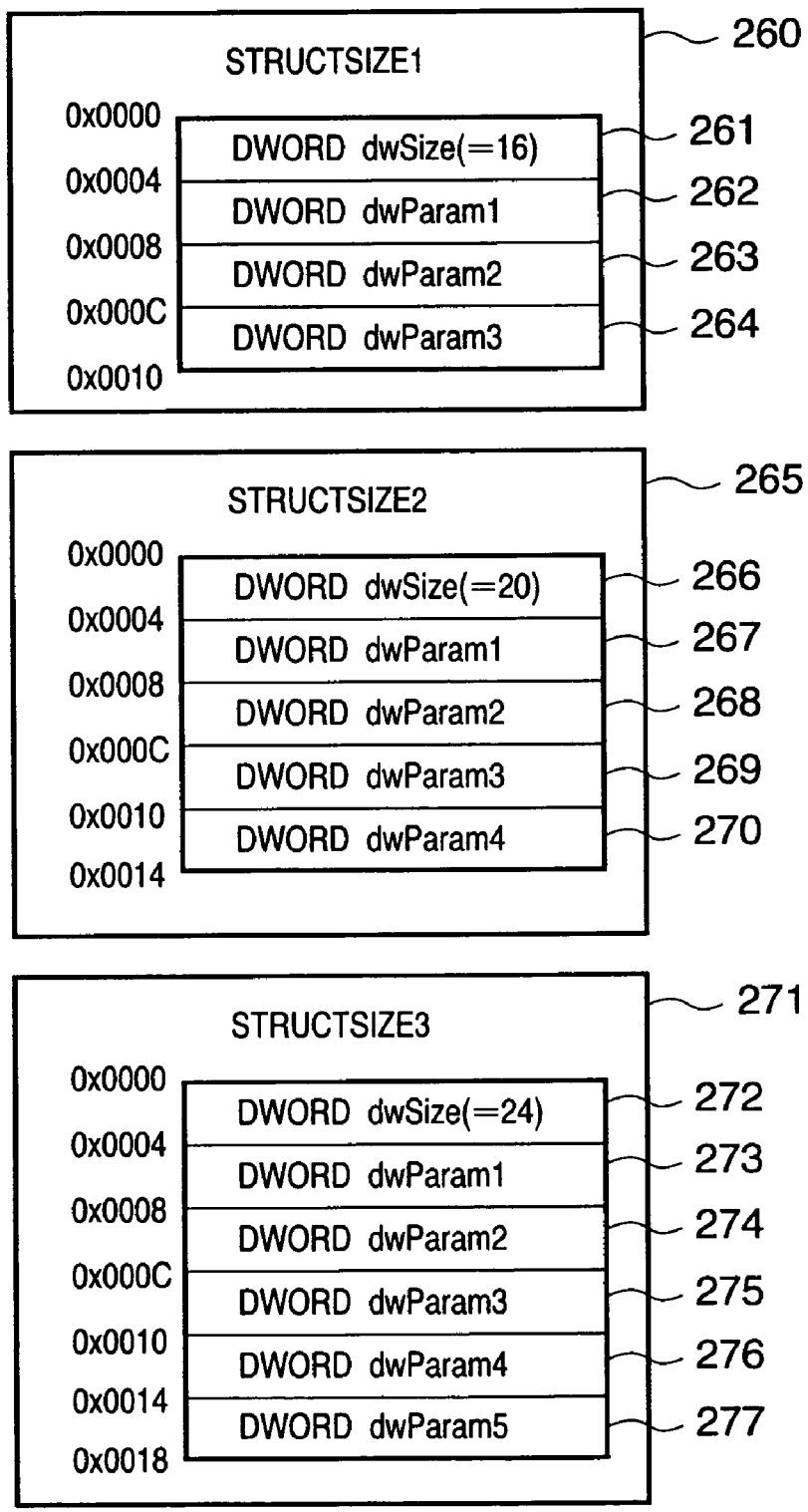
FIG. 23 shows how structures use memory.

FIG. 23 shows how memory is used by each of the structures STRUCTSIZE1, STRUCTSIZE2, and STRUCTSIZE3 in FIG. 22. The STRUCTSIZE1 (260) has a member DWORD dwSize (261) at offset 0x000, DWORD dwParam1 (262) at 0x0004, DWORD dwParam2 (263) at 0x0008, and DWORD dwParam3 (264) at 0x000C. The structure STRUCTSIZE 2 (265) has DWORD dwSize and DWORD dwParam1–DWORD dwParam3 (266–269) at the same offsets as those for the members of STRUCTSIZE1 and, in addition, DWORD dwParam4 (270) at 0x0010. STRUCTSIZE3 (271) has DWORD dwSize and DWORD dwParam1–DWORD dwParam4 (272–276) at the same offsets as the members of STRUCSIZE2 and, in addition, DWORD dwParam5 (277) at 0x0014. As just described, the memory locations of the dwSize-dwParam4 of STRUCTSIZE3 are the same as those of STRUCTSIZE2 and the memory locations of the dwSize-dwParam3 are the same as those of STRUCTSIZE1.

FIG. 24 shows a description in IDL for acquiring a log of parameters of the function as shown in FIG. 22 in the software evaluation system according to the fifth embodiment.

The separate structures STRUCTSIZE1, STRUCTSIZE2, and STRUCTSIZE 3 in the original function are defined as a single structure (291). The definition is the same as that of STRUCSIZE3 because STRUCTSIZE3 has the memory locations that overlap the memory locations of STRUCTSIZE1 and STRUCTSIZE2. [custom (PAT_PARAM_ID, "structsize_is ( )") is set for the DWORD dwSize member of the this structure, which indicates the size of the structure (290). This allows the log acquisition process to obtain the size of the structure during data analysis of the structure. The second parameter lpBuf in the FuncGetData function is defined as the STRUCTSIZE type (292). This causes the parameter is treated as the STRUCTSIZE type when it is stored as a log. If this technique were not used and a description were provided in a function definition file in such a manner as to obtain data on STRUCTSIZE3, a call to GetFuncData with dwKind=1 or 2 would cause an memory exception because data on STRUCTURESIZE1 or STRUCTSIZE2 exists and a log acquisition process would attempt to acquire the log of dwParam3 or dwParam4 data.

Figure 25:
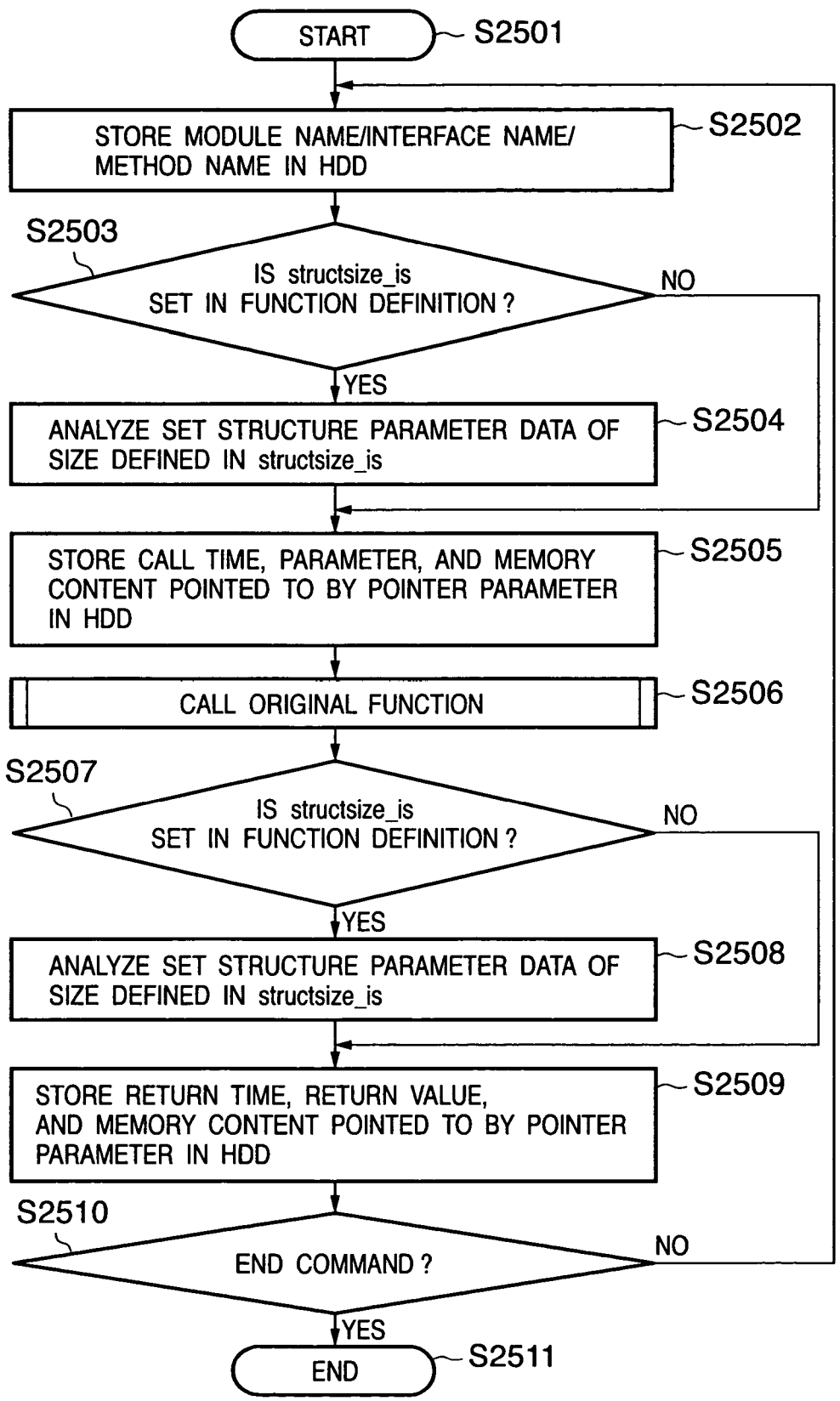
FIG. 25 shows a flowchart of a process for acquiring a log according to the fifth embodiment.

FIG. 25 shows a flowchart of a process for acquiring a log in the software evaluation system according to the fifth embodiment when the function are defined as shown in FIG. 24.

When the process starts (step S2501), log acquisition is initiated and the module name, interface name, function/method names are stored in the HDD (step S2502). Then it is determined whether or not the size of the structure (structsize_is) of the structure is specified in the function definitions (step S2503). If so, set structure parameter data of the size defined in the size specification (structsize_is) is analyzed (step S2504). Then, the call time, parameter, and memory content pointed to by a pointer parameter are stored in the HDD (step S2505). Then the original function is called (step S2506). After returning from the function, the process determines whether or not the size of the structure (structsize_is) of the structure is specified in the function definitions (step S2507) and if so, the set structure parameter data of the size defined in the size specification (structsize_is) is analyzed (step S2508). Then the return time, return value, and the memory content pointed by the pointer parameter are stored in the HDD (step S2509). The process will end when an end command is provided by the user (step S2510).

FIG. 26 shows details of the structure parameter analysis performed in FIG. 25, on the basis of the memory locations.

When GetFuncData is used in an actual program with dwKind=1, the STRUCTSIZE1 structure (300) is used and the members (301–304) use memory as shown in FIG. 25. If the function definition shown in FIG. 24 has been provided, it is recognized as the STRUCTSIZE structure (305) in the software evaluation system and the members (306–311) may use memory as shown. If size specification (structsize_is) is set, the value of dwSize can be checked to know that the size of the structure is dwSize bytes and the dwsize bytes of data (302) is obtained as a log from STRUCTSIZE structure.

FIG. 27 shows log data obtained through the user of the definitions shown in FIG. 24 in the software evaluation system according to the fifth embodiment. Data on the structures that would be void* and only pointers would be able to be acquired with an ordinary function definition can be acquired as logs according to the types of the structures used.

Thus, the fifth embodiment has the advantage that a log of parameters that cannot be acquired with conventional methods can be acquired.

Sixth Embodiment

FIG. 28 shows an example of the functions that are used in the software evaluation system according to a sixth embodiment and of which parameters cannot be obtained with a conventional function definition.

Three structures STRUCTKIND1, STRUCTKIND2, and STRUCTKIND3 are defined. The first parameter dwKind of the FuncGetData function should indicates the pointer of one of the three structures that is passed to the second parameter lpBuf. The FuncGetData function treats lpBuf as the pointer to STRUCTKIND1 if the first parameter is 1, or as the pointer to STRUCTKIND2 if the first parameter is 2, or as the pointer to STRUICTKIND3 if the first parameter is 3. If the FuncGetData were defined with a conventional function definition, lpBuf would be a void-type pointer and consequently no data can be obtained.

Figure 29:
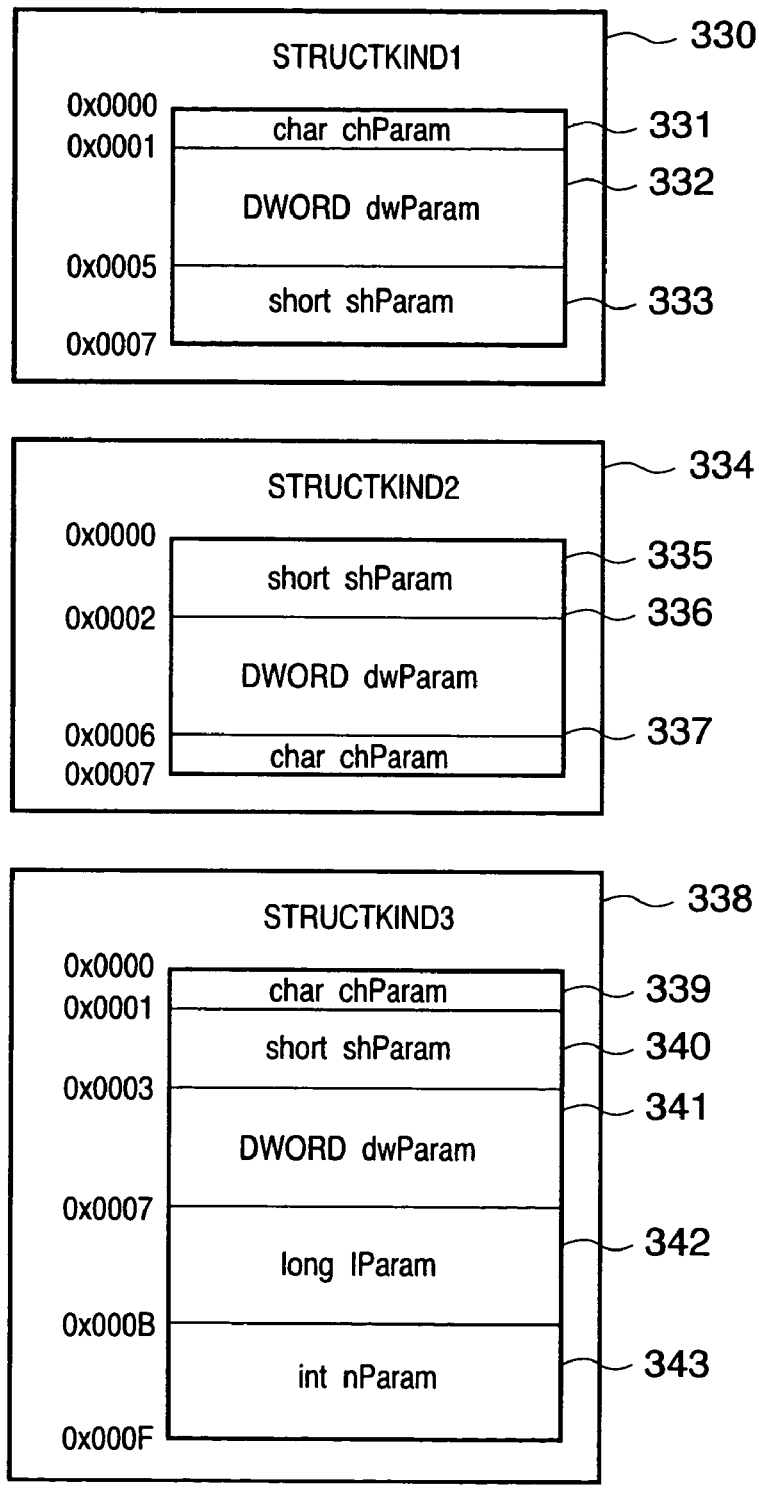
FIG. 29 shows how structures are located in memory.

FIG. 29 shows how memory is used by each of the structures STRUCTKIND1, STRUCTKIND2, and STRUCTKIND3. The STRUCTKIND1 (330) has a member char chParam (331) at offset 0x0000, DWORD dwParam (332) at 0x0001, and short shParam (333) at 0x0005. The structure STRUCTKIND2 (334) has a member short shParam (335) at offset 0x000, DWORD dwParam (336) at 0x0002, and char chParam (337) at 0x0006. The structure STRUCTKIND3 (338) has a member char chParam (339) at 0x0000, short shParam (340) at 0x0001, DWORD dwParam (341) at 0x0003, long lParam (342) at 0x0007, and int nParam at 0x000B. The structures include no size information and memory organizations for structure data differs from one structure to another. Therefore, the method described with respect to the fifth embodiment cannot be used.

FIG. 30 shows a description in IDL for acquiring a log of the parameters of the function shown in FIG. 28 in the software evaluation system according to the sixth embodiment.

The structures are defined with a conventional method. [custum(PAT_PARAM_ID, "structkind_is (dwKind: 1:STRUCTKIND1*, 2:STRUCTKIND2*, 3:STRUCTKIND3* )")] is set for the second parameter void*lpBuf of the FuncGetData function. This causes the lpBuf to be treated as the STRUCTKIND1* data type if the value of the first parameter dwKind is 1, or as STRUCTKIND2* if the value is 2, or as STRUCTKIND3* if the value is 3 and stored as a log.

Figure 31:
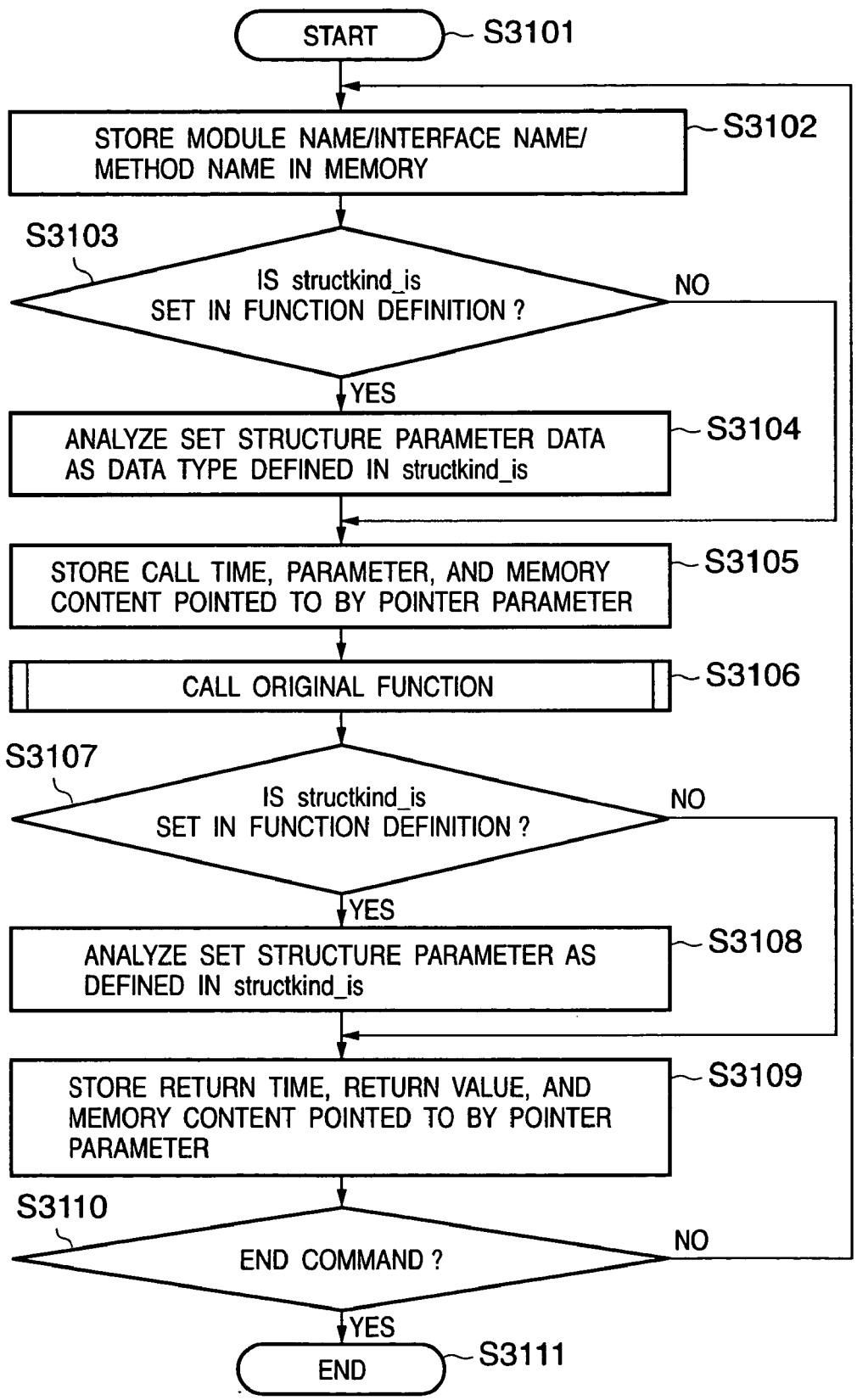
FIG. 31 shows a flowchart of a process for acquiring a log according to the sixth embodiment.

FIG. 31 shows a flowchart of a process for acquiring a log in the software evaluation system according to the sixth embodiment when the function is defined as shown in FIG. 30.

When the process starts (step S3101), log acquisition is initiated and the module name, interface name, function/method names are stored in memory (step S3102). Then it is determined whether or not structure type specification (structkind_is) is set in the function definition (step S3103). If it is set, the set structure parameter data is analyzed as the data type defined in the type specification (structkind_is) (step S3104). Then the call time, parameter, and memory content pointed to by a pointer parameter are stored in the memory (step S3105). Then the original function is called (step S3106). After returning from the function, the process determines whether or not structure type specification (structkind_is) is set in the function definition (step S3107). If it is set, the set structure parameter data is analyzed as the data type defined in the type specification (structkind_is) (step S3108). Then the return time, return value, and the memory content pointed to by the pointer parameter is stored in the memory (step S3109). The process will end when an end command is provided by the user (step S3110).

FIG. 32 shows log data acquired with the definitions shown in FIG. 30 according to the sixth embodiment. Data on the structures that would be void* and only pointers would be able to be acquired with an ordinary function definition can be acquired as logs according to the types of the structures used.

Thus, the sixth embodiment provides the advantage that a log of parameters that cannot be acquired with conventional method can be acquired.

Seventh Embodiment

Figure 33:
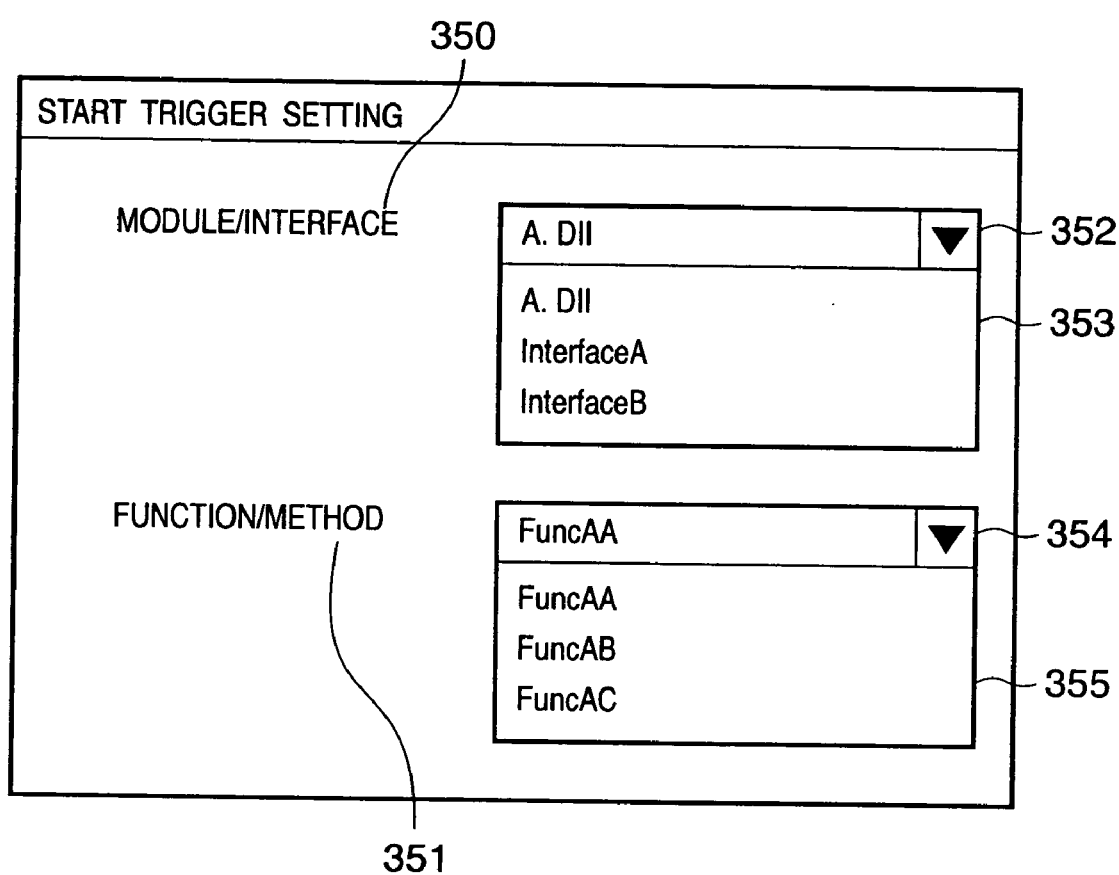
FIG. 33 shows a user interface for setting a function/method initiating a log acquisition process according to a seventh embodiment.

A user interface for making settings for log acquisition and a process performed according to information set through the user interface in a seventh embodiment. FIG. 33 shows a user interface setting functions/methods for initiating log acquisition according to the seventh embodiment.

The user interface includes a dropdown list (352, 353) of modules/interfaces (350) from which a user can select a module/interface the log of which is to be acquired and a dropdown list (354, 355) of functions/methods (351) exported in the selected module/interface, from which the user can select a function/method to be set as a log acquisition trigger.

Figure 34:
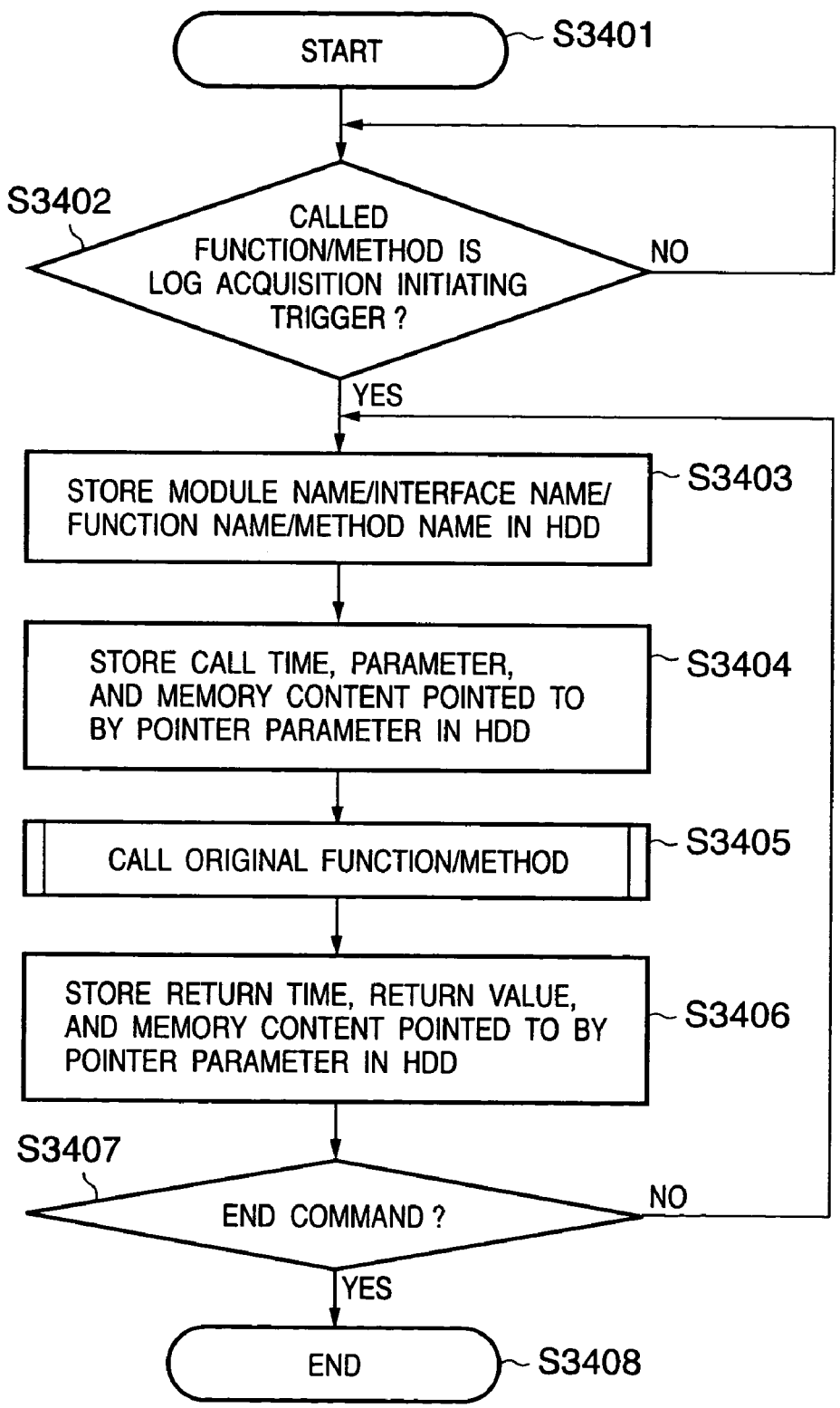
FIG. 34 shows a flowchart of a process for acquiring a log according to the seventh embodiment.

FIG. 34 shows a flowchart of a process for acquiring a log according to settings in the interface shown in FIG. 33 in the software evaluation system according to the seventh embodiment.

When the process is started (step S3401), the log acquisition code determines whether or not a called function/method is set as a log acquisition trigger (step S3402). If it matches the log acquisition trigger, the code starts log acquisition and stores the module name, interface name, function/method name in the HDD (step S3403). Then the log acquisition code stores the call time, parameter, and the memory content pointed by a pointer parameter in the HDD (step S3404) and calls the original function/method (step S3405). When returning from the function/method, the log acquisition code stores the return time, the return value, and the memory content pointed to by the pointer parameter in the HDD (step S3406). The process continues until an end command is provided by the user (step S3407) without making determination as to the log acquisition initiation trigger.

As can be seen from the forgoing description, the seventh embodiment provides the advantage that it allows the user to select any of functions/methods the log of which is to be acquired, thereby facilitating log analysis.

Eighth Embodiment

While it allows a user to select any function/method the log of which is to be acquired according to the seventh embodiment, it allows the user to select any function/method the log of which is to be stopped will be described in an eighth embodiment.

Figure 35:
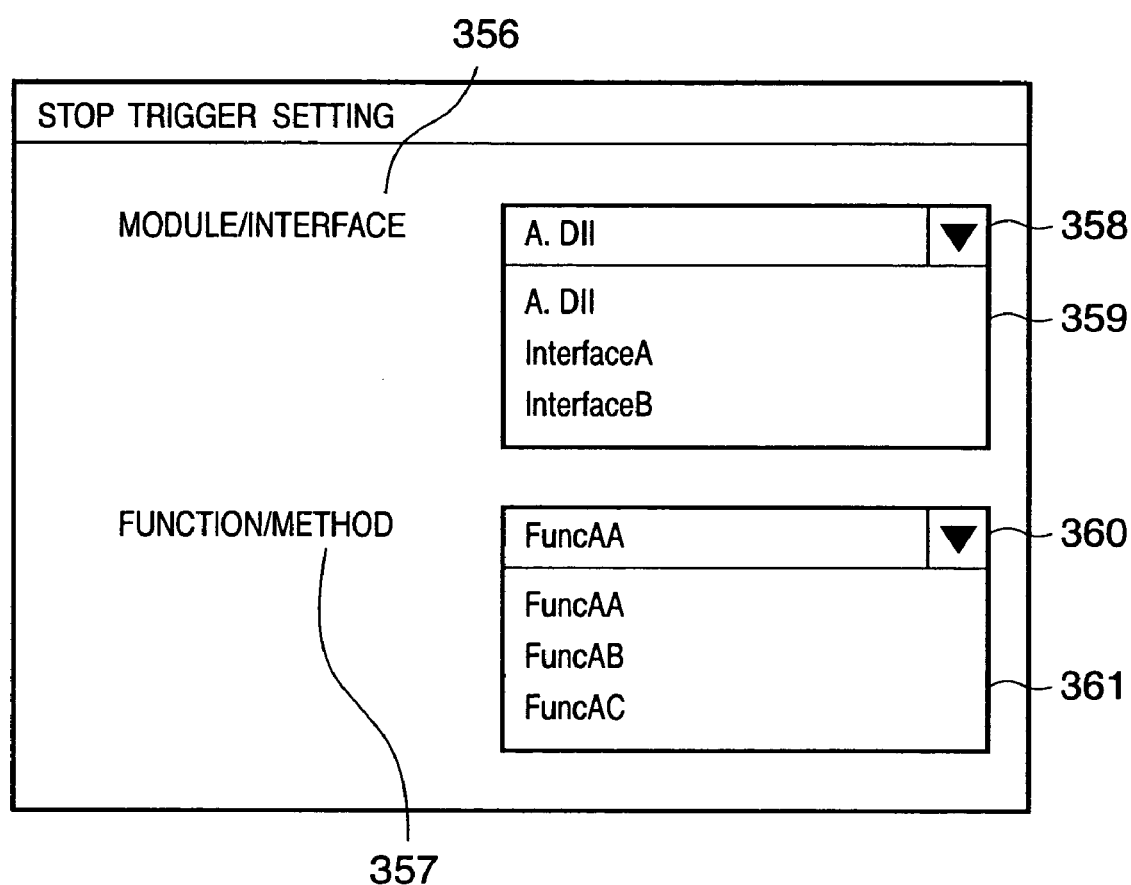
FIG. 35 shows a user interface for setting a function/method stopping log acquisition according to an eighth embodiment.

FIG. 35 shows a user interface for setting a function/method the log of which is to be stopped according to the eighth embodiment.

The user interface includes a dropdown list (358, 359) of modules/interfaces (356) from which a user can select a module/interface the log of which is to be acquired. It also includes a dropdown list (360, 361) of functions/methods (357) exported in the selected module/interface, from which the user can select a function/method to be set as a log acquisition stop trigger.

Figure 36:
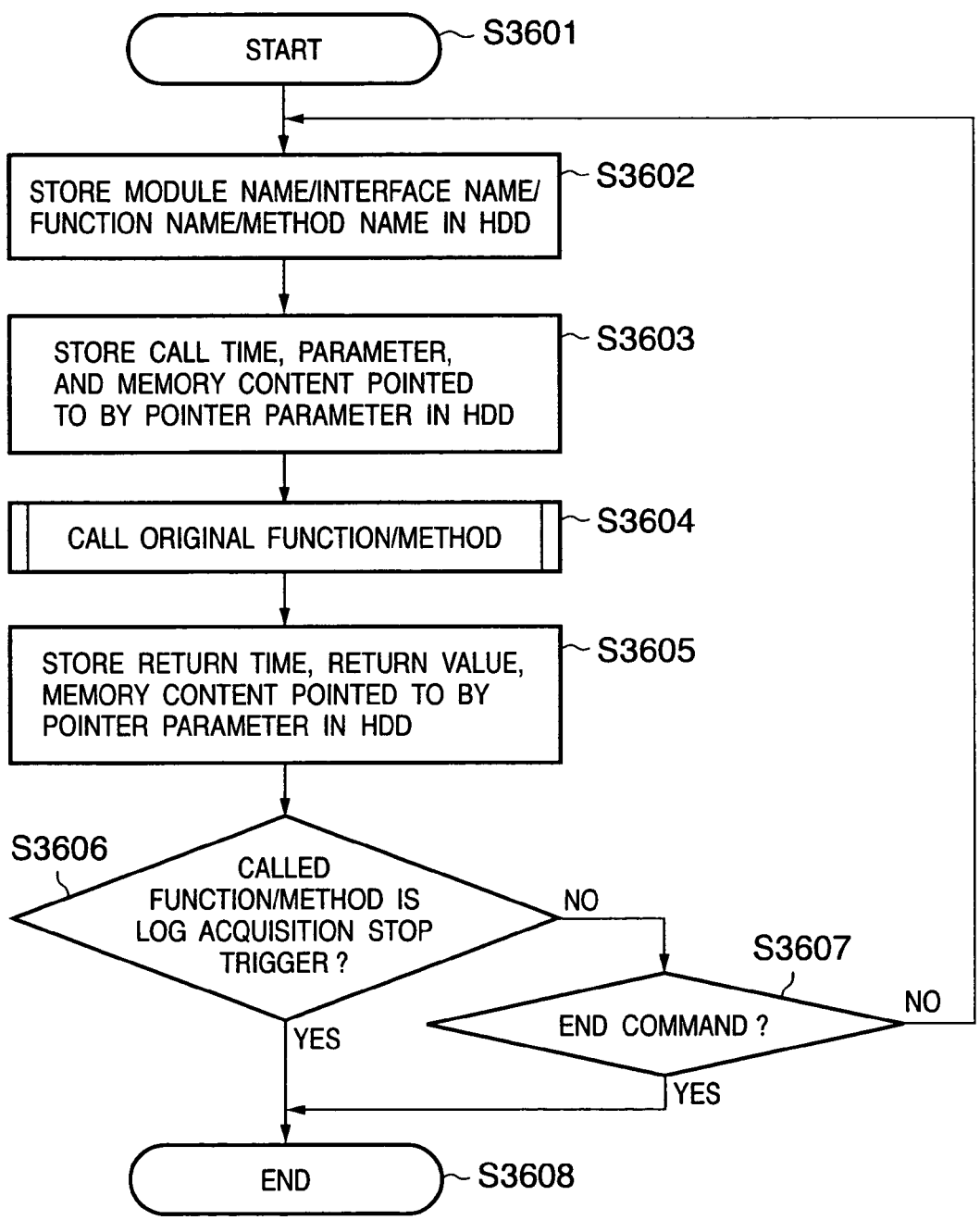
FIG. 36 shows a flowchart of a process for obtaining a log according to the eighth embodiment.

FIG. 36 shows a flowchart of a process for acquiring a log in accordance with settings in the interface shown in FIG. 35 in the software evaluation system according to the eighth embodiment.

When the process is started (step S3601), log acquisition is started and the module name, interface name, function/method name is stored in the HDD (step S3602). The log acquisition code then stores the call time, a parameter, and the memory content pointed to by a pointer parameter in the HDD (step S3603) and calls the original function/method (step S3604). When returning from the function/method, the log acquisition code stores the return time, the return value, and the memory content pointed to by the pointer parameter in the HDD (step S3605). Then it determines whether or not the called function/method is set as a log acquisition stop trigger (step S3606). If it matches the log acquisition stop trigger, the log acquisition process end (step S3607). If it does not match the log acquisition stop trigger, the process will end in response to an end command from the user (step S3606).

Thus, the eighth embodiment provides the advantage that the user can stop acquisition of the log of any set function/method and acquire only the log that the user wants to, thereby facilitating log analysis.

Ninth Embodiment

While the user interfaces described with respect to the seventh and eighth embodiments allow the user to select a function/method to start/stop acquisition of its log, log acquisition may be started/stopped only if any function/method selected by the user is terminated by an error.

Figure 37:
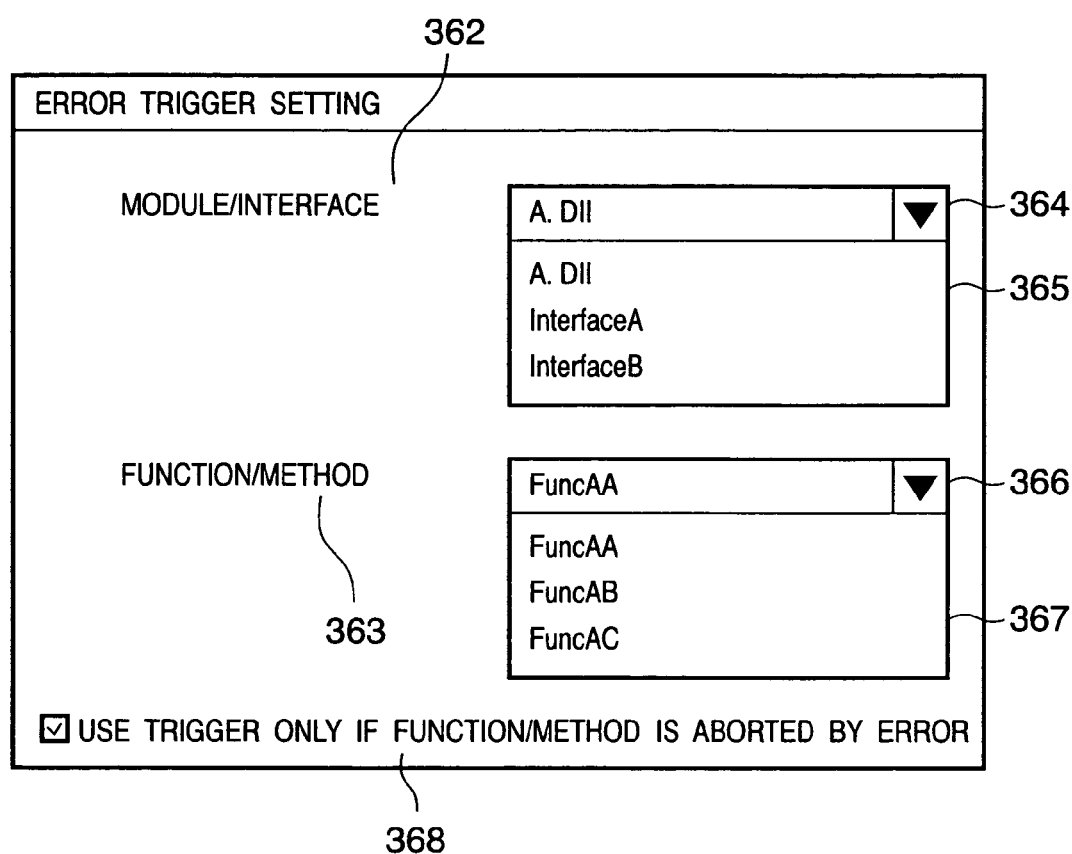
FIG. 37 shows a user interface to which a setting is added for using a trigger function in the event of abnormal end according to a ninth embodiment.

FIG. 37 shows a log acquisition start/stop user interface having an option added for using the trigger function (log acquisition start/stop function) only if the function/method is terminated by an error according to a ninth embodiment. This user interface can be applied to both interfaces shown in FIGS. 33 and 35.

The user interface includes a dropdown list (364, 365) of modules/interfaces (362) whose log can be acquired and from which a user can select a module/interface to set, a dropdown list (366, 367) of functions/methods (363) exported in the selected module/interface from which the user can select a function/method to set, and a check box (368) for activating a trigger function only if the function/method is terminated by an error.

FIG. 38 shows error definitions for functions/methods according to the ninth embodiment. The error definitions in the present embodiment take the form of files. Each file contains a parameter and return value of each function/method and its defined error condition.

FIG. 39 shows a flowchart of a process for acquiring a log in the software evaluation system according to the present embodiment. In this process, the function of using a trigger only when a log acquisition starts and an error occurs is specified in accordance with settings made in the interface shown in FIG. 37.

When the process is started (step S3901), the log acquisition code determines whether or not a function/method is set as a log acquisition trigger (step S3902). If it is set as the log acquisition initiation trigger, the log acquisition code temporarily stores the module name, interface name, function/method name in memory (step S3903).

The log acquisition code then temporarily stores the call time, a parameter, and the memory content pointed to by a pointer parameter in memory (step S3904) and calls the original function/method (step S3905). After returning from the method, the log acquisition code temporarily stores the return time, a return value, and a content pointed to by the pointer parameter in memory (step S3906).

Then the log acquisition code determines whether or not the log acquisition initiation trigger should be used only if an error occurs (step S3907) and, if so, determines whether or not the function/method has resulted in an error (step S3908). If no error has occurred, the log acquisition code discards the log it has temporarily stored in the memory (step S3909) and returns to the top of the process. On the other hand, if the function/method has resulted in an error, the code stores the log it has temporarily stored in the memory into the HDD (step S3910) and continues the ordinary log acquisition process (step S3911). The process continues until an end command is provided from the user (step S3912).

Figure 40:
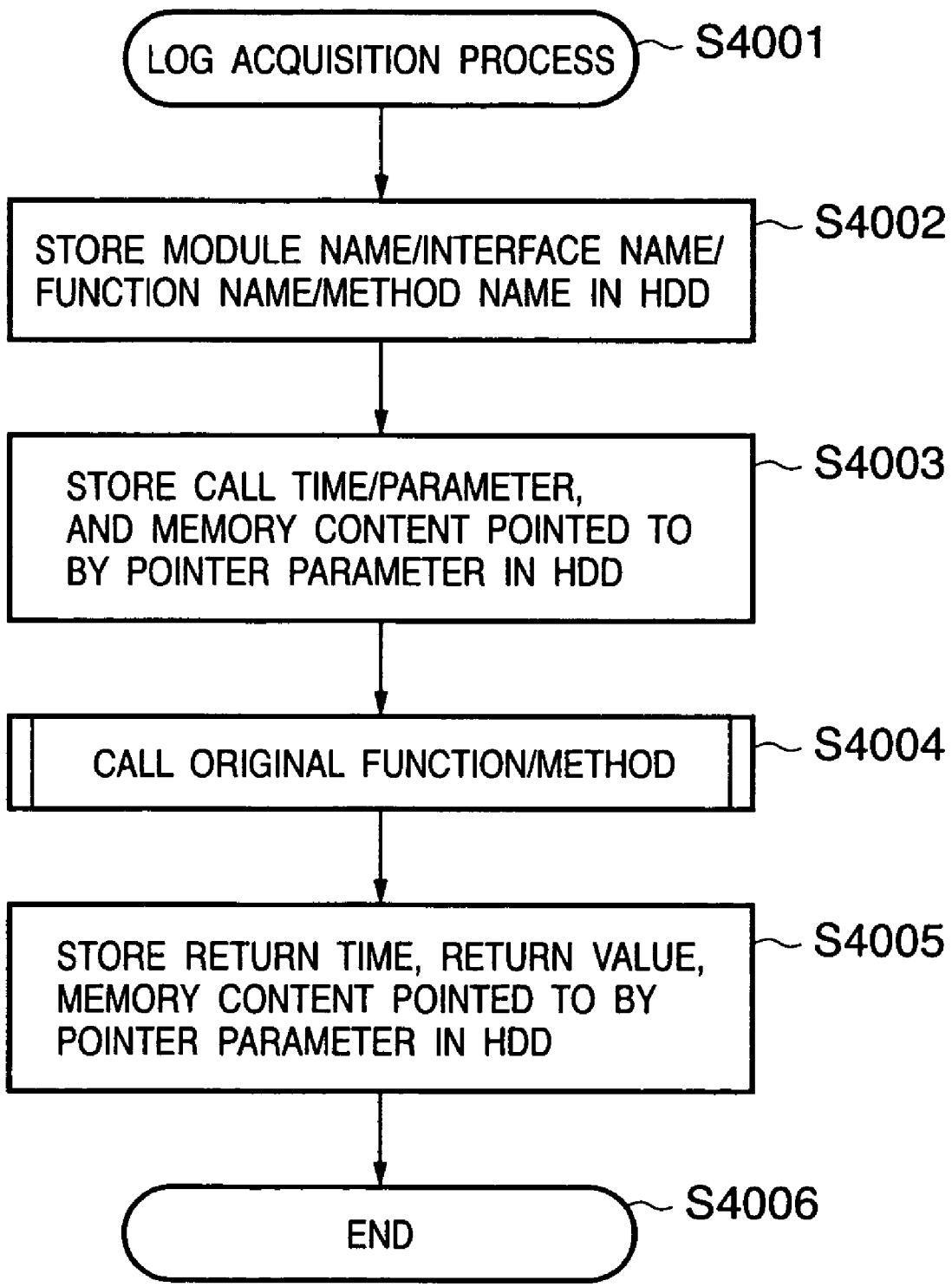
FIG. 40 is a flowchart showing details of the ordinary log acquisition process according to the ninth embodiment.

FIG. 40 shows details of the ordinary log acquisition process shown at step S3911 in FIG. 39.

When the process is started (step S4001), log acquisition starts and the module name, interface name, function/method name is stored in the HDD (step S4002). Then the log acquisition code stores the call time, a parameter, and the memory content pointed to by a pointer parameter in the HDD (step S4003) and calls the original function/method (step S4004). After returning from the function/method, the log acquisition code stores the return time, return value, and memory content pointed to by the pointer parameter in the HDD (step S4005).

Figure 41:
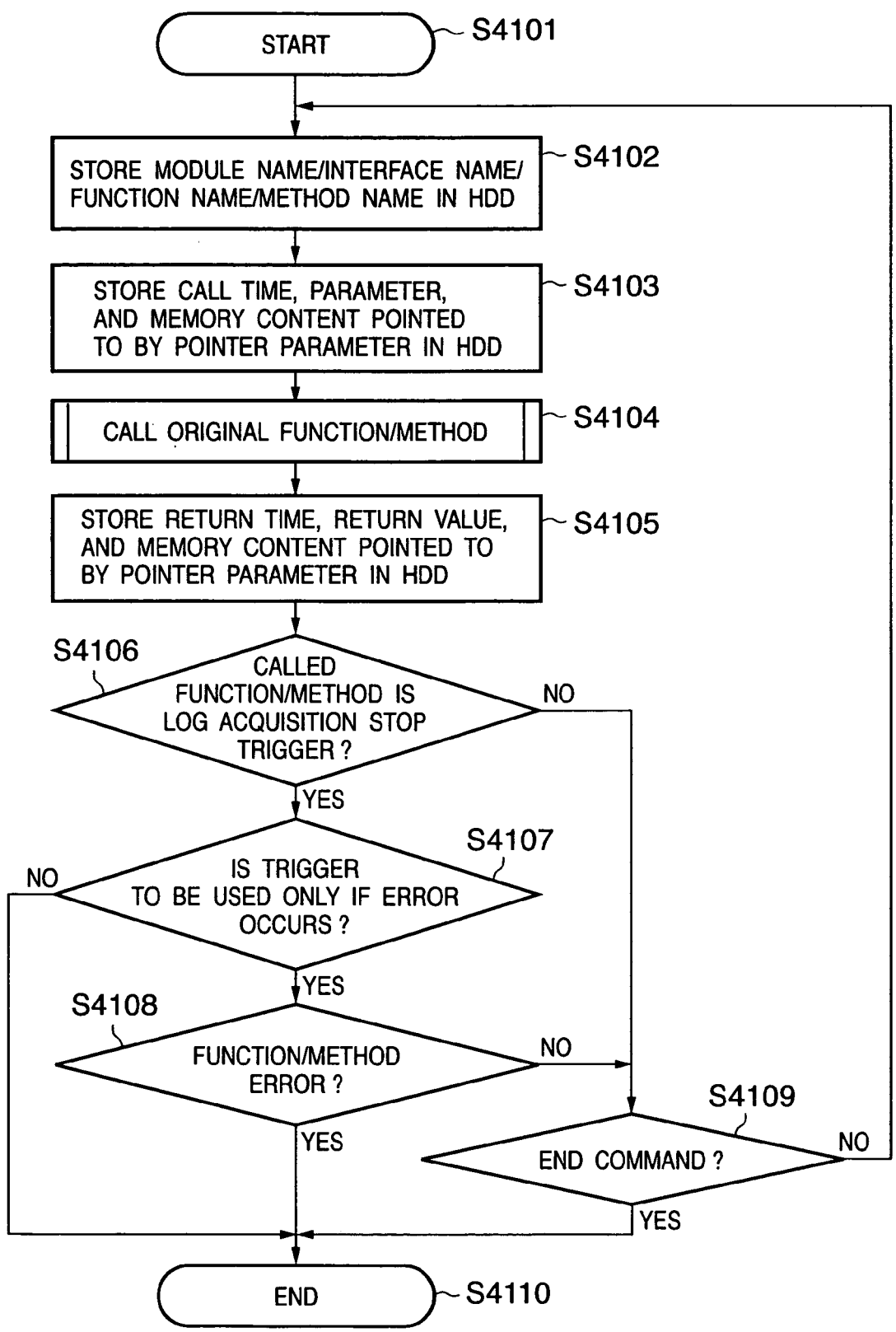
FIG. 41 shows a flowchart of a process for obtaining a log according to the ninth embodiment.

FIG. 41 shows a flowchart of a process for obtaining a log in the software evaluation system according to the present embodiment. In this process, the function of using a trigger only when a log acquisition stops and an error occurs is specified in accordance with settings in the interface shown in FIG. 37.

When the process is started (step S4101), log acquisition is started and the module name, interface name, function/method name are stored in the HDD (step S4102). The log acquisition code stores the call time, a parameter, and the memory content pointed to by a pointer parameter in the HDD (step S4103) and calls the original function/method (step S4104). After returning from the function/method, the log acquisition code stores the return time, return value, and memory content pointed to by the pointer parameter in the HDD (step S4105). It then determines whether or not the called function/method is set as a log acquisition stop trigger (step S4106). If it matches the log acquisition stop trigger, it determines whether or not the log acquisition stop trigger should be used only if an error occurs (step S4107) and, if so, it determines whether or not the function/method has resulted in an error (step S4108). If it has resulted in an error, the log acquisition process ends (step S4109). The process also ends when an end command is provided by the user (step S4110).

Thus, the ninth embodiment provides the advantage that log acquisition can be started or stopped when an error occurs in a given function/method and the user can acquired the log that the user wants to obtain, thereby facilitating log analysis.

Tenth Embodiment

While selectable functions/methods are arranged in a predetermined order in the user interfaces in the seventh to ninth embodiments, they may be displayed in a tree view that allows a user to readily determine the relationships among interfaces and methods.

Figure 42:
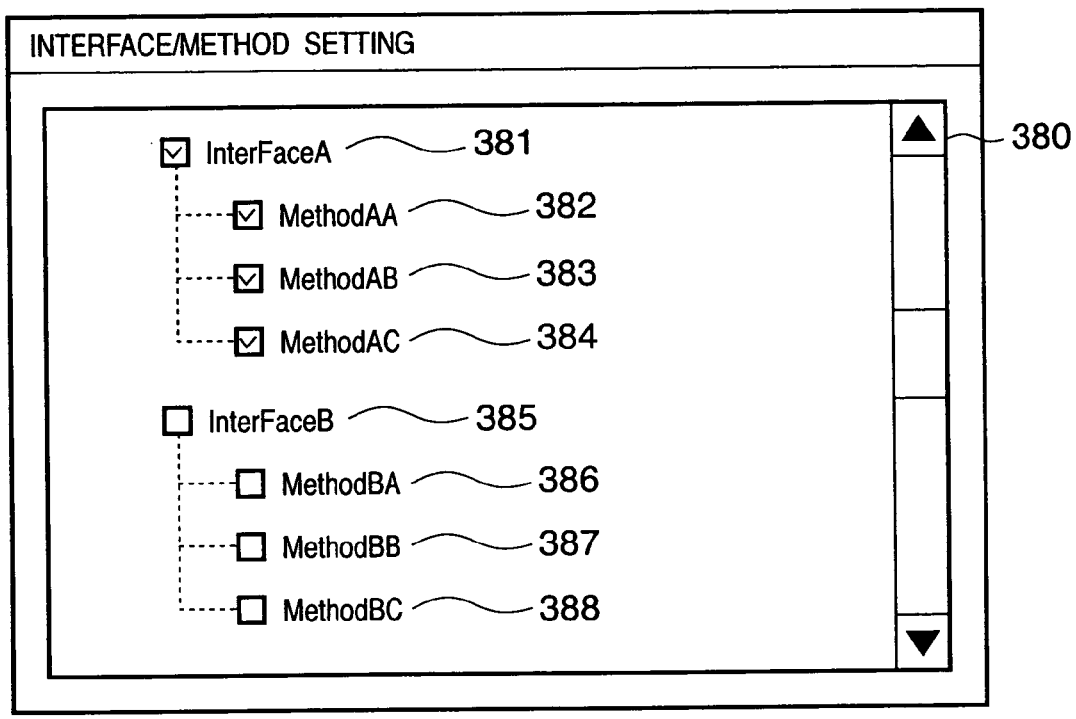
FIG. 42 shows a user interface displaying a tree view of interfaces and methods according to a tenth embodiment.

FIG. 42 shows a user interface that provides a tree view of interfaces and methods according to a tenth embodiment.

The user interface has a view (380) for displaying interfaces and methods in tree form. When a user checks an interface, InterfaceA (381), all methods MethodAA, MethodAB, and MethodAC (382–384) in the interface are selected as targets for log acquisition. When the user unchecks an interface InterfaceB (385), all method MethodBA, MethodBB, and Method BC (385–388) in the interface are deselected and excluded from the target for log acquisition.

Figure 43:
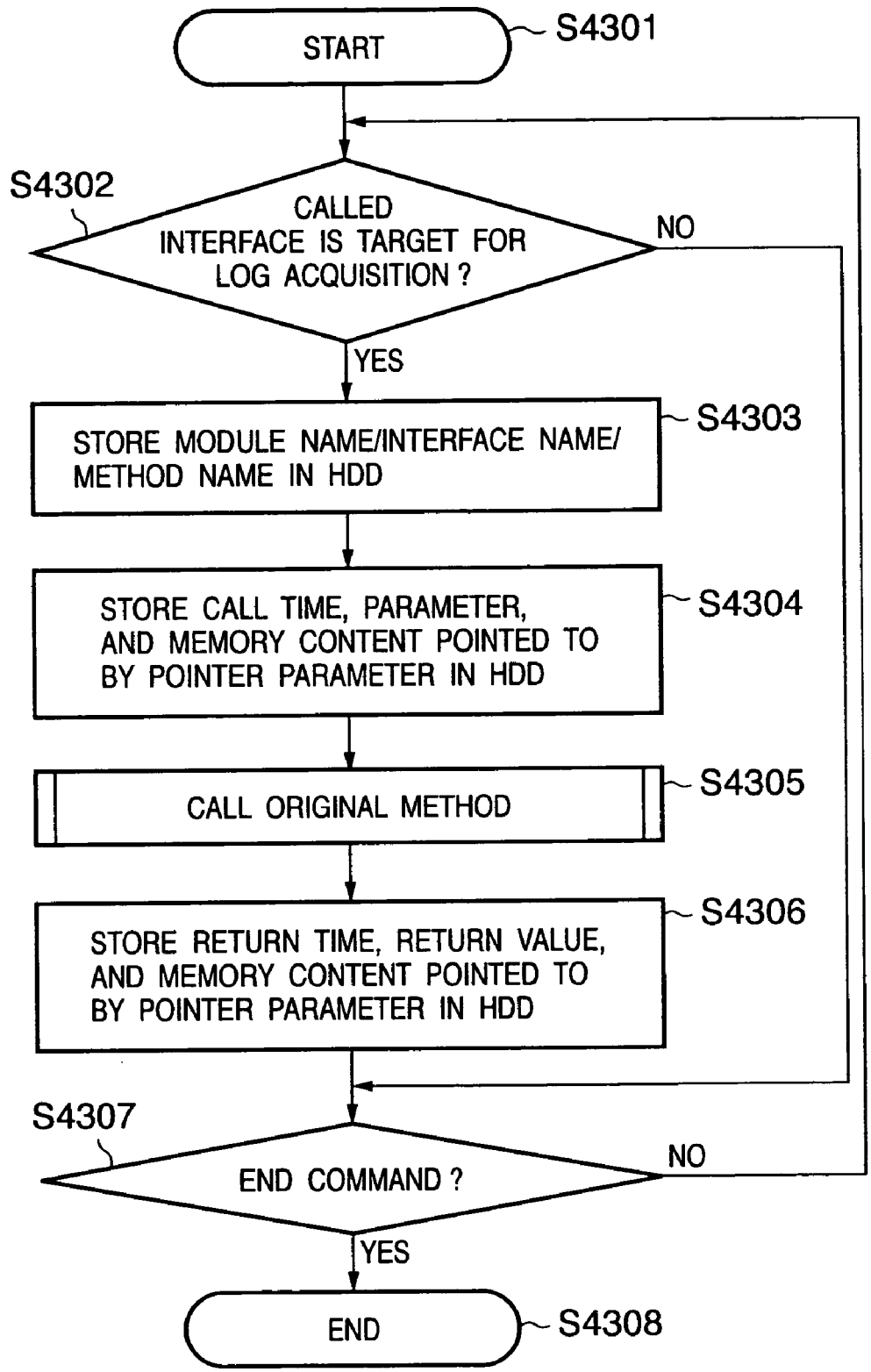
FIG. 43 shows a flowchart of a process for acquiring a log according to the tenth embodiment.

FIG. 43 shows a flowchart of a process for acquiring a log in the software evaluation system according to the tenth embodiment when targets for log acquisition are selected as shown in FIG. 42.

Once the process has been started (step S4301), the log acquisition code determines, each time a call to a method in an interface is made, whether or not the interface associated with the method is a target for log acquisition (step 4302). If it is a target for log acquisition, then the log acquisition code stores the module name, interface name, and method name in the HDD (step S4303).

Then the log acquisition code stores the call time, parameter, memory content pointed to by a pointer parameter in the HDD (step S4304) and calls the original method (step S4305). After returning from the method, the log acquisition code stores the return time, return value, and memory content pointed to by the pointer parameter in the HDD (step S4306). The process continues until an end command is provided by the user (step S4307).

Thus, the user can more readily know the relationship between interfaces and methods and readily selects an interface to obtain its log, thereby facilitating acquisition of the desired log.

Eleventh Embodiment

While all the method in an interface are selected in the seventh to tenth embodiments, individual method(s) may be independently selected.

Figure 44:
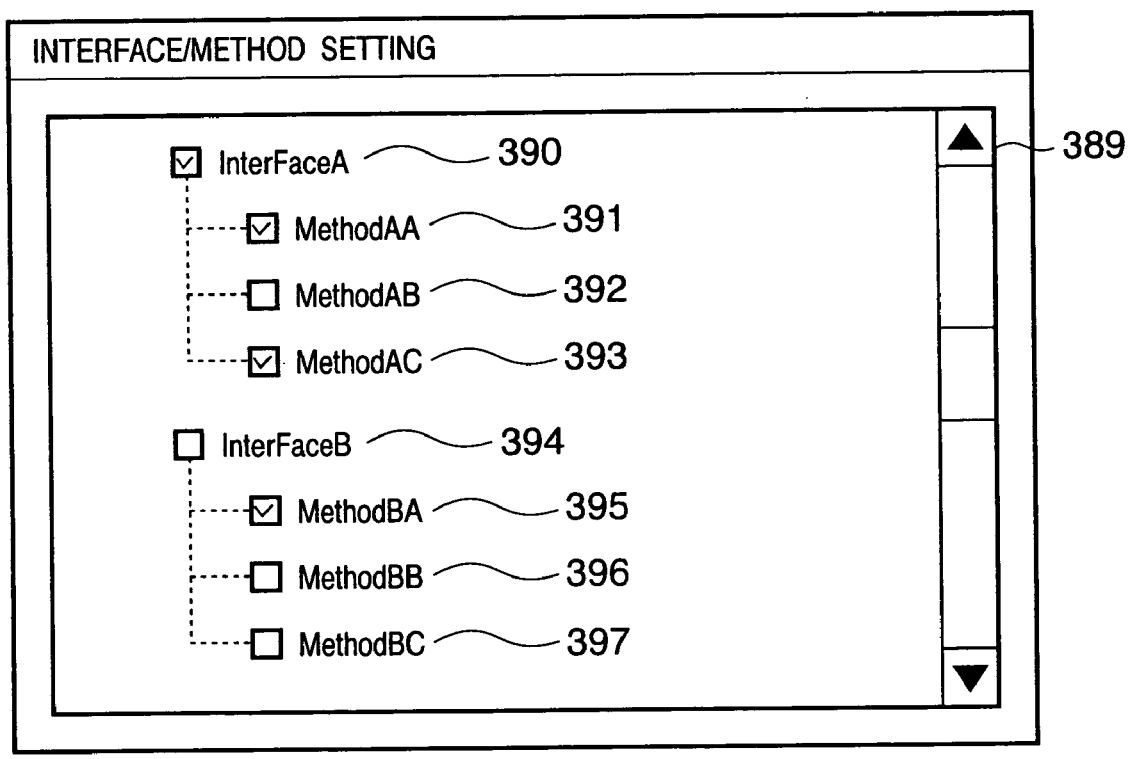
FIG. 44 shows a user interface displaying a tree view of interfaces and methods according to an eleventh embodiment.

FIG. 44 shows a user interface that provides a tree view of interfaces and methods according to an eleventh embodiment. This user interface is the same as the one shown in FIG. 42 but the method for selecting from among them is different.

The user interface includes a view (389) for displaying interfaces and methods in tree form. A user can check any of the methods MethodAA (391), MethodAC (393), MethodBA (395), and uncheck any of the methods MethodAB (392), MethodBB (396), Method BC (397) to select only one or more methods that are left checked in interfaces InterfaceA (210), InterfaceB (394) as targets of log acquisition, rather than all the methods in each interfaces.

Figure 45:
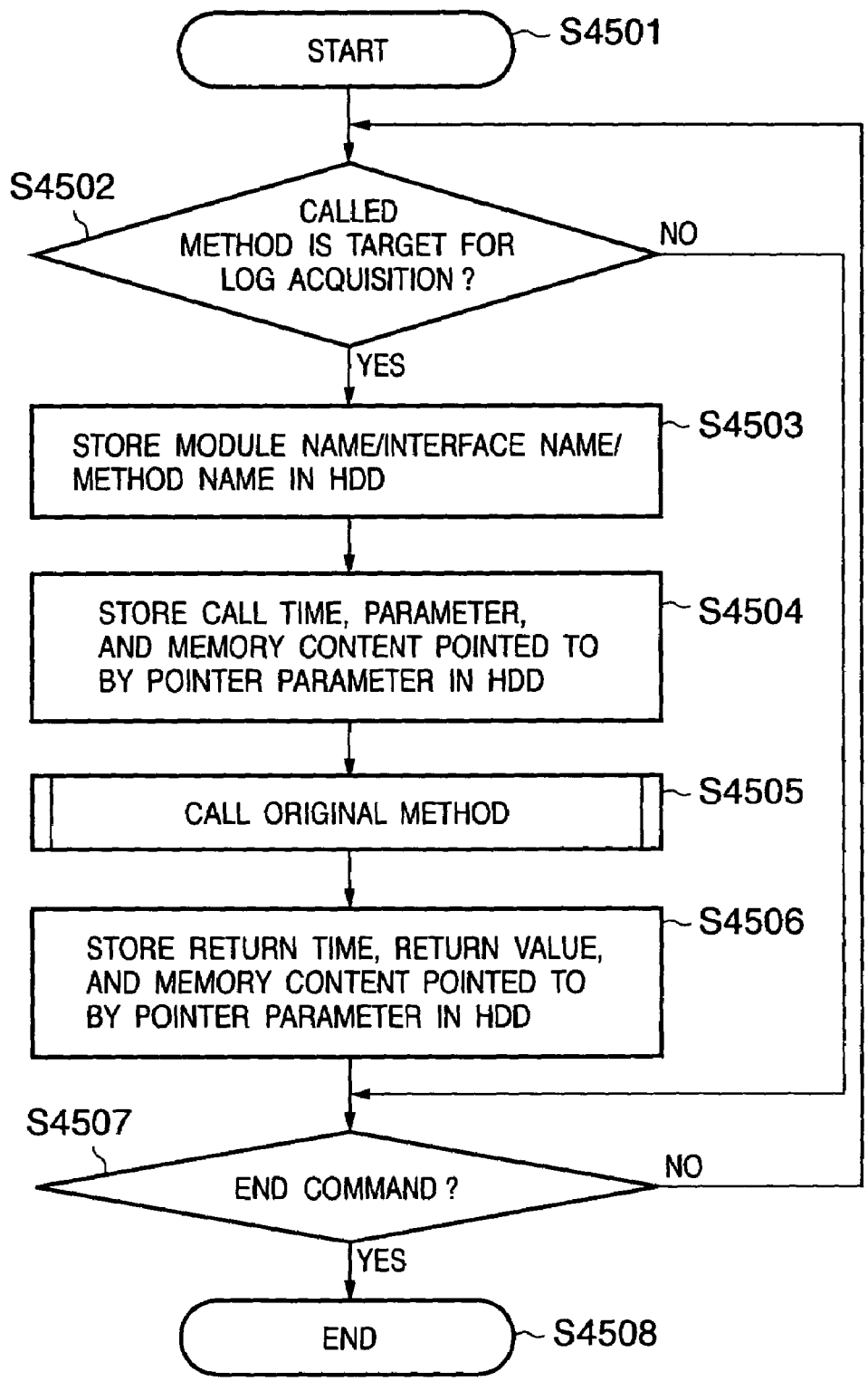
FIG. 45 shows a flowchart of a process for acquiring a log according to the eleventh embodiment.

FIG. 45 shows a flowchart of a process for acquiring a log in the software evaluation system according to the eleventh embodiment when targets of log acquisition are selected as shown in FIG. 44.

Once the process has been started (step S4501), the log acquisition code determines, each time a call to a method in an interface is made, whether or not any of the methods associated with the interface are targets for log acquisition (step S4502). If it any of them are targets for log acquisition, then the log acquisition code stores the module name, interface name, and method name(s) in the HDD (step S4503). The process (step S4504 to S4507) is the same as the one shown in FIG. 43 according to the tenth embodiment.

Thus, this embodiment provides the advantage that the user can readily select an individual method or methods to acquire the log of them, rather than an interface, which is a larger unit. Consequently, the user can readily acquire his/her desired log.

Twelfth Embodiment

While an acquired log is stored in a given location in the HDD in the embodiments described above, a log may be stored on a date-by-date basis in order to facilitate log analysis.

Figure 46:
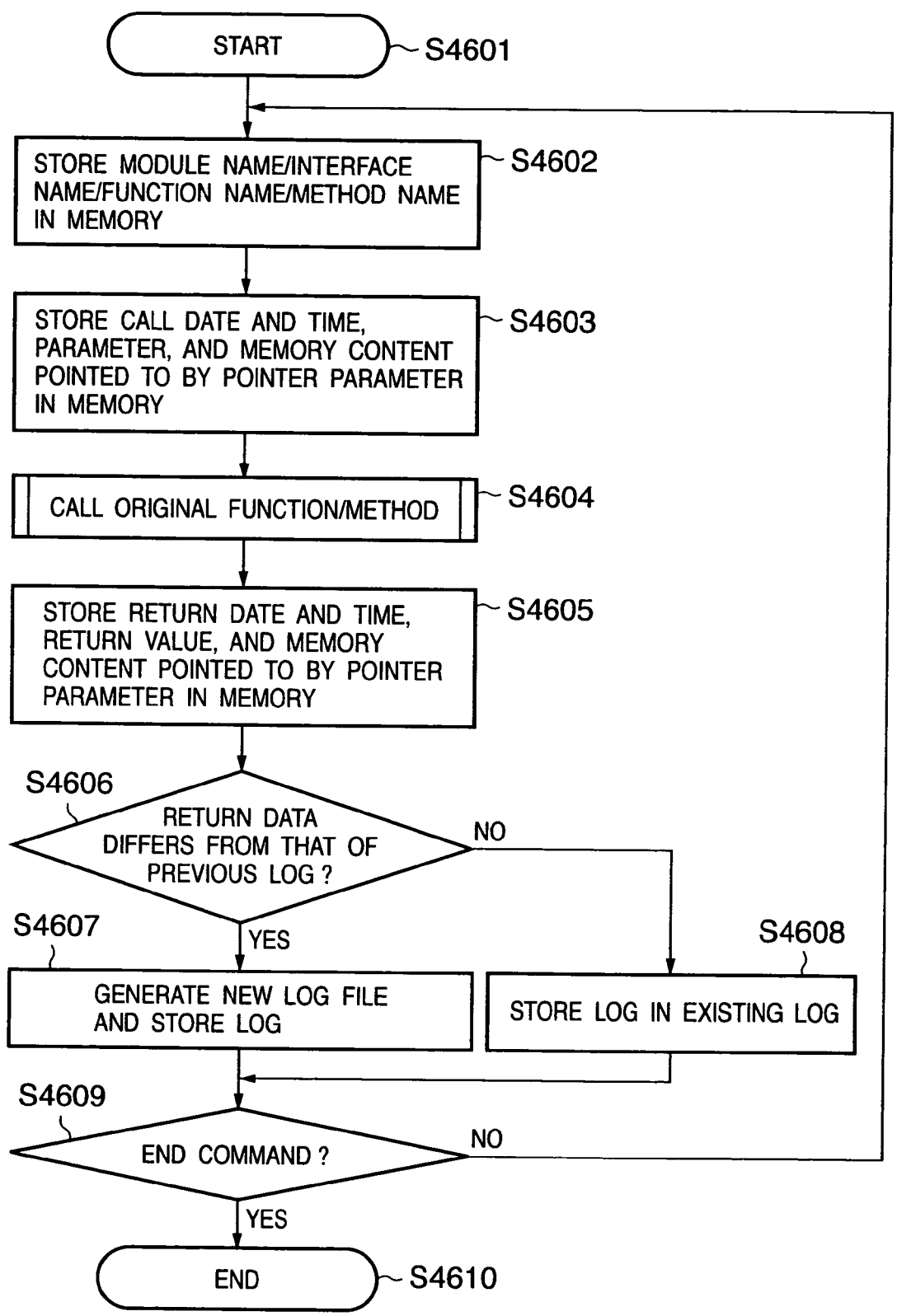
FIG. 46 shows a flowchart of a process for dividing and storing a log on a date-by-date basis according to a twelfth embodiment.

FIG. 46 shows a flowchart of a process for storing logs separated on a date-by-date basis.

When the process is started (step S4601), log acquisition is initiated and the module name, interface name, function/method name are stored in memory (step S4602).

The log acquisition code then stores the call date and time, parameter, and a memory content pointed to by a pointer in memory (step S4603) and calls the original function/method (step S4604). After returning from the function/method, the log acquisition code return date and time, return value, memory content pointed to by the pointer parameter in memory (step S4605). Then it determines whether or not the date of the return of the called function/method differs from the return date previously stored (step S4606). If the date differs from the previous return date, the log acquisition code generates a new log file and stores the log in that file (step S4607). On the other hand, if they are the same, the log acquisition code stores the log in the existing log file (step S4608). This process end (S4610) when an end command is provided by the user (step S4609).

Thus, this embodiment provides the advantage that it allows the user to acquire logs on a date-by-date basis, thereby facilitating log analysis.

Thirteenth Embodiment

While logs are stored on a date-by-date basis in the twelfth embodiment described above, logs can be stored separately according to the size or number of the logs.

Figure 47:
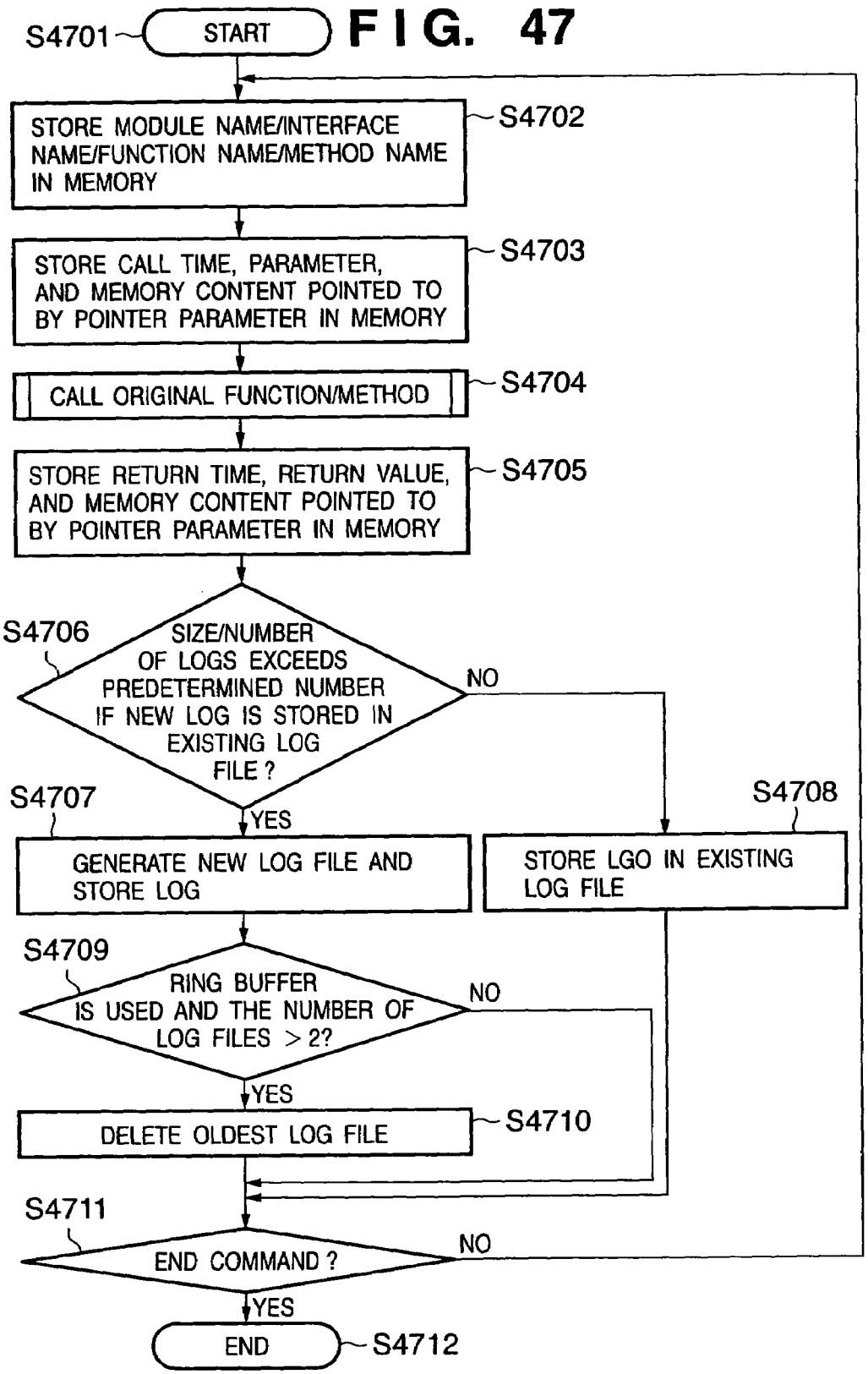
FIG. 47 shows a flowchart of a process for dividing and storing a log according to the size or number of log files according to a thirteenth embodiment.

FIG. 47 shows a flowchart of a process for separately storing logs according to the size or the number of the logs.

When the process is started (step S4701), log acquisition starts and the module name, interface name, and function/method name are stored in memory (step S4702). The log acquisition code then stores the call time, parameter, and the memory content pointed to by a pointer parameter in memory (step S4703) and calls the original function/method (step S4704). After returning from the function/method, the log acquisition code stores the return time, the return value, and the memory content pointed to by the pointer parameter in memory (step S4705). Then it determines whether storing the new log data in an existing log file causes the size of the file or the number of logs in the file to exceed to a predetermined value (step S4706).

If the size or the number of the logs exceeds the predetermined value, the log acquisition code generates a new log file and stores the log in that file (step S4707). Otherwise, if not exceed it stores the log in the existing log file (step S4708). If the log acquisition code generates a new log file, it determines whether or not a ring buffer is used and the number of log files generated is more than two (step S4709). If so, it deletes the oldest log file (step 4710). This process ends (step S4712) when an end command is provided from the user (step S4711).

Thus, the user can acquire size-controlled, generated files and a predetermined number of generated logs. The present embodiment therefore has the advantage that it provides more manageable logs. Furthermore, using a ring buffer can limit the load placed by the software evaluation system on the resources of the PC, enabling stable log acquisition.

Fourteenth Embodiment

Figure 48:
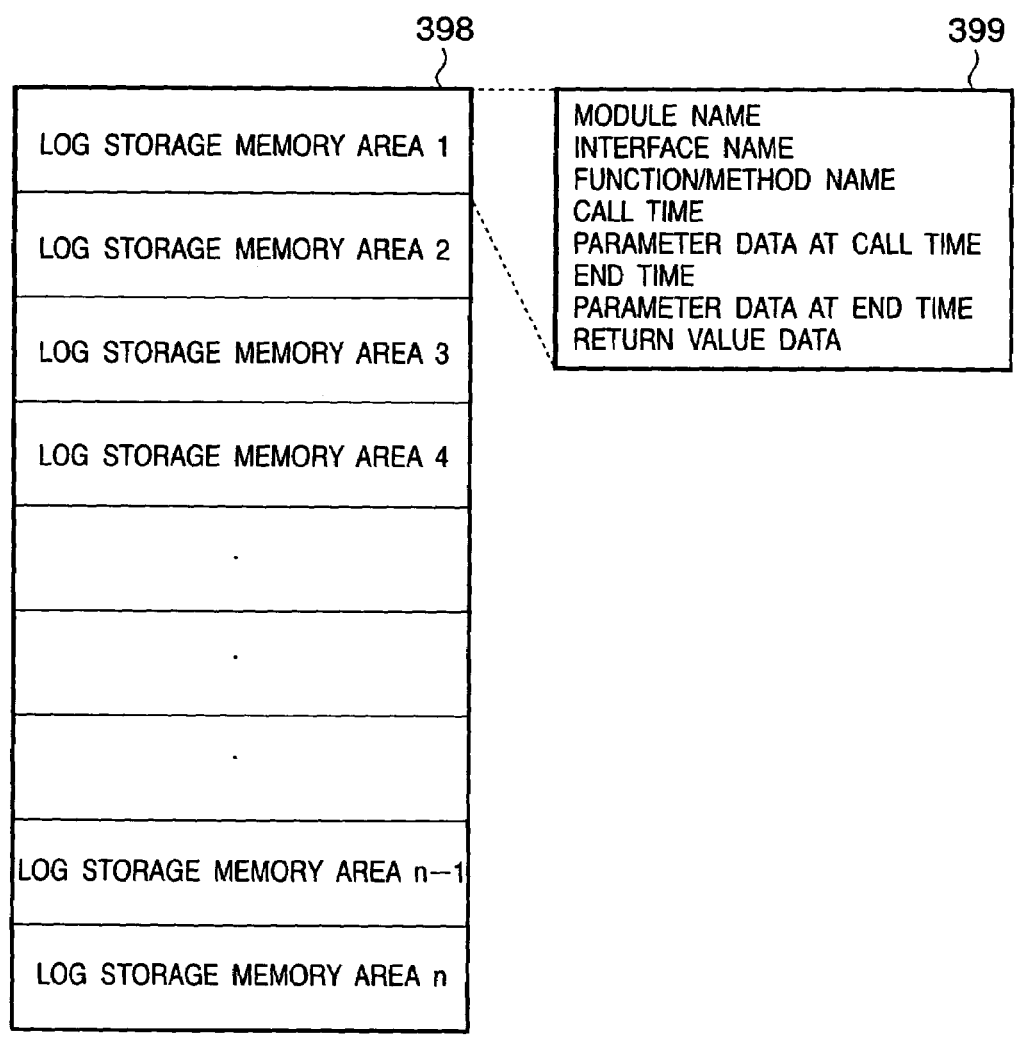
FIG. 48 schematically shows memory storing a predetermined number of logs from among the logs obtained in according to a fourteenth embodiment.

FIG. 48 schematically shows memory in which a predetermined number of acquired logs are stored.

N log storage areas (398) are provided for storing a predetermined number of logs. Each log storage area stores a log of functions/methods. The information is stored includes the module name, interface name, function/method name, call time, parameter data at the call time, the end time, parameter data at the end time, and return value data (399). The information has a variable size. Log data is stored in the memory areas in order, from log storage memory area 1 to log storage memory area n. When the areas are exhausted, the logs are overwritten, starting from log storage memory are 1.

Figure 49:
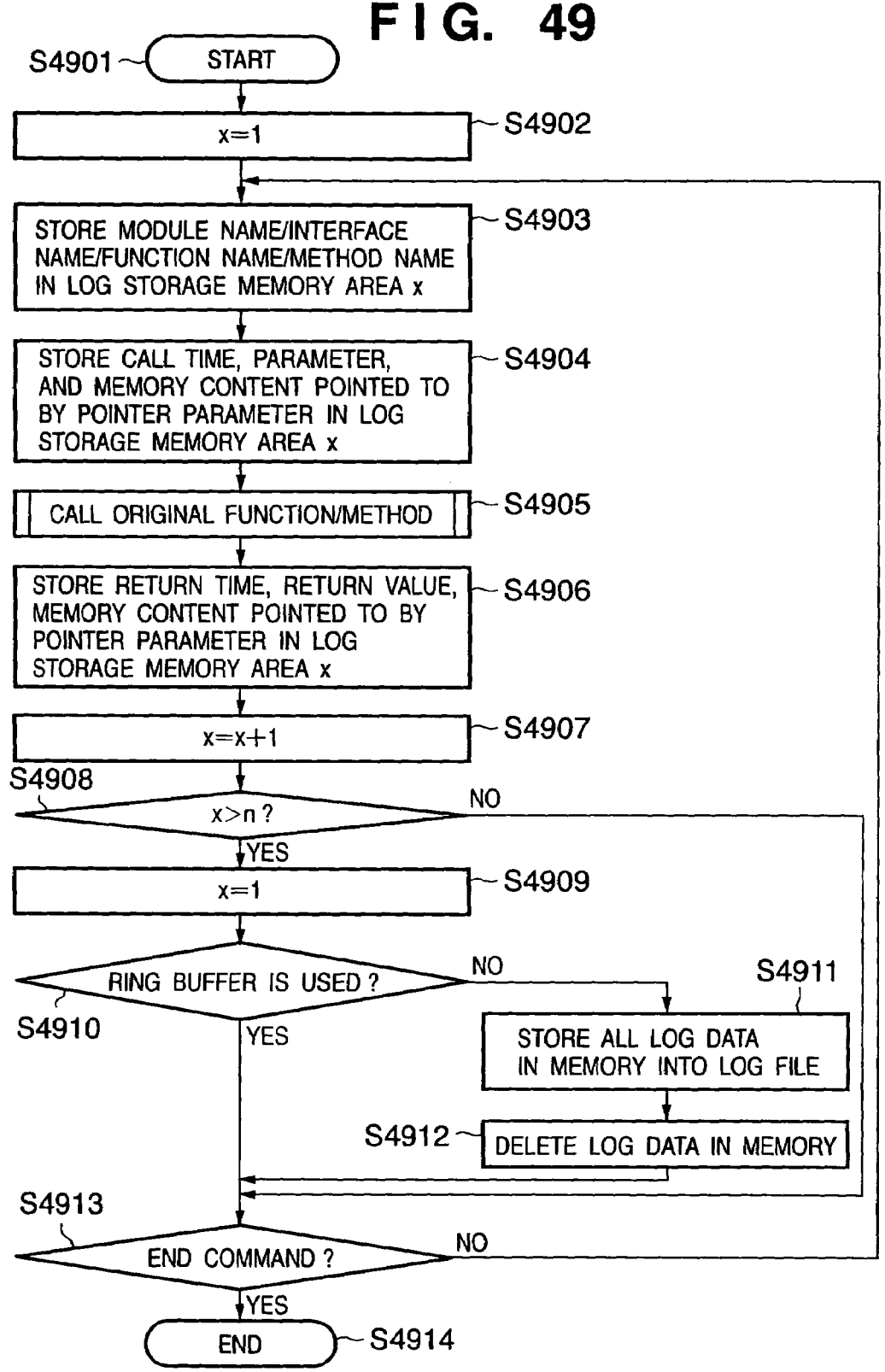
FIG. 49 shows a flowchart of a process for acquiring the predetermined number of logs from among the logs obtained according to the fourteenth embodiment.

FIG. 49 shows a flowchart of a process for acquiring logs and storing a predetermined number of acquired logs in the memory.

When the process is started (step S4901), a variable x indicating the location of a log storage area is initialized to 1 (step S4902). Then log acquisition is started and the module name, interface name, function/method name are stored in the log storage memory area x (step S4903).

The log acquisition code then stores the call time, a parameter, and the memory content pointed to by a pointer parameter in log storage memory area x (step S4904) and calls the original method/function (step S4905). After returning from the function/method, the log acquisition code stores the return time, the return value, and the memory content pointed to by the pointer parameter in log storage memory area x (step S4906). Then it adds 1 to the variable x that indicates the location of a log storage memory area (step S4907) and determines whether x exceeds the number n of the log storage memory areas (step S4908).

If x is larger than n, it assigns 1 to x so that the log storage memory areas are reused from the top log storage memory area (step S4909). Then it determines whether or not a ring buffer is to be used (step S4910). If not, the log acquisition code stores all log data in the memory into a log file (step S4911) and deletes all the log data from the memory (step S4912). This process ends (step S4914) when an end command is provided from the user (step S4913).

Thus, memory usage can be limited ad load placed by the software evaluation system on the resources of the PC can be minimized, enabling stable log acquisition.

Other Embodiments

The present invention may be applied to a system consisting of a plurality of devices (for example, a host computer, interface devices, a reader, and a printer) or a standalone apparatus (for example a copying machine or facsimile machine.

The object of the present invention can also be achieved by providing a storage medium containing a program code of software that implements the functions of the embodiments described above to a system or an apparatus and causes to a computer (or CPU or MPU) of the system or the apparatus to read and execute the program code stored on the storage medium.

In that case, the program code read from the storage medium implements the functions of the embodiments described above and the storage medium on which the program code is stored constitutes the present invention.

The storage medium for providing the program code may be a floppy® disk, disk, hard disk, optical disk, magneto-optical disk, CD-ROM, CD-R, magnetic tape, nonvolatile memory card, or ROM.

The present invention includes not only implementations in which the features of the embodiments described above are implemented by a computer reading and executing the program code but also implementations in which an OS (operating system) or the like running on a computer executes all or part of the actual processing to implement the features of the embodiments described above according to instructions in the program code.

Furthermore, the present invention includes cases where the program code read from the storage medium is written into an expansion board inserted into a computer or memory provided in a expansion unit connected to a computer and a CPU or other processor provided in the expansion board or expansion unit executes all or part of the actual processing and the processing implements the features of the embodiments described above.

As described above, the present invention allows processing logs of software divided into a plurality of modules to be readily acquired and reduces the man-hours need to analyze the cause of software failure.

As many apparently widely different embodiments of the present invention can be made without departing from the spirit and scope thereof, it is to be understood that the invention is not limited to the specific embodiments thereof except as defined in the claims.

What is claimed is:

1. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution, and passing said result to said program;

determining whether or not a pointer parameter is defined in a predetermined manner in a function definition in said program; and if the pointer parameter is defined in the predetermined manner, recording a memory content pointed to by said pointer parameter as a log according to said definition.

2. The log acquisition method according to claim 1, wherein said function for log acquisition further comprises the step of calculating memory size according to said definition and said recording step records an amount of the memory content pointed to by said pointer parameter, said amount being equal to said calculated memory size.

3. A storage medium storing a control program for causing a computer to implement the log acquisition method according to claim 1.

4. A control program for causing a computer to implement the log acquisition method according to claim 1.

5. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, and receiving the result of the execution to said program;

recording given information when calling said function for performing said predetermined process and recording given information when receiving said result of the execution;

determining whether or not there is an unexported function according to a function definition in said program; and if there is an unexported function, generating a new function for log acquisition that corresponds to said unexported function and changing the address of said unexported function into the address of said newly generated function; and said newly generated function comprises the steps of:

calling said unexported function to cause said process to be executed and receiving the result of the execution and passing said result to said program; and recording given information when calling said unexported function and recording given information when receiving said result of the execution.

6. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution and passing said result to said program;

determining whether or not a pointer parameter is defined as a variable-length array in a function definition in said program; and if a pointer parameter is defined as a variable-length array, recording a memory content pointed to by said pointer parameter as a variable-length array.

7. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution and passing said result to said program;

determining whether or not a pointer parameter is specified as a structure in a function definition in said program; and if a pointer parameter is specified as a structure, recording a memory content pointed by said pointer as a log of size of said structure defined in the function definition in said program.

8. A log acquisition method for acquiring a runtime log of a program including a function for performing a predetermined process, comprising the step of:

changing the address of said function loaded for performing said predetermined process to the address of a function for log acquisition, wherein said function for log acquisition comprises the steps of:

calling said function for performing said predetermined process to cause said predetermined process to be executed, receiving the result of the execution and passing said result to said program;

determining whether or not a pointer parameter the type of which is specified as a structure is defined in a function definition in said program; and if a pointer parameter of the type of which is specified as a structure is defined, recording a memory content pointed to by said pointer parameter as data of the specified data type.

9. A log acquisition method for acquiring a runtime log of a program including a method for performing a predetermined process, comprising the process of:

changing said method loaded for performing said predetermined process to the address of a method for log acquisition;

wherein said method for log acquisition comprises the steps of:

calling said method for performing said predetermined process to cause said predetermine process to be executed, receiving the result of the execution, and passing said result to said program;

determining whether or not a pointer parameter is defined in a predetermined manner in a function definition in said program; and if the pointer parameter is defined in the predetermined definition manner, recording a memory content pointed by said pointer parameter as a log according to said definition.

10. The log acquisition method according to claim 9, wherein said method for log acquisition further comprising the step of calculating memory size according to said definition, wherein said recording step records an amount of the memory content pointed to by said pointer parameter, said amount being equal to said calculated memory size.

11. A log acquisition method for acquiring a runtime log of a program including a method for performing a predetermined process, comprising the process of:

changing said method loaded for performing said predetermined process to the address of a method for log acquisition;

wherein said method for log acquisition comprises the steps of:

calling said method for performing said predetermine process to cause said predetermined process to be executed, receiving the result of the execution, and passing said result to said program;

recording given information when calling said method for performing said predetermined program and recording given information when receiving said execution result;

determining whether or not there is an unexported method according to a function definition in said program; and if there is an unexported method, generating a new method for log acquisition that corresponds to said unexported method and changing the address of said unexported method to the address of said newly generated method; and said newly generated method comprises the steps of:

calling said unexported method to cause said process to be executed and receiving the result of the execution and passing said result to said program; and recording given information when calling said unexported method and recording given information when receiving said result of the execution.

12. A log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution and passing said result to said program;

determining whether or not a pointer parameter is defined as a variable-length array in a function definition in said program; and if a pointer parameter is defined as a variable-length array, recording a memory content pointed to by said pointer parameter as a variable-length array.

13. A log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution and passing said result to said program;

determining whether or not a pointer parameter is specified as a structure in a function definition in said program; and if a pointer parameter is specified as a structure, recording a memory content pointed by said pointer as a log of size of said structure defined in the function definition in said program.

14. A log acquisition method for acquiring a runtime log of a program including a method for performing a predetermined process, comprising the step of:

changing the address of said method loaded for performing said predetermined process to the address of a method for log acquisition, wherein said method for log acquisition comprises the steps of:

calling said method for performing said predetermined process to cause said predetermined process to be executed, receiving the result of the execution and passing said result to said program;

determining whether or not a pointer parameter the type of which is specified as a structure is defined in a function definition in said program; and if a pointer parameter of the type of which is specified as a structure is defined, recording a memory content pointed to by said pointer parameter as data of the specified data type.

15. A log acquisition method for obtaining a runtime log of a program including a function for performing a predetermined process, comprising the steps of:

changing the address of said function loaded for performing said predetermined process to the address of a function for log acquisition; and selecting said function for log acquisition;

wherein said function for log acquisition comprises the steps of:

calling said function for performing said predetermined process to cause said process to be executed, receiving the result of the execution, and passing said result to said program;

recording given information as a log when calling said function selected in said selecting step; and recording given information as a log when receiving the result of execution of said function selected in said selecting step.

16. The log acquisition method according to claim 15, wherein said function for log acquisition further comprises the step of determining whether or not an error has occurred during execution of the function selected in said selecting step, and said step for recording information as a log records said given information as a log if it is determined that an error has occurred in said error determination step.

17. A storing medium storing a control program for causing a computer to implement the log acquisition method according to claim 15.

18. A control program for causing a computer to implement the log acquisition method according to claim 15.

19. A log acquisition method for acquiring a runtime log of a program including a function for performing a predetermined process, comprising the steps of:

changing the address of said function loaded for performing said predetermined process to the address of a function for log acquisition; and selecting said function for performing said predetermined process;

wherein said function for log acquisition comprises the steps of:

calling said function for performing said predetermined process to cause said predetermined process to be executed, receiving the result of the execution, and passing said result to said program;

recording given information as a log when calling said function for performing said predetermined process and recording given information as a log when receiving the result of execution of said function; and stopping log recording for the function selected in said selecting step.

20. The log acquisition method according to claim 19, wherein said function for log acquisition further comprises the step of determining whether or nor an error has occurred during execution of the function selected in said selecting step, and said step of stopping log recording stops log recording if it is determined that an error has occurred in said error determination step.

21. A log acquisition method for obtaining a runtime log of a program including a method for performing a predetermined process, comprising the steps of:

changing the address of said method loaded for performing said predetermined process to the address of a method for log acquisition; and selecting said method for performing said predetermined process;

wherein said method for log acquisition comprises the steps of:

calling said method for performing said predetermined process to cause said process to be executed, receiving the result of the execution, and passing said result to said program;

recording given information as a log when calling said method selected in said selecting step; and recording given information as a log when receiving the result of execution of said method selected in said selecting step.

22. The log acquisition method according to claim 21, wherein said function for log acquisition further comprises the step of determining whether or nor an error has occurred during execution of the method selected in said selecting step, and said step for recording information as a log records said given information as a log if it is determined that an error has occurred in said error determination step.

23. The log acquisition method according to claim 21, further comprising the step of displaying an interface exported by a COM server and method belonging to said interface in a tree form, wherein
said selecting step makes the selection through said display.

24. The log acquisition method according to claim 23, wherein said selecting step makes the selection on a method-by-method basis.

25. The log acquisition method according to claim 23, wherein said selecting step selects all the methods belonging to said interface by selecting said interface.

26. A log acquisition method for acquiring a runtime log of a program including a method for performing a predetermined process, comprising the steps of:
changing the address of said method loaded for performing said predetermined process to the address of a method for log acquisition; and
selecting said method for performing said predetermined process;
wherein said method for log acquisition comprises the steps of:
calling said method for performing said predetermined process to cause said predetermined process to be executed, receiving the result of the execution, and passing said result to said program;
recording given information as a log when calling said method for performing said predetermined process and recording given information as a log when receiving the result of execution of said method; and
stopping log recording for the method selected in said selecting step.

27. The log acquisition method according to claim 26, wherein said function for log acquisition further comprises the step of determining whether or nor an error has occurred during execution of the method selected in said selecting step, and
said step of stopping log recording stops log recording if it is determine that an error has occurred in said error determination step.

28. The log acquisition method according to claim 26, further comprising the step of displaying an interface exported by a COM server and method belonging to said interface in a tree form, wherein
said selecting step selects the method through said display.

29. The log acquisition method according to claim 28, wherein said selecting step makes the selection on a method-by-method basis.

30. The log acquisition method according to claim 28, wherein said selecting step selects all the methods belonging to said interface by selecting said interface.

31. A log acquisition method for acquiring a runtime log of a program including a function for performing a predetermined process, comprising the steps of:
changing the address of said function loaded for performing said predetermined process to the address of a function for log acquisition; and
selecting said function for performing said predetermined process;
wherein said function for log acquisition comprises the steps of:
calling said function for performing said predetermined process to cause said predetermined process to be executed, receiving the result of the execution, and passing said result to said program; and
recording given information as a log when calling said function for performing said predetermined process and recording given information as a log when receiving the result of execution of said function; wherein
said step of recording as a log records the log on a date-by-date basis.

32. A log acquisition method for acquiring a runtime log of a program including a function for performing a predetermined process, comprising the steps of:
changing the address of said function loaded for performing said predetermined process to the address of a function for log acquisition; and
selecting said function for performing said predetermined process;
wherein said function for log acquisition comprises the steps of:
calling said function for performing said predetermined process to cause said predetermined process to be executed, receiving the result of the execution, and passing said result to said program; and
recording given information as a log when calling said function for performing said predetermined process and recording given information as a log when receiving the result of execution of said function; wherein
said log recording step generates a new file when the size of the log exceeds a predetermined size.

33. A log acquisition method for acquiring a runtime log of a program including a function for performing a predetermined process, comprising the steps of:
changing the address of said function loaded for performing said predetermined process to the address of a function for log acquisition; and
selecting said function for performing said predetermined process;
wherein said function for log acquisition comprises the steps of:
calling said function for performing said predetermined process to cause said predetermined process to be executed, receiving the result of the execution, and passing said result to said program; and
recording given information as a log when calling said function for performing said predetermined process and recording given information as a log when receiving the result of execution of said function; wherein
said log recording step generates anew file when the number of logs exceeds a predetermined number.

34. A log acquisition method for acquiring a runtime log of a program including a function for performing a predetermined process, comprising the steps of:
changing the address of said function loaded for performing said predetermined process to the address of a function for log acquisition; and
selecting said function for performing said predetermined process;
wherein said function for log acquisition comprises the steps of:
calling said function for performing said predetermined process to cause said predetermined process to be executed, receiving the result of the execution, and passing said result to said program; and
recording given information as a log in memory when calling said function for performing said predetermined process and recording given information as a log when receiving the result of execution of said function; wherein said step of recording as log in memory moves and stores the log into a disk device when the number of logs in said memory exceeds a predetermined number.

35. A log acquisition method for acquiring a runtime log of a program including a method for performing a predetermined process, comprising the steps of:

changing the address of said method loaded for performing said predetermined process to the address of a method for log acquisition; and selecting said method for performing said predetermined process;

wherein said method for log acquisition comprises the steps of:

calling said method for performing said predetermined process to cause said predetermined process to be executed, receiving the result of the execution, and passing said result to said program; and recording given information as a log when calling said method for performing said predetermined process and recording given information as a log when receiving the result of execution of said method; wherein said step of recording as a log records the log on a date-by-date basis.

36. A log acquisition method for acquiring a runtime log of a program including a method for performing a predetermined process, comprising the steps of:

changing the address of said method loaded for performing said predetermined process to the address of a method for log acquisition; and selecting said method for performing said predetermined process;

wherein said method for log acquisition comprises the steps of:

calling said method for performing said predetermined process to cause said predetermined process to be executed, receiving the result of the execution, and passing said result to said program; and recording given information as a log when calling said method for performing said predetermined process and recording given information as a log when receiving the result of execution of said method; wherein said log recording step generates a new file when the size of the log exceeds a predetermined size.

37. A log acquisition method for acquiring a runtime log of a program including a method for performing a predetermined process, comprising the steps of:

changing the address of said method loaded for performing said predetermined process to the address of a method for log acquisition; and selecting said method for performing said predetermined process;

wherein said method for log acquisition comprises the steps of:

calling said method for performing said predetermined process to cause said predetermined process to be executed, receiving the result of the execution, and passing said result to said program; and recording given information as a log when calling said method for performing said predetermined process and recording given information as a log when receiving the result of execution of said method; wherein said log recording step generates a new file when the number of logs exceeds a predetermined number.

38. A log acquisition method for acquiring a runtime log of a program including a method for performing a predetermined process, comprising the steps of:

changing the address of said method loaded for performing said predetermined process to the address of a method for log acquisition; and selecting said method for performing said predetermined process;

wherein said method for log acquisition comprises the steps of:

calling said method for performing said predetermined process to cause said predetermined process to be executed, receiving the result of the execution, and passing said result to said program; and recording given information as a log in memory when calling said method for performing said predetermined process and recording given information as a log when receiving the result of execution of said method; wherein said step of recording as log in memory moves and stores the log into a disk device when the number of logs in said memory exceeds a predetermined number.

* * * * *

UNITED STATES PATENT AND TRADEMARK OFFICE
CERTIFICATE OF CORRECTION

| | |
|---|---|
| PATENT NO. | : 7,086,034 B2 |
| APPLICATION NO. | : 10/600843 |
| DATED | : August 1, 2006 |
| INVENTOR(S) | : Makoto Mihara |

It is certified that error appears in the above-identified patent and that said Letters Patent is hereby corrected as shown below:

ON TITLE PAGE, ITEM (30)
Foreign Application Priority Data, "Jun. 28, 1920 (JP)....2002-191128" should read -- Jun. 28, 2002 (JP)....2002-191128 --;
On Title Page (56) References Cited OTHER PUBLICATIONS, In "TITLE: Performance Assertion..." "Pearl et al." should read -- Perl et al. --.

COLUMN 17:
Line 50, "it" should be deleted.

COLUMN 19:
Line 9, "are 1." should read -- area 1. --; and
Line 37, "ad" should read -- and --.

COLUMN 20:
Line 14, "need" should read -- needed --.

COLUMN 22:
Lines 14 and 38, "predetermine" should read -- predetermined --.

COLUMN 24:
Lines 3, 37 and 65, "nor" should read -- not --.

COLUMN 25:
Line 38, "nor" should read -- not --; and
Line 42, "determine" should read -- determined --.

COLUMN 26:
Line 47, "anew" should read -- a new --.

UNITED STATES PATENT AND TRADEMARK OFFICE
CERTIFICATE OF CORRECTION

PATENT NO. : 7,086,034 B2
APPLICATION NO. : 10/600843
DATED : August 1, 2006
INVENTOR(S) : Makoto Mihara It is certified that error appears in the above-identified patent and that said Letters Patent is hereby corrected as shown below:

<u>COLUMN 28</u>:
Line 41, "as log" should read -- as a log --.

Signed and Sealed this

First Day of May, 2007

JON W. DUDAS
*Director of the United States Patent and Trademark Office*